United States Patent
Inoue et al.

(10) Patent No.: US 8,988,538 B2
(45) Date of Patent: Mar. 24, 2015

(54) IMAGE PICKUP APPARATUS AND LENS APPARATUS

(71) Applicant: Canon Kabushiki Kaisha, Tokyo (JP)

(72) Inventors: Chiaki Inoue, Utsunomiya (JP);
Tsunefumi Tanaka, Utsunomiya (JP);
Takashi Oniki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 51 days.

(21) Appl. No.: 13/927,197

(22) Filed: Jun. 26, 2013

(65) Prior Publication Data

US 2014/0002688 A1 Jan. 2, 2014

(30) Foreign Application Priority Data

Jul. 2, 2012 (JP) ................................. 2012-148731
Jul. 2, 2012 (JP) ................................. 2012-148732
Jul. 2, 2012 (JP) ................................. 2012-148733

(51) Int. Cl.
*H04N 5/225* (2006.01)
*G02B 13/16* (2006.01)
*H04N 5/232* (2006.01)
*G03B 3/10* (2006.01)
*G03B 3/00* (2006.01)

(52) U.S. Cl.
CPC .............. *H04N 5/23296* (2013.01); *G03B 3/10* (2013.01); *G03B 3/00* (2013.01); *H04N 5/232* (2013.01)
USPC ....................... 348/218.1; 348/335

(58) Field of Classification Search
CPC ................................................. H04N 5/23238
USPC ....................... 348/218.1, 345, 335
See application file for complete search history.

(56) References Cited

U.S. PATENT DOCUMENTS

| | | | |
|---|---|---|---|
| 8,400,555 B1 * | 3/2013 | Georgiev et al. ............... | 348/345 |
| 2010/0208100 A9 * | 8/2010 | Olsen et al. .................. | 348/227.1 |
| 2013/0223759 A1 * | 8/2013 | Nishiyama .................... | 382/284 |

FOREIGN PATENT DOCUMENTS

| | | | | |
|---|---|---|---|---|
| JP | 2001-330878 A | 11/2001 | | |
| JP | 2005-303694 A | 10/2005 | | |
| JP | 2005-341301 A | 12/2005 | | |
| JP | 2005338505 A | * 12/2005 | ............... | G02B 7/02 |

* cited by examiner

*Primary Examiner* — Nhan T Tran
(74) *Attorney, Agent, or Firm* — Rossi, Kimms & McDowell LLP

(57) ABSTRACT

An image pickup apparatus includes a plurality of imaging optical systems having different focal lengths and each configured to form an optical image of an object, and a plurality of image sensors having image pickup areas each corresponding to one of the plurality of imaging optical systems and each configured to photoelectrically convert the optical image formed by a corresponding one of the imaging optical systems. The image pickup apparatus is configured to simultaneously capture a plurality of images by controlling the plurality of imaging optical systems and the plurality of image sensors. Each imaging optical system includes a focus lens unit configured to move in focusing and a fixed lens unit that is fixed in the focusing. The image pickup apparatus further includes a focus driver configured to move a plurality of focus lens units by equal moving amounts.

26 Claims, 30 Drawing Sheets

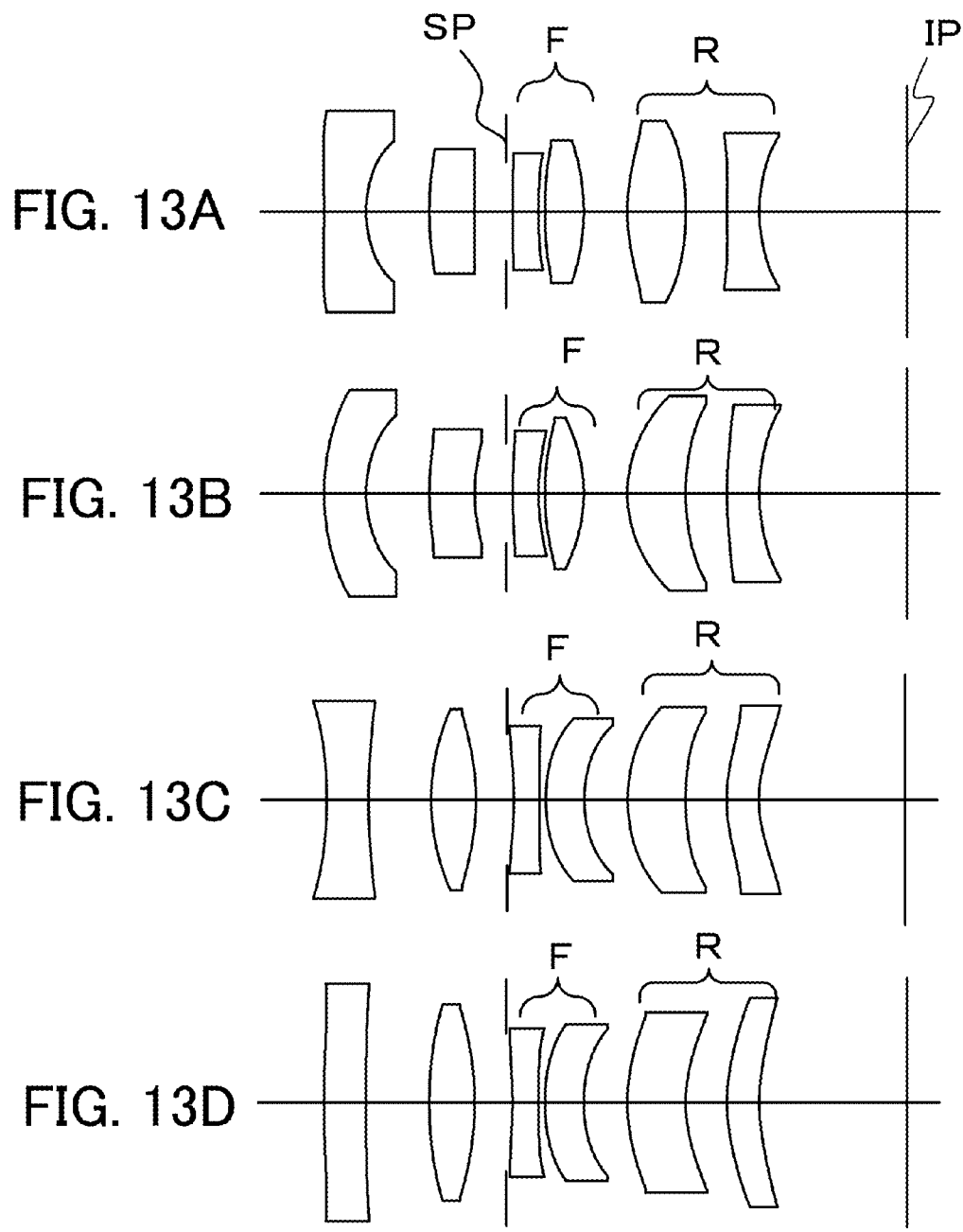

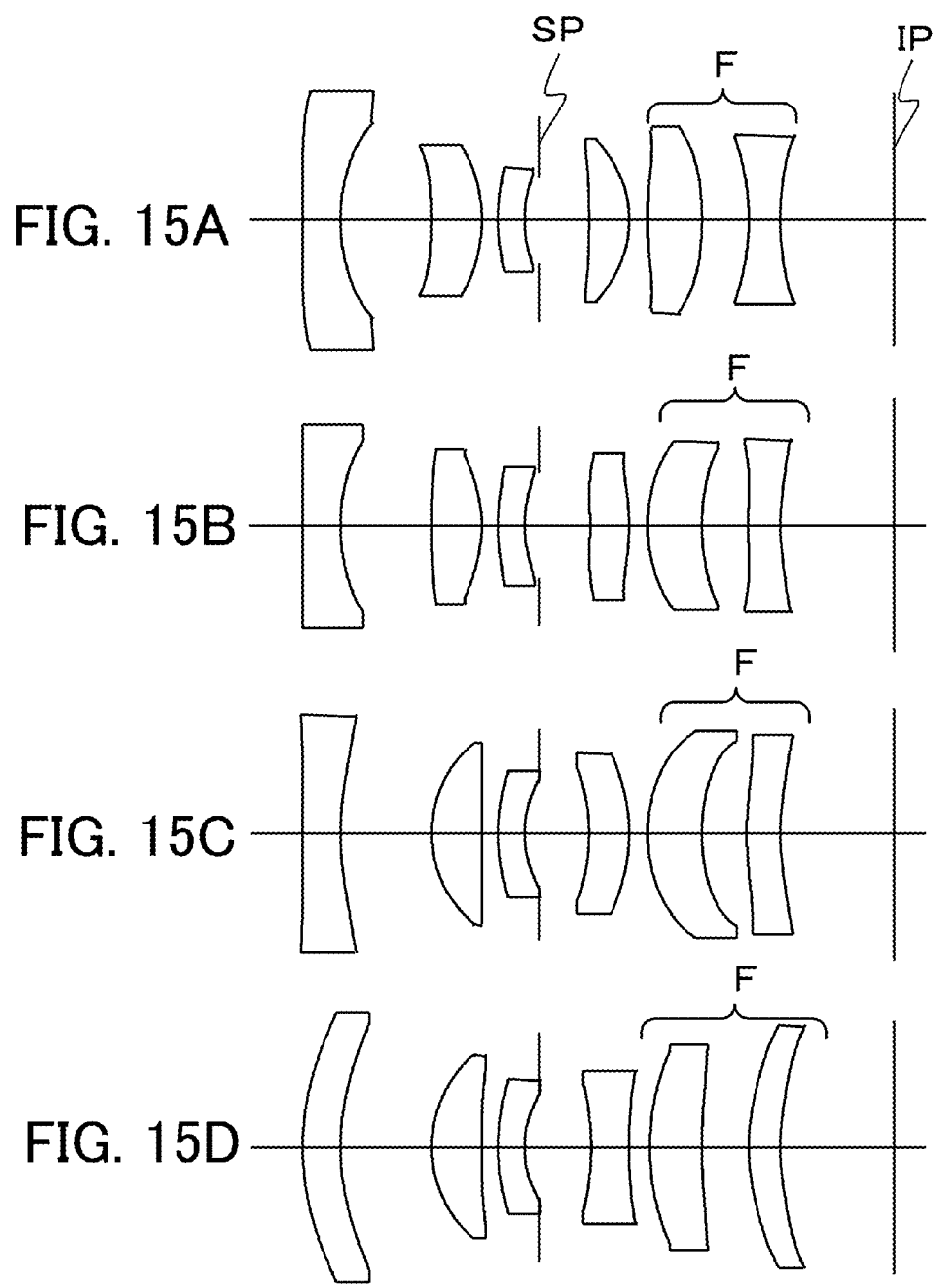

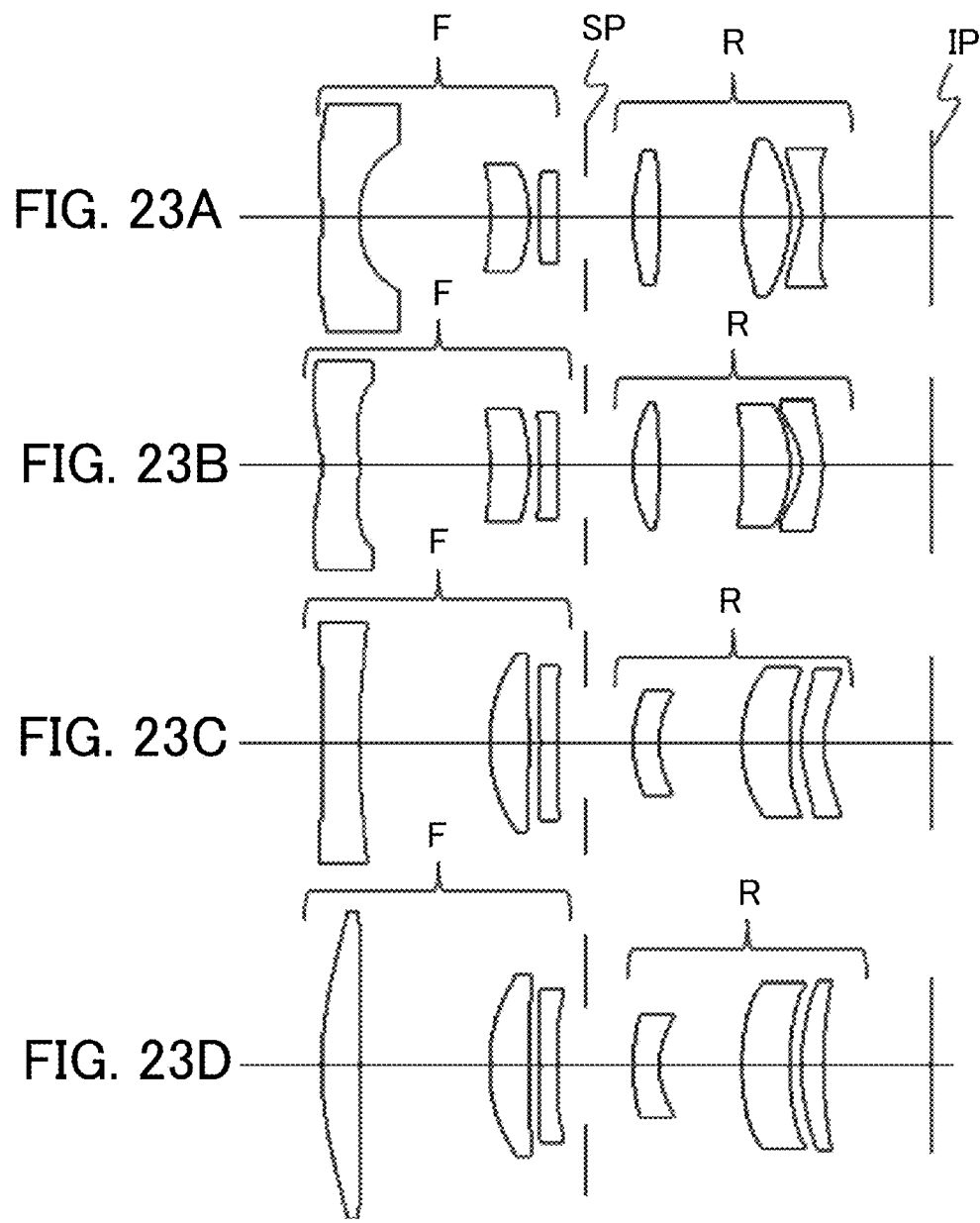

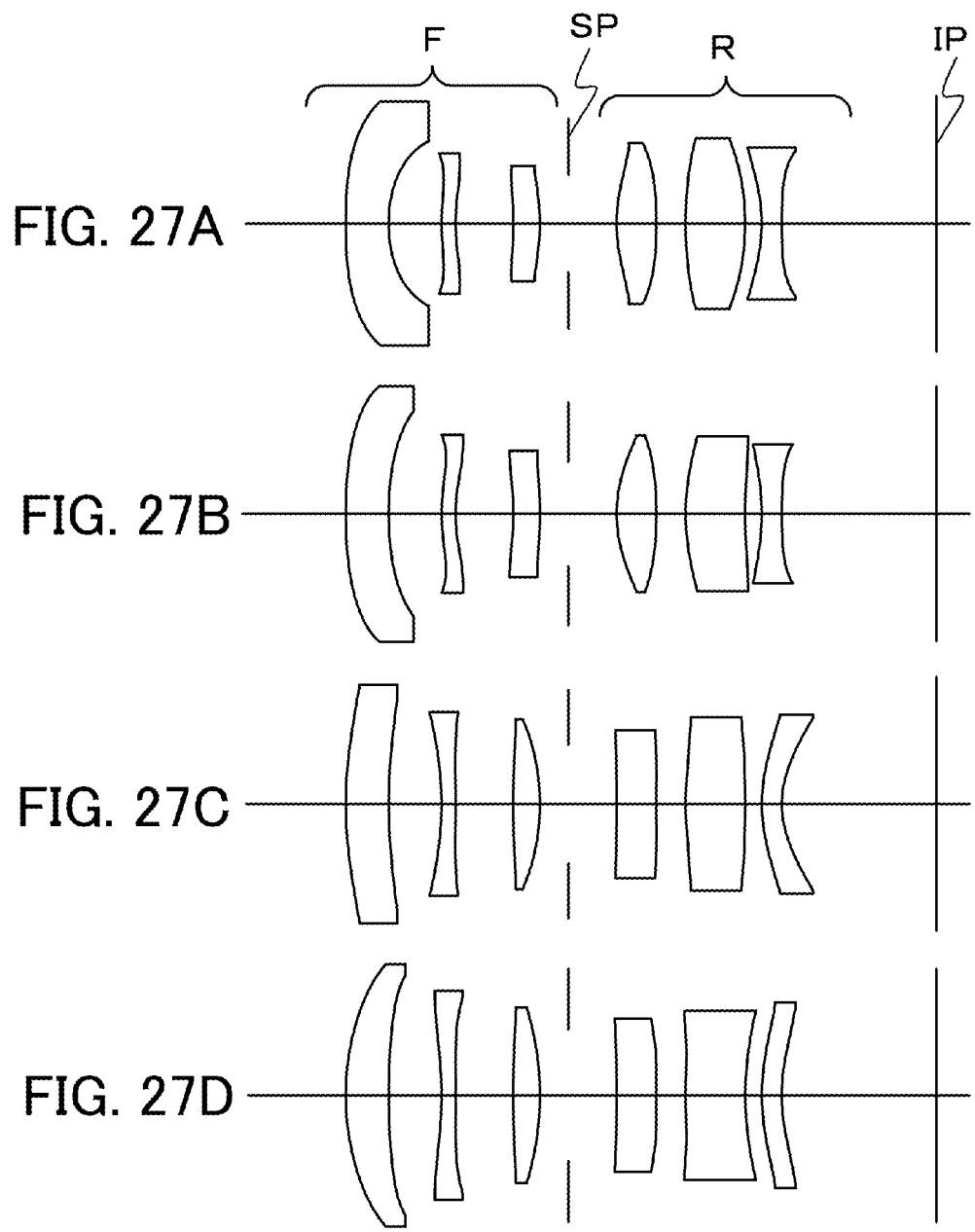

IMAGE PICKUP APPARATUS AND LENS APPARATUS

BACKGROUND OF THE INVENTION

1. Field of the Invention

The present invention relates to an image pickup apparatus and a lens apparatus.

2. Description of the Related Art

Japanese Patent Laid-Open No. ("JP") 2005-303694 proposes a compound-eye image pickup apparatus configured to capture an image so that short and long focus lenses having different angles of view may contain the same portion of the object. This compound-eye image pickup apparatus includes a zoomed-up image obtained from an image sensor corresponding to the long focus lens in a part of the image obtained from an image sensor corresponding to the short focus lens. JP 2001-330878 proposes an image pickup apparatus configured to switch a plurality of single focus lens units having different focal lengths and to move a lens unit on an optical axis which has a desired focal length for a light receiving unit in the photography. JP 2005-341301 proposes a compound-eye image pickup apparatus in which each ommatidium includes integrally molded, front and rear lens units.

JPs 2005-303694 and 2005-341301 cannot simultaneously obtain in-focus images having different angles of view in focusing with integrally molded lens units in a plurality of optical system having different focal lengths. When the lens units are not integrally molded, the in-focus image having different angles of view could be simultaneously obtained by individually controlling the lens units. However, it is necessary to provide a driver to each lens unit and to control each driver, causing the compound-eye image pickup apparatus to be larger or more structurally complicated. Similarly, JP 2001-330878 cannot simultaneously obtain in-focus images having different angles of view because there is a single image sensor provided to a plurality of optical systems.

SUMMARY OF THE INVENTION

The present invention provides an image pickup apparatus and lens apparatus, which can simultaneously obtain in-focus images having different angles of view and include a plurality of optical systems having different focal lengths.

An image pickup apparatus according to the present invention includes a plurality of imaging optical systems having different focal lengths and each configured to form an optical image of an object, and a plurality of image sensors having image pickup areas each corresponding to one of the plurality of imaging optical systems and each configured to photoelectrically convert the optical image formed by a corresponding one of the imaging optical systems. The image pickup apparatus is configured to simultaneously capture a plurality of images by controlling the plurality of imaging optical systems and the plurality of image sensors. Each imaging optical system includes a focus lens unit configured to move in focusing and a fixed lens unit that is fixed in the focusing. The image pickup apparatus further includes a focus driver configured to move a plurality of focus lens units by equal moving amounts.

Further features of the present invention will become apparent from the following description of exemplary embodiments with reference to the attached drawings.

BRIEF DESCRIPTION OF THE DRAWINGS

FIGS. 13A-13D are lens sectional views of a wide angle ommatidium, a wide-angle-middle ommatidium, a telephoto-middle ommatidium, and a telephoto ommatidium in a compound-eye optical system according to a second embodiment of the present invention.

FIGS. 15A-15D are lens sectional views of a wide angle ommatidium, a wide-angle-middle ommatidium, a telephoto-middle ommatidium, and a telephoto ommatidium in a compound-eye optical system according to a third embodiment of the present invention.

FIGS. 23A to 23D are lens sectional views of a wide angle ommatidium, a wide-angle-middle ommatidium, a telephoto-middle ommatidium, and a telephoto ommatidium in a compound-eye optical system according to a fifth embodiment of the present invention.

FIGS. 27A-27D are lens sectional views of a wide angle ommatidium, a wide-angle-middle ommatidium, a telephoto-middle ommatidium, and a telephoto ommatidium in a compound-eye optical system according to a sixth embodiment of the present invention.

DESCRIPTION OF THE EMBODIMENTS

Figure 1:
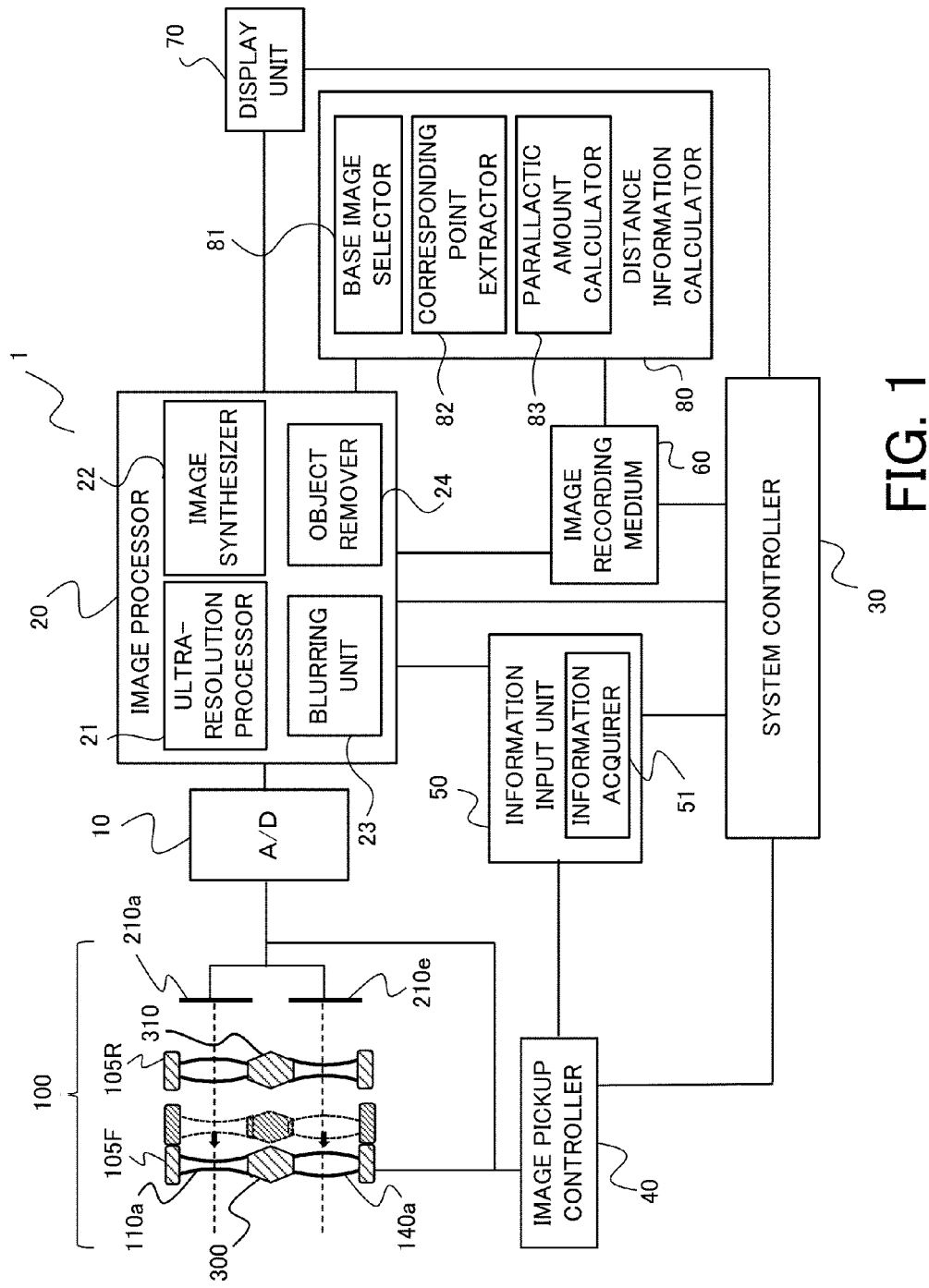
FIG. 1 is a block diagram of a compound-eye image pickup apparatus according to this embodiment.

An image pickup apparatus according to this embodiment is configured to control a plurality of imaging optical systems and a plurality of image sensors so as to simultaneously capture a plurality of images. This embodiment arranges a plurality of single focus optical systems as image pickup systems having different focal lengths, and provides zooming with image sensors each having an image pickup area corresponding one of the plurality of image pickup optical systems. A plurality of image sensors may be provided or the image pickup area of one image sensor may be divided. It simultaneously captures a plurality of in-focus images having different angles of view for a continuous zooming function. There is known a digital zooming unit configured to provide a pseudo zooming effect by trimming part of an angle of view of an image captured by the image pickup apparatus, and by enlarging the trimmed range to a predetermined size. There is also known a zoom lens having a higher magnification varying ratio which combines digital zooming with optical zooming.

By applying this technique, a compound-eye image pickup apparatus that includes imaging optical systems having different angles of view and interpolates different angles of view using the digital zoom technology can obtain the same effect as the pseudo zooming.

Nevertheless, the conventional digital zooming uses a linear interpolation (bilinear method) and thus may deteriorate an image of the digital zoom area. Moreover, the image quality (resolution) decreases as the digital zoom magnification increases. One proposed solution for this problem is the ultra-resolution technology, such as the ML (Maximum-Likelihood) method, the MAP (Maximum A Posterior) method, and the POCS (Projection Onto Convex Set) method. Another known ultra-resolution technology contains the IBP (Iterative Back Projection) method, the LR (Lucy-Richardson) method, etc.

The LR method normalizes an illuminance distribution in an original image and an illuminance distribution in a deteriorated image, and converts each distribution into the probability density function. The point spread function ("PSF") as a transmission characteristic of an optical system can be recognized as a distribution of the probability density function of the conditional probability. The distribution of the original image is estimated based upon the Bayesian statistics, the repetitive calculation using the maximum likelihood estimation, and the deteriorated image distribution and the PSF distribution.

A description will now be given of an image restoring method based on the Bayesian statistics. For a simple description, a monochromatic one-dimensional image will be discussed. Now assume that an object is called an original image, an image captured by an image pickup apparatus or an image made by electrically enlarging the captured image is called a deteriorated image, a restoration of the deteriorated image to an image close to the original image using an image restoring method is called a ultra-resolution technology, and a restored image is called a high resolution image.

The following expression is satisfied between a deteriorated image g(x) expressed by a one-dimensional vector and an original image f(x) expressed by the one-dimensional vector to the deteriorated image where h(x) denotes a PSF of the optical system:

$$g(x)=h(x)*f(x) \tag{1}$$

The Bayesian statistics constitutes the (post) probability to the reversal course by using the Bayes's theorem from the forward course in which the original image is converted into the deteriorated image, and estimates the original image from the deteriorated image based upon the result. The Bayes's theorem is expressed as follows where P(f(x)) is a probability density function of an event in which the original image f exists, P(g(x)) is a probability density function of an event in which the deteriorated image g exists, P(g(x)|f(x)) denotes a conditional probability density function ( ) of the deteriorated image g when the original image f is provided. P(g(x)|f(x)) is called a posterior probability density function.

$$P(f(x)|g(x)) = \frac{P(g(x)|f(x))P(f(x))}{P(g(x))} \tag{2}$$

Assume that when the Bayes's theorem is established for f and g, then f and g are normalized and P and g can be treated as a probability density function. The following expressions are established where $f(x_1)$ denotes an event in which a point light source exits at a coordinate $x_1$ in the original image, and $g(x_2)$ denotes an event in which an image is formed at a coordinate $x_2$ in the deteriorated image:

$$P(f(x_1))=f(x_1) \tag{3}$$

$$P(g(x_2))=g(x_2) \tag{4}$$

The following expression is established with $P(g(x_2)|f(x_1))$ and "h" as a PSF of the optical system:

$$P(g(x_2)|f(x_1)) = h(x_2 - x_1) \quad (5)$$

The distribution of the original image used to form an image at the coordinate $x_2$ in the deteriorated image can be estimated based upon the expressions (2) to (5):

$$P(f(x)|g(x_2)) = \frac{h(x_2 - x)f(x)}{g(x_2)} \quad (6)$$

The following expression is established based upon the definition of the marginal probability:

$$P(g(x)) = \int_{-\infty}^{\infty} P(f(x), g(x))dx = \int_{-\infty}^{\infty} P(g(x)|f(x))P(f(x))dx \quad (7)$$

The expression (6) can be converted as follows:

$$P(f(x)|g(x_2)) = \quad (8)$$

$$\frac{h(x_2 - x)f(x)}{\int_{-\infty}^{\infty} P(g(x_2)|f(x_1))P(f(x_1))dx_1} = \frac{h(x_2 - x)f(x)}{\int_{-\infty}^{\infty} h(x_2 - x_1)f(x_1))dx_1}$$

When both sides are multiplied by $P(g(x2)) = g(x2)$ and then integrated, following expression is established based upon the left and right sides of the expression (8):

Left side of the Expression (8)=

$$= \int_{-\infty}^{\infty} P(f(x)|g(x_2))P(g(x_2))dx_2 = P(f(x)) = f(x) \quad (9)$$

Right side of the Expression (8)

$$= f(x) \int_{-\infty}^{\infty} \frac{h(x_2 - x)g(x_2)}{\int_{-\infty}^{\infty} h(x_2 - x_1)f(x_1))dx_1} dx_2 \quad (10)$$

The above relationship is established when f(x) is a true original image. In other words, calculating f(x) corresponds to the restoration of the deteriorated image.

A convergent value of $f_k$ or a distribution of the original image can be obtained by the repetitive calculation with the following expression by replacing f(x) in the expression (9) with $f_{k+1}(x)$ and f(x) in the expression (10) with $f_k(x)$:

$$f_{k+1}(x) = f_k(x) \int_{-\infty}^{\infty} \frac{h(x_2 - x)g(x_2)}{\int_{-\infty}^{\infty} h(x_2 - x_1)f(x_1))dx_1} dx_2 \quad (11)$$

The image restoring method based upon Bayesian statistics can restore the unknown original image if the deteriorated image and the transmission characteristic of the optical system are known, and can restore the transmission characteristic of the optical system if the deteriorated image and the original image corresponding to it are known. An optical transmission function ("OTF") may be used instead of the PSF.

The MAP method finds f(x) which maximizes the posterior probability density as follows:

$$f(x) = \mathrm{argmax} P(f(x)|g(x)) \partial P(g(x)|f(x)) P(f(x)) \quad (12)$$

Two images can also be expressed by considering that a Gauss noise n is added to a deteriorated image, and h(x) given as the PSF of the optical system denotes a linearly operating m×m convolution matrix C.

$$g(x) = C \times f(x) + n \quad (13)$$

The matrix C may contain a deteriorating factor that originates the image pickup system in addition to the PSF.

In the expression (12), f(x) that maximizes the posterior probability density function is calculated by finding f(x) that minimizes the following evaluation function based upon the expression (12):

$$T(f) = ||g(x) - C \times f(x)||^2 + \alpha Z(f) \quad (14)$$

Z(f) denotes a restraint function containing the smoothness of the image and a restraint term from the additional condition, and α denotes a weighting factor. A conventional steepest descent method etc. can be used to miniaturize the evaluation function. Calculating f(x) that minimizes the expression (14) corresponds to the restoration of the deteriorated image.

It is necessary to set an initial presumption distribution f(x) in order to restore the deteriorated image utilizing the expressions (11) and (14) and the evaluation function, and the initial presumption distribution generally utilizes g(x) as the deteriorated image having the same image pickup magnification as that of the restored image. Although the transmittance characteristic of the optical system such as the PSF or the OTF and the restraint term obtained based upon the additional condition and the restraint condition are important, the transmission characteristics of the optical system depends upon a parameter, such as the aberration of the lens, an illumination wavelength, and an aperture of an image sensor, and it is generally difficult to precisely evaluate it.

When a Gaussian distribution is used as the PSF of the initial condition, it is rare in the actual image pickup system that the PSF accords with the Gaussian distribution and this method causes an increase of an estimated error. When the PSF is estimated from the deteriorated image, lots of information is lost in the deteriorated image and it is difficult to estimate a precise PSF.

Figure 4:
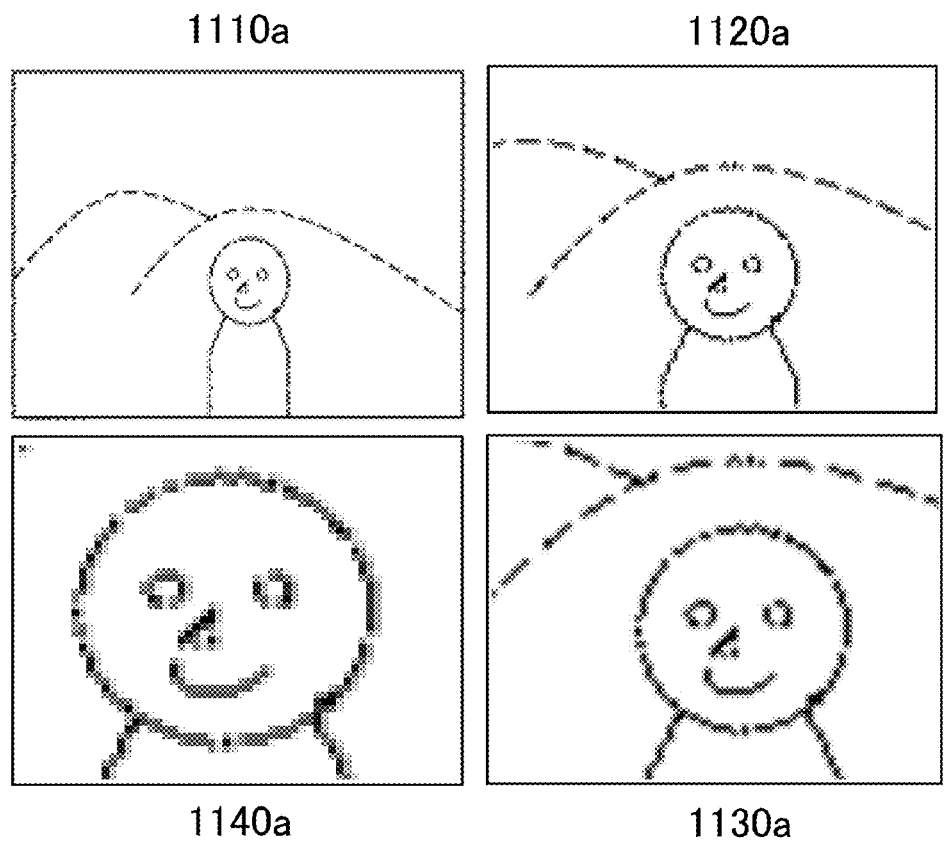
FIG. 4 is an example of an image captured by each imaging optical system illustrated in FIG. 3.

Accordingly, the accuracy is improved by adding a new strong constraint condition to the ultra-resolution technology, such as a high resolution image having an image pickup magnification different from that of the deteriorated image to be restored. The images having the different image pickup magnification are images 1110a and 1140a captured with different angles of view for the same object as illustrated in FIG. 4, and thereby detailed information in a partial area in the deteriorated image can be obtained.

For example, the PSF in a deteriorated image central area in which a main object exists is accurately estimated on the basis of the high-resolution image and the restoration becomes more accurate than the conventional method by the repetitive calculation of the expression (11). Since details in the partial area in the deteriorated image is previously acquired, the restoration becomes highly accurate by adding a correlation function in which an evaluated value depends upon a correlation between the high resolution image and the partial area in the deteriorated image to the restraint function in the expression (14). Since the detailed information on an area as wide as possible in the deteriorated image provides a highly accurate restoration, a plurality of optical systems having stepwise different focal lengths may be gradually arranged.

As a simple method, an image at an intermediate angle of view can be obtained in which the resolution is partially high and partially low, by setting a telephoto image obtained from an image sensor corresponding to a telephoto lens to a part of the image obtained by digital zooming.

The continuous zoom function in a compound-eye image pickup apparatus needs a simultaneous capturing configuration of in-focus images having a plurality of different angles of view. The effect of the above method impairs if there is a defocus image contained and then the continuous zoom function with a high resolution cannot be realized.

When the compound-eye image pickup apparatus including a plurality of imaging optical systems having different focal lengths attempts to simultaneously obtain in-focus images having different angles of view, if the plurality of imaging optical systems are independently designed, moving amounts of the focus units in focusing are different among them and a driver is necessary for each imaging optical system. For example, a driving motor is necessary for each imaging optical system, and lead screws and gears with different pitches are required even when the driving motor can be shared. As a result, an image pickup apparatus becomes larger and a focus driver becomes structurally complex.

In order to simplify the focus driver in the plurality of image pickup optical systems having different focal lengths, it is necessary equalize a moving amount of each focus unit in focusing. One measure is to hold the plurality of focus units (focus lens units) in a common moving frame etc., or to hold integrally molded focus units.

Figure 19:
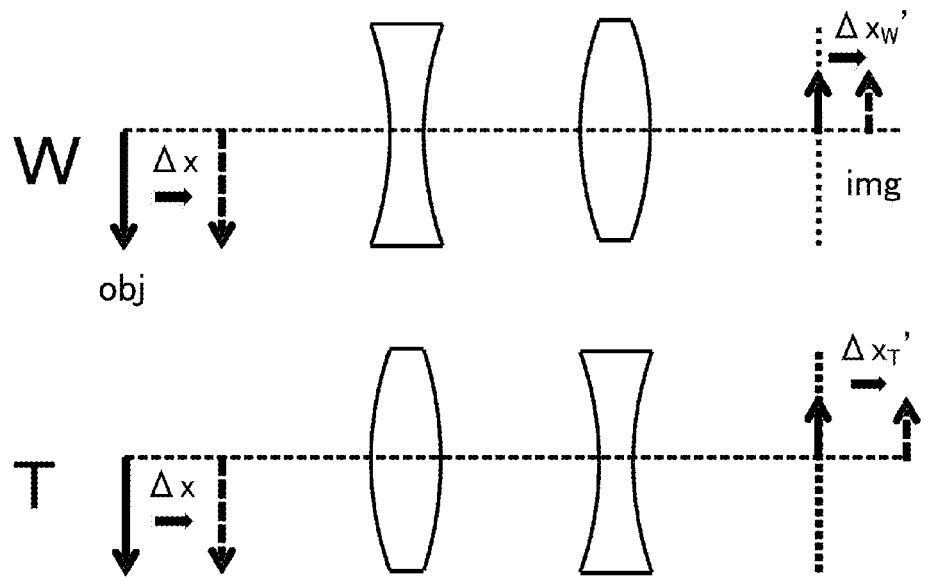
FIG. 19 is an explanatory view of image plane movements as an object distance fluctuates.
Figure 22:
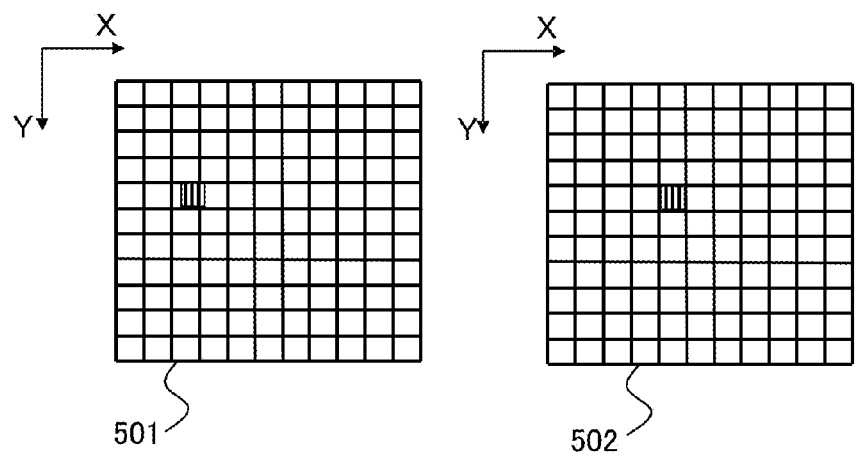
FIG. 22 is an explanatory view of a method of extracting a corresponding point in S36 in FIG. 7.
Figure 24A:
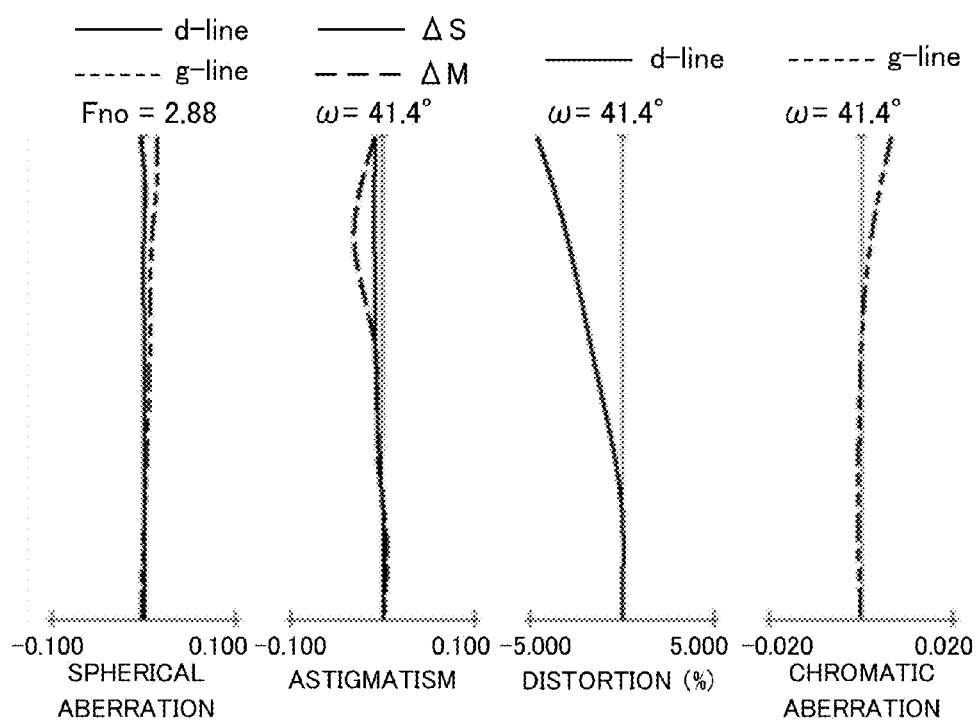
FIGS. 24A-24D are aberrational diagrams at a wide angle end, a wide-angle-middle position, a telephoto-middle position, and a telephoto end according to a numerical example 5 corresponding to the compound-eye optical system that illustrates in FIGS. 23A-23D according to the fifth embodiment.
Figure 24B:
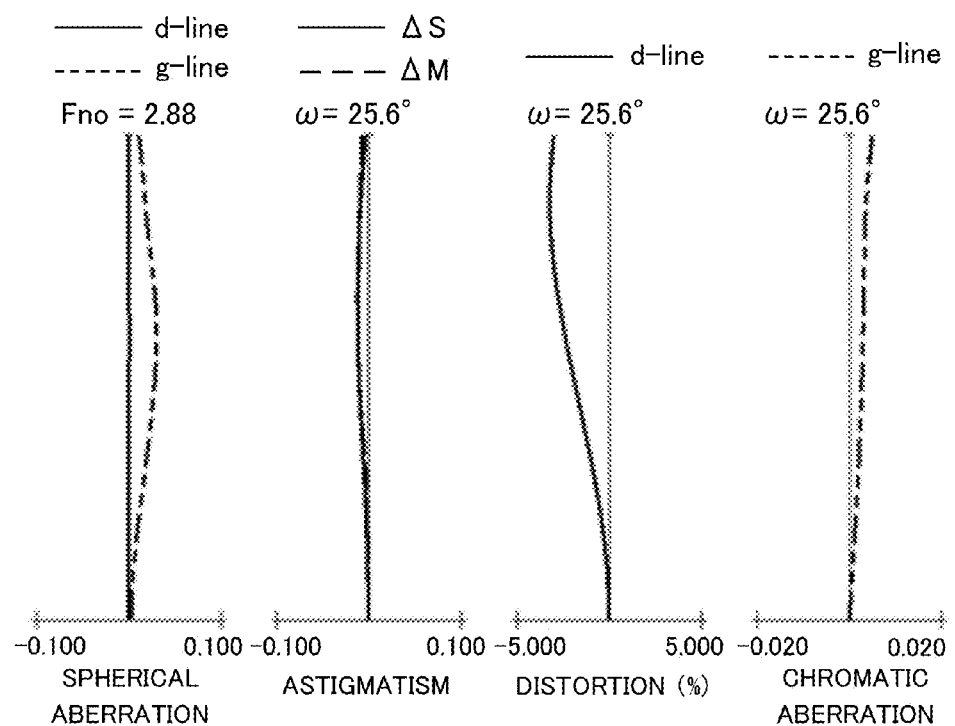
Figure 24C:
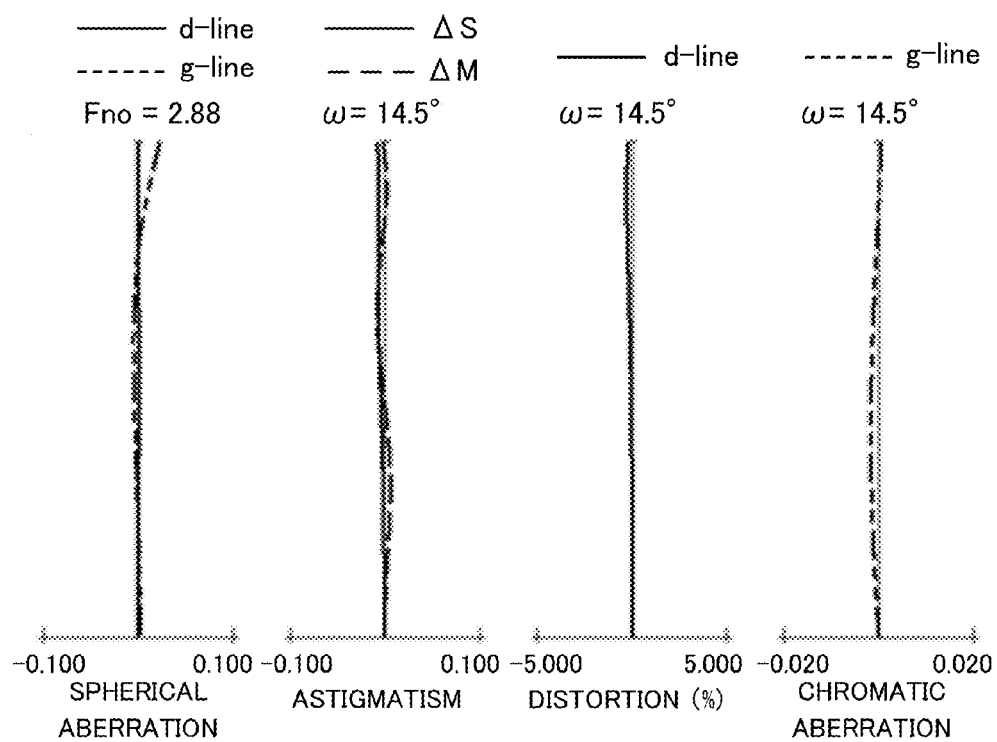
Figure 24D:
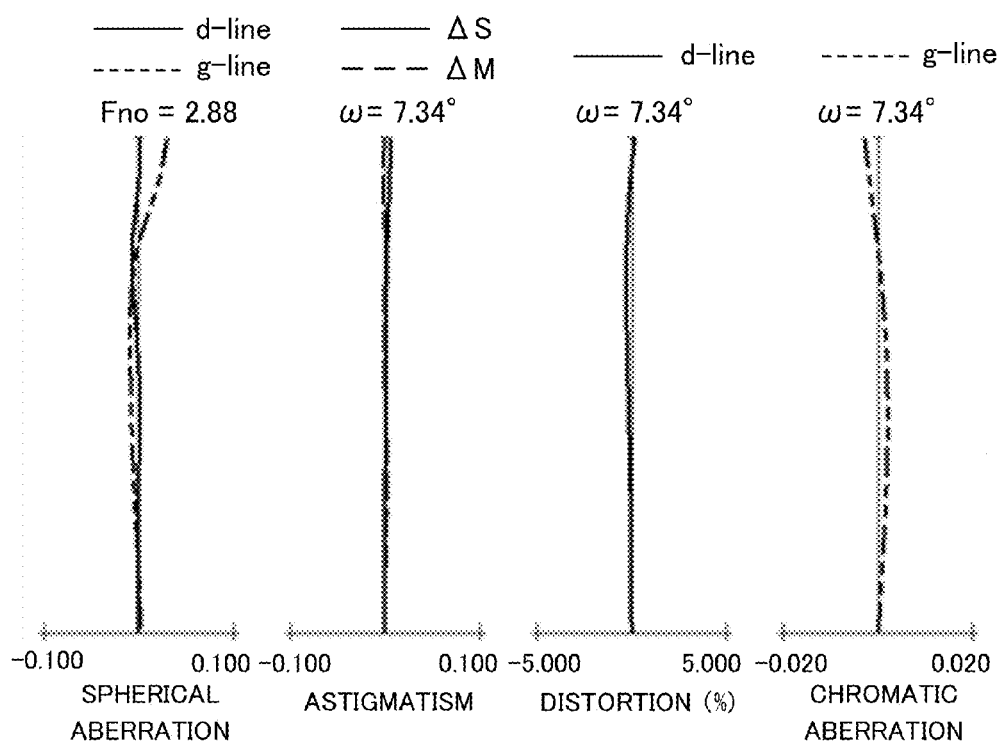

Referring now to FIGS. 19 and 22 for the paraxial arrangement of the optical system, the following expression is established from the Newton's expression where x denotes a distance from an object side focus of the imaging optical system having a focal length f to an object (obj), and x' denotes a distance from the image side focus to the image plane (img):

$$xx' = -f^2 \qquad (15)$$

Based upon the expression (15), an image plane moving amount $\Delta x'$ is expressed when the object moves by $\Delta x$ as follows:

$$\Delta x' = \frac{-f^2 \cdot \Delta x}{x(x + \Delta x)} \qquad (16)$$

Based upon the expression (16), an image plane moving amount is proportional to the square of a focal length f of the imaging optical system when a certain object distance fluctuates. In other words, a ratio between image plane moving amounts $\Delta x_W'$ and $\Delta x_T'$ for an object distance fluctuation $\Delta x$ is given as follows where $f_W$ is a focal length of a W (wide angle) optical system illustrated in FIG. 19, and $f_T$ is a focal length of a T (telephoto) optical system:

$$\frac{\Delta x_T'}{\Delta x_W'} = \frac{f_T^2}{f_W^2} \qquad (17)$$

Based upon the expression (17), as illustrated in FIG. 19, an image plane moving amount $\Delta x_T$ of the telephoto optical system is made larger than an image plane moving amount $\Delta x_T'$ of a wide angle optical system by a square ratio of the focal length when the same object is imaged by the optical systems having different focal lengths.

Focusing configured to move the entire optical system in the optical axis direction according to the object distance is known as entire feeding in forming an in-focus image on a sensor plane. When each entire optical system is fed for focusing, there is a one-to-one correspondence relationship between a feeding amount of the optical system and an amount of an image plane fluctuation, and the entire feeding amounts of each optical system become $\Delta x_W'$ and $\Delta x_T'$ for the image formation on the sensor plane. Since it is necessary to feed the telephoto optical system longer than the wide-angle optical system by a square ratio of the focal length, it is difficult to integrally drive them, the separate drivers are necessary, and the focus driver becomes complex.

Figure 20:
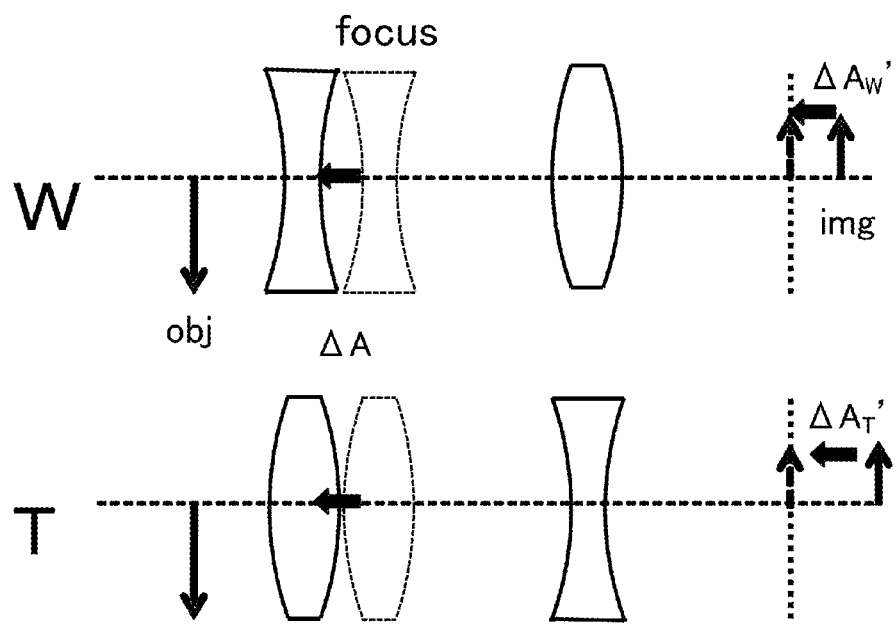
FIG. 20 is an explanatory view of an image plane correction as a focus unit moves.

Accordingly, as illustrated in FIG. 20, this method adopts partial focusing configured to move part of the optical system in focusing. The partial focusing of the lens contains front focusing configured to move a first lens unit on the object side, and inner or rear focusing configured to move the second or subsequent lens unit. Herein, positional sensitivity ES to an image plane positional fluctuation as the focus unit F moves in the optical axis direction is expressed by the following expression where $\beta_F$ denotes a lateral magnification of the focus unit and $\beta_R$ denotes a lateral magnification of an image side unit R arranged on the image side of the focus unit F:

$$ES = (1 - \beta_F^2) \cdot \beta_R^2 \qquad (18)$$

When there is no lens unit on the image side of the focus unit F as in the rear focusing, the lateral magnification $\beta_R$ becomes 1, and the positional sensitivity ES becomes $ES = 1 - \beta_F^2$. An image plane moving amount $\Delta A'$ as the focus unit moves is expressed by the following expression where $\Delta A$ denotes a moving amount of the focus unit F in focusing:

$$\Delta A' = \Delta A \cdot ES \qquad (19)$$

In other words, in the partial focusing, the object distance fluctuation expressed by the expression (16) may be equal to an image plane moving amount $\Delta A'$ caused by the focus unit movement $\Delta A$ expressed by the expression (19). After all, in order to correct an image plane fluctuation caused by the image plane moving amount $\Delta x'$ in the optical system that includes the focus unit that has certain positional sensitivity ES, the focus unit may be moved only by $\Delta A$ expressed by the following expression:

$$\Delta A = \frac{\Delta x'}{ES} \qquad (20)$$

Assume that $f_W$ denotes a focal length of the W (wide angle) optical system illustrated in FIG. 20, $F_T$ denotes a focal length of the T (telephoto) optical system, $\beta_{FW}$ denotes a lateral magnification of the focus unit in the W optical system, $\beta_{RW}$ denotes a lateral magnification on the image side unit in the W optical system, $\beta_{FT}$ denotes a lateral magnification of the focus unit in the T optical system, and $\beta_{RT}$ denotes a lateral magnification of the image side unit in the T optical system. Then, the positional sensitivities $ES_W$ and $ES_T$ of the focus units of the respective optical systems are expressed by the following expressions:

$$ES_W = (1 - \beta_{FW}^2) \cdot \beta_{RW}^2 \qquad (21)$$

$$ES_T = (1 - \beta_{FT}^2) \cdot \beta_{RT}^2 \qquad (22)$$

The conditional expression used for an image plane correction of image plane moving amounts $\Delta x_W'$ and $\Delta x_T'$ by the same moving amount $\Delta A$ of each focus unit which is caused by the object moving amount $\Delta x$ illustrated in illustrated in FIG. 19 is as follows based upon the expressions (20), (21), and (22):

$$\Delta A = \frac{\Delta x_W'}{ES_W} = \frac{\Delta x_T'}{ES_T} \qquad (23)$$

The expression (23) becomes as follows based upon the expression (17):

$$\frac{ES_W \cdot f_T^2}{ES_T \cdot f_W^2} = 1 \quad (24)$$

The expression (24) is a paraxial conditional expression to be satisfied so as to equalize moving amounts of the focus lenses in the optical systems having different focal lengths, and the optical system used for this embodiment uses the lateral magnifications of the focus unit F and the image side unit R so as to satisfy the expression (24). The conditional expression (24) indicates that focusing moving amounts can be made equal when the square ratio of the focal length is equal to a ratio of the focus unit positional sensitivity in the optical systems having different focal lengths.

The positional sensitivity of the focus unit may fall within the permissible circle of confusion diameter δ even when it does not exactly satisfies the expression (24). For example, assume a defocus amount as a difference between the image plane moving amount Δx' and the image plane moving amount ΔA by the focus unit may satisfy the following expression when a diameter of the circle of confusion δ is about 1/500 to 1/1000 as long as the image pickup planes (image circle):

$$|\Delta x' - \Delta A'| < (F\ \text{number}) \times \delta$$

Thus, as long as an actual optical system satisfies the following conditional expression (25), a defocus amount falls within the depth of focus of the optical system, and the in-focus images can be simultaneously acquired with the same moving amount of the focus unit:

$$0.8 < \frac{ES_W \cdot f_T^2}{ES_T \cdot f_W^2} < 1.2 \quad (25)$$

The expression (25) can be converted as follows:

$$0.8 < \frac{(1-\beta_{Fi}^2)\beta_{Ri}^2 \times f_h^2}{(1-\beta_{Fh}^2)\beta_{Rh}^2 \times f_i^2} < 1.2 \quad (25')$$

Herein, $\beta_{Fi}$ and $\beta_{Fh}$ are lateral magnifications of focus lens units in arbitrary imaging optical systems i and h among the plurality of imaging optical systems, $\beta_{Ri}$ and $\beta_{Rh}$ are lateral magnifications of entire image side units located on an image side of the focus lens units in the arbitrary imaging optical systems i and h, and $f_i$ and $f_h$ are focal lengths of the arbitrary imaging optical systems i and h. Hereinafter, each of the expression (25) and (25') is simply referred to as the expression (25).

In other words, in order to simultaneously obtain in-focus images having different angles of view and to simplify the focus driver, it is important to integrally hold each focus units in the optical systems having different focal lengths, to satisfy the expression (25), and to equalize moving amounts in focusing.

Another embodiment equalizes a moving amount of a focus unit in each optical system in a small image pickup apparatus configured to simultaneously capture in-focus images having a plurality of different angles of view.

Figure 25:
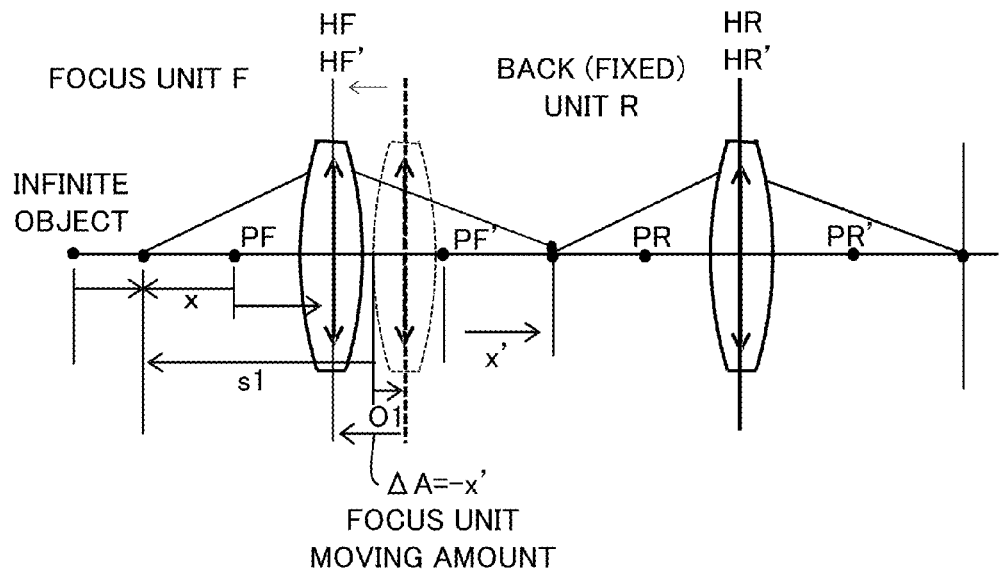
FIG. 25 is a sectional view for explaining a relationship between an object distance fluctuation and an image plane moving amount.

Referring now to FIG. 25, a description will be given of a relationship between the image plane moving amount and the object distance fluctuation. FIG. 25 is a schematic view of focusing a unit that contains the lens closest to the object. Assume that F denotes a focus (lens) unit, ΔA denotes a moving amount of a focus unit, R denotes a lens unit that arranged on the image side of the focus lens and is fixed in focusing, and it is defined as a reference state when the object is infinitely distant (or an image is formed on an image plane with a focus moving amount ΔA=0).

In FIG. 25, a focus unit in a broken line represents a focus unit in the reference state. Assume that HF denotes a front principal point position of the focus unit, HF' denotes a back principal point position of the focus unit, HR denotes a front principal point position of the rear unit, HR' denotes a back principal point position of the rear unit, PF denotes a front principal point position of the focus unit, PF' denotes a back principal point position of the focus unit, PR denotes a front focus position of the rear unit R, and PR' denotes a back focus position of the rear unit R.

In FIG. 25, the optical system is so simple that the principal positions HF and HF' accord with each other, and the principal positions HR and HR' accord with each other. However, this is not always the case in the actual optical system. The following expression is established where ff denotes a focal length of the focus unit F, x is a distance from the front focus position PF of the focus unit F to the object, and x' is a position from the back focus position PF' to the imaging position of the focus unit F.

$$xx' = -ff^2 \quad (26)$$

Since the distance x becomes infinite in the reference state, x'=0 is met from the expression (26) or the back focus potion PF' of the focus unit F accords with the imaging plane position of the focus unit F.

As illustrated in FIG. 25, when the optical system is divided into the focus unit F and the rear unit R, it is considered that the image formed by the focus unit F is imaged by the rear unit R on the image plane. Since the rear unit R is a fixed unit in focusing in this optical system, the position of the imaging plane of the focus unit F must be always constant in order to form an image of the object on the same position. Hence, in order to always form an image of the object at the position of the image plane in the reference state, the focus unit F may be moved by the distance x' when the object is distant by the distance x. The moving amount of the focus unit is expressed as follows where a movement to the object side is negative and a movement to the image plane side is positive.

$$\Delta A = -x' \quad (27)$$

The distance x from the front focus position PF to the object is expressed by the following expression where S1 denotes a distance from a surface closest to the object in the optical system in the reference state to the object, and O1 denotes a distance from the surface closest to the object in the optical system to the front principal point position HF in the focus unit:

$$x = (S1 - O1 + ff + x') \quad (28)$$

The following expression is obtained based upon the expressions (26) to (28).

$$\Delta A^2 (S1 - O1 + ff)\Delta A + ff^2 = 0 \quad (29)$$

If ΔA is made the subject of the expression, the following expression is obtained.

$$\Delta A = \frac{-(O1 - S1 - ff) \pm \sqrt{(S1 - O1 + ff)^2 + 4ff^2}}{2} \quad (30)$$

The imaging plane of the object in the optical system can be always maintained constant by setting a moving amount of the focus lens so that it satisfies the expression (30).

Figure 26:
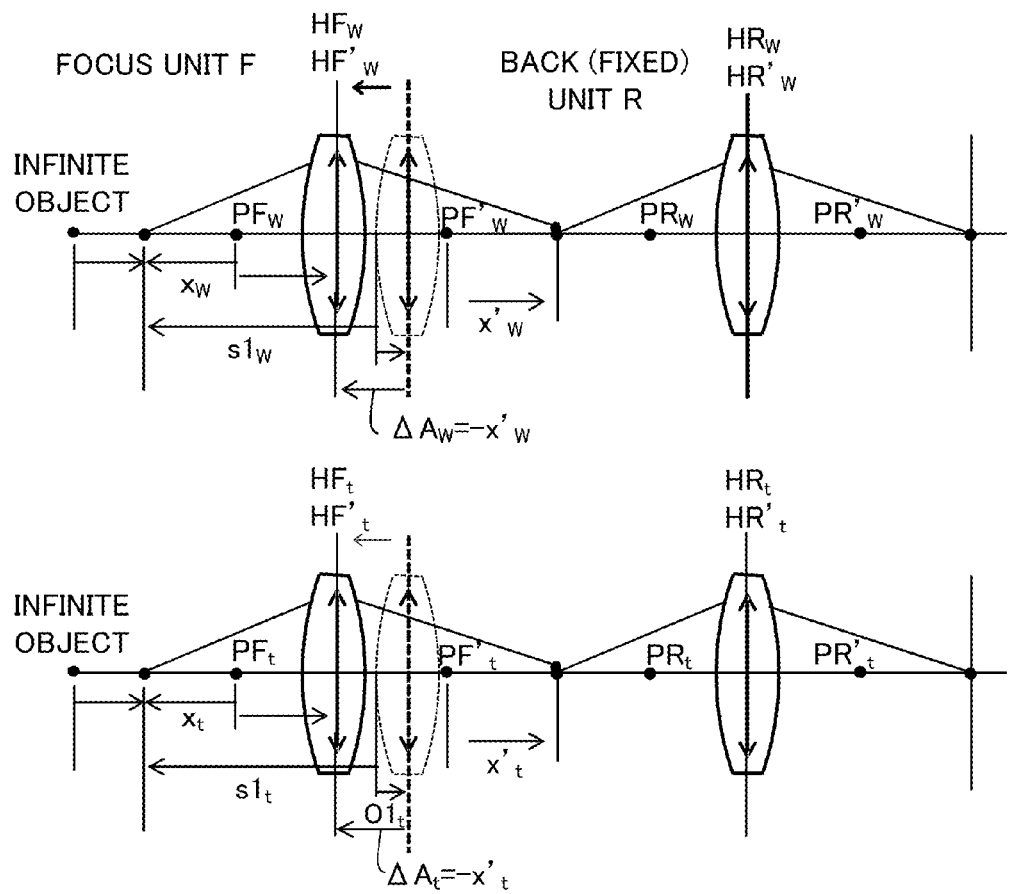
FIG. 26 is a sectional view for explaining a relationship between the object distance fluctuation and the image plane moving amount in two optical systems having different focal lengths.
Figure 28A:
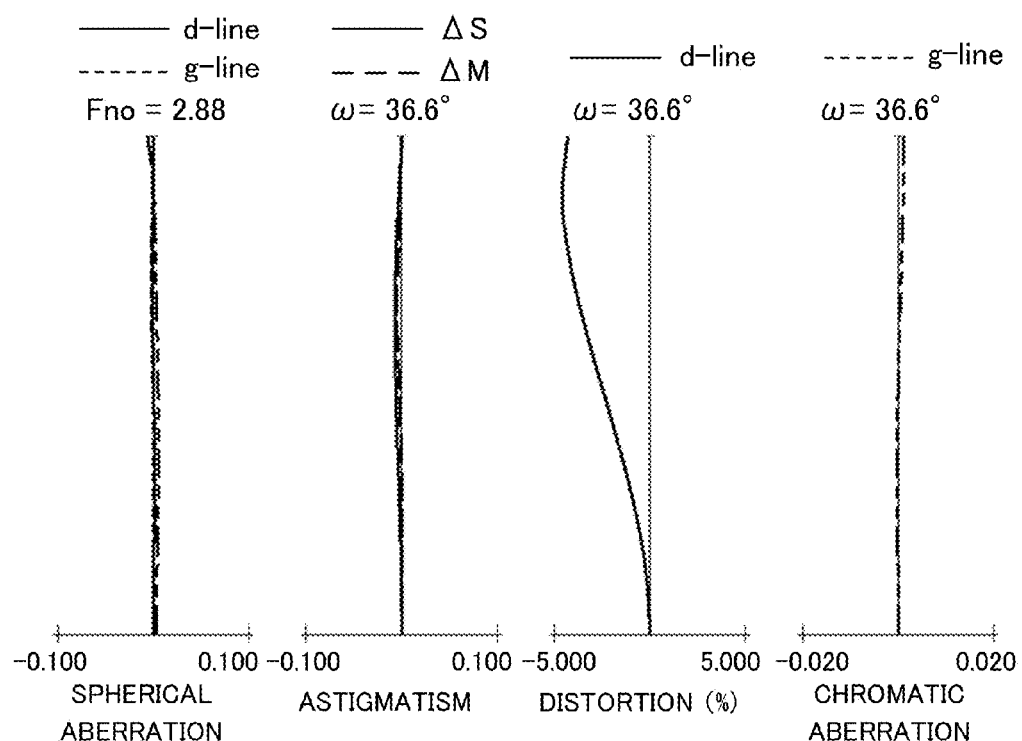
FIGS. 28A-28D are aberrational diagrams at a wide angle end, a wide-angle-middle position, a telephoto-middle position, and a telephoto end according to a numerical example 6 corresponding to the compound-eye optical system that illustrates in FIGS. 27A-27D according to the sixth embodiment.
Figure 28B:
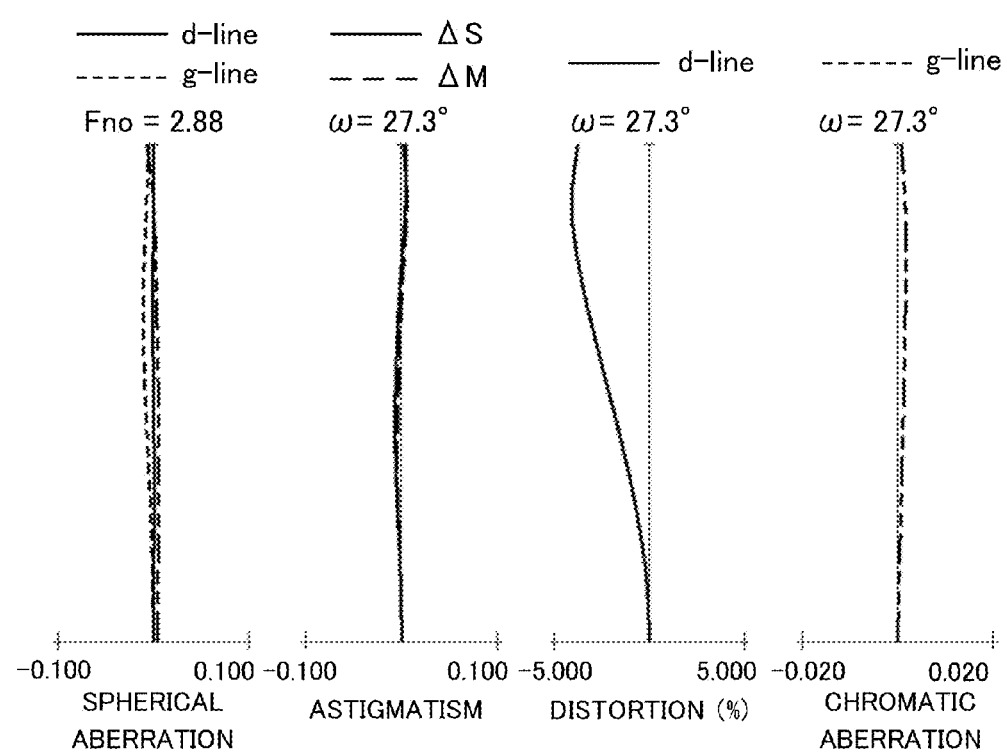
Figure 28C:
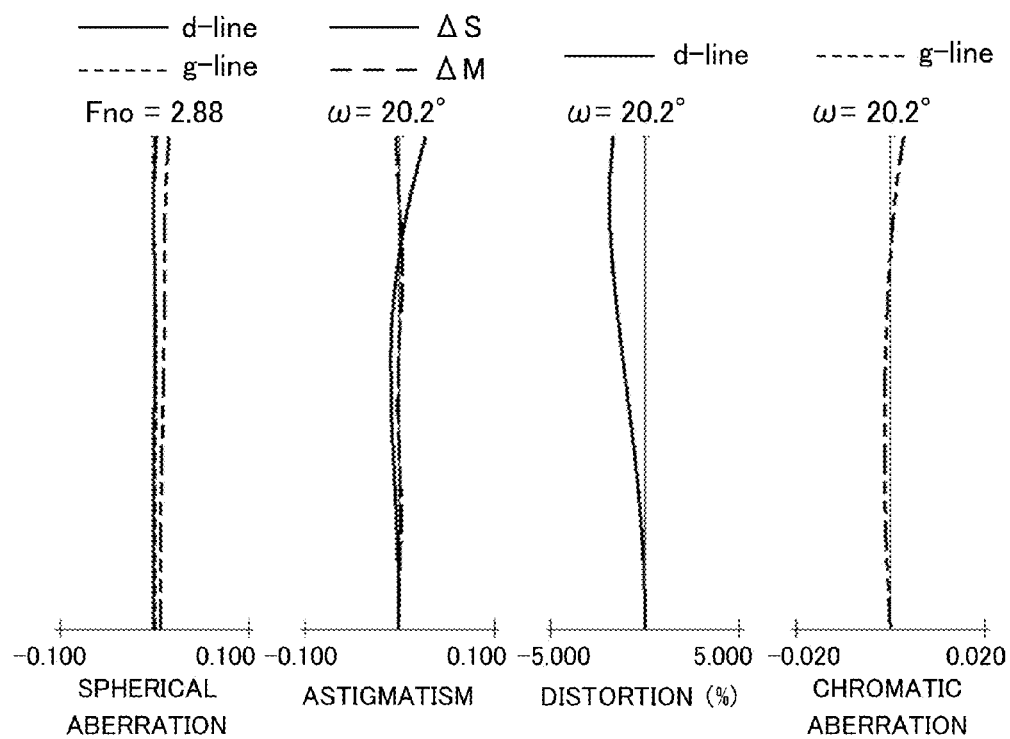
Figure 28D:
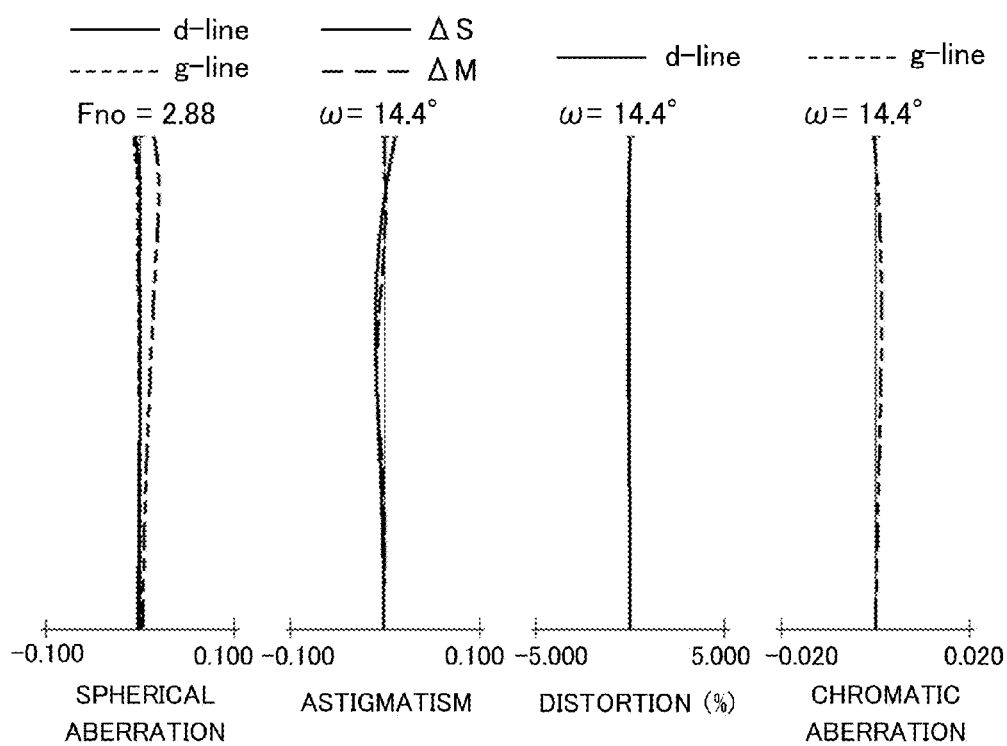

FIG. 26 is a sectional view for explaining a relationship between an object distance fluctuation and an image plane moving amount in two optical systems having different focal lengths. Any one of the optical systems provide focusing with lens units Fw and Ft including the lens closest to the object. In order to equalize moving amounts of focus units of the two optical systems, a moving amount ΔAw of the focus unit of the optical system on the wide angle side needs to be equal to a moving amount ΔAt of the focus unit of the optical system on a telephoto side. Thus, the condition of ΔAw=ΔAt may be established. In order for each optical system to satisfy the expression (30) or in order for the two optical systems to equalize the moving amounts, the following two expressions may be satisfied:

$$S1_w - O1_w + f\!f_w = S1_t - O1_t + f\!f_t \quad (31)$$

$$f\!f_w^2 = f\!f_t^2 \quad (32)$$

Now assume that $f\!f_w$ and $f\!f_t$ denote focal lengths of the focus units, $S1_w$ and $S1_t$ denote distances from the surfaces closest to the object in the optical systems in the reference state to the object, and $HF_w$ and $HF_t$ denote front principal point positions of the focus units. $O1_w$ and $O1_t$ denote distances from the surfaces closest to the object in the optical systems to the front principal point positions $HF_w$ and $HF_t$ of the focus unit. A subscript w denotes a wide angle side and a subscript t denotes a telephoto side of the optical system.

Since the expression (32) means that the focal length of the focus unit has an equal absolute value, the focal length of the focus unit is classified into a positive value and a negative value.

When the focal length of the focus unit has a the same sign, the expression (31) can be converted as follows:

$$S1_w - O1_w = S1_t - O1_t \quad (33)$$

The left and right sides of the expression (33) mean distances from the front principal point positions $HF_w$ and $HF_t$ of the focus units to the object. By equalizing distances from the front principal point positions $HF_w$ and $HF_t$ of the focus units to the object to each other, an image plane moving amount caused by the object distance fluctuation can be made approximately equal to each other.

When the focal lengths of the focus units have opposite signs, the expression (31) can be modified as follows.

$$S1_w - O1_w - (S1_t - O1_t) + 2f\!f_w = 0 \quad (34)$$

When the focal lengths of the focus units have opposite signs, it is understood based upon the expression (34) that the image plane moving amount caused by the object distance fluctuation cannot be made equal to each other only by equalizing the distances from the front principal point positions $HF_w$ and $HF_t$ of the focus units to the object unlike the expression (33) in which they have the same sign. In order to make the image plane moving amount caused by the object distance fluctuation equal to each other, the distances from the front principal point positions $HF_w$ and $HF_t$ of the focus units to the object may not be equal to each other. A well-balanced state is obtained when the principal point position of the focus unit in each optical system shifts. The object sufficiently distant from the optical system so as to establish $f\!f_w \ll S1_w - O1_w$ is less influential but as the object approaches to the optical system its influence gradually increases. In focusing in each optical system in this state in which a moving amount of the focus unit is made constant, each optical system simultaneously can be focused upon a long distance object, but the other optical system cannot be focused upon a short distance object.

Accordingly, the other embodiment simultaneously obtains in-focus images having different angles of view by reducing a shift amount of the front principal point position of the focus unit and a shift amount of a focal length of the focus unit when the focal lengths of the focus units have the same sign. On the other hand, when the focal lengths of the focus units have opposite signs, the other embodiment enables in-focus images having different angles of view to be simultaneously obtained even for a short distance object by intentionally shifting the front principal point positions $HF_w$ and $HF_t$ of the focus units in the respective optical systems.

The focal lengths and the principal point positions of the focus units are not necessarily actually made equal to each other. Even if they shift due to the diffractions and aberrations, actual influence may be ignored if the shift falls within a diameter of a circle of confusion. Even under this influence, as described above, intentionally shifting the principal point position of the focus unit in each optical system provides a focus state better than that of equalizing it for a shorter distance object.

The following conditional expression may be satisfied where ffh and ffi are focal lengths of the focus units in the arbitrary imaging optical systems i and h among a plurality of imaging optical systems.

$$0.8 < |f\!fi/f\!fh| < 1.2 \quad (35)$$

The conditional expression (35) determines a condition for an equal focusing moving amount in arbitrary imaging optical systems having different focal lengths. When a value is higher than an upper limit in the conditional expression (35), a defocus amount of the imaging optical system i exceeds its depth of focus on the object side and the image is defocused when the focus unit is moved by the same amount for focusing in the imaging optical system h. When the value is lower than the lower limit of the conditional expression (35), a defocus amount of the imaging optical system i exceeds its depth of focus on the image side and the image is defocused when the focus unit is moved by the same amount for focusing in the imaging optical system h.

When the conditional expression (35) is satisfied, a defocus amount can fall within a depth of focus of an arbitrary imaging optical system and in-focus images having different angles of view can be simultaneously obtained by the same moving amount of the focus units.

Thus, by properly setting the focal length of the focus unit in each imaging optical system, a focusing moving amount can be made equal to each other in the image pickup optical systems having different focal lengths. Thereby, the in-focus images having different angles of view can be simultaneously obtained and the focus driver can be simplified.

The following conditional expression may be satisfied where Ofh denotes a distance from the front principal point position of the focus unit in the imaging optical system h to the image plane, Ofi denotes a distance from the front principal point position of the focus unit in the imaging optical system i to the image plane, and $f_t$ denotes a focal length of the imaging optical system having the longest focal length:

$$|(\Delta Of + \Delta f)/ft| < 2.1 \quad (36)$$

Herein, $\Delta f = ffi - ffh$ and $\Delta Of = Ofi - Ofh$ are established. The conditional expression (36) determines a relationship between a principal point position of the focus unit in each imaging optical system and a focal length of the focus unit so as to provide focusing upon the object at an arbitrary distance in the compound-eye optical system and to simultaneously acquire the in-focus images having different angles of view. When the condition of the conditional expression (36) is satisfied, in-focus images having different angles of view can be simultaneously obtained for a short distance object with the same moving amount of the focus unit.

When the conditional expression (35) is satisfied, in-focus images having different angles of view for an object distant from the first surface of the optical system to some extent can be simultaneously obtained but the conditional expression (36) needs to be satisfied so as to simultaneously acquire in-focus images having different angles of view for a shorter distance object.

When a value is higher than the upper limit of the conditional expression (36), a defocus amount of the imaging optical system i exceeds its depth of focus and the image is defocused when the focus unit is moved by the same amount in focusing upon a short distance object in the imaging optical system h. This is similar even when the imaging optical system h is replaced with the imaging optical system i: When the focus unit is moved by the same amount, the imaging optical system h is defocused due to a shift amount of the focal length of the focus unit and a shift of the front principal point position even when the imaging optical system i is focused. A smaller value on the right side of the conditional expression (36) is advantageous to focusing upon a short distance object.

The following conditional expression may be satisfied where Ofn denotes a distance between the image plane and the front principal point position of the focus unit having a negative refractive power in a plurality of imaging optical systems, and Ofp denotes a distance between the image plane and the front principal point position of the optical system of the focus unit having a positive refractive power in the optical system:

$$1.0 < Ofn/Ofp < 2.4 \quad (37)$$

The conditional expression (37) is a conditional expression to be satisfied for focusing upon an object at an arbitrary distance from the infinity to the short distance when focal lengths of the focus units in the imaging optical systems have different signs, and to simultaneously obtain in-focus images having different angles of view. For description purposes, assume that n denotes an imaging optical system in which the focus unit has a negative focal length, and p denotes an imaging optical system in which the focus unit has a negative focal length. When the focal lengths of the focus units have different signs, the position of the front focus position of the imaging optical system p is closer to the object than that of the imaging optical system n, and thus the in-focus images having different angles of view can be simultaneously obtained by shifting the front principal point position of the focus unit by that shift amount.

When a value is higher than the upper limit of the conditional expression (37), the distance from the front principal point position of the focus unit in the imaging optical system n to the image plane is longer than that of the imaging optical system p, and the overall lengths of the imaging optical systems are significantly different in an attempt to approach the actual lens position to the principal point position. Then, the overall length of the imaging optical system p is too long to correct the longitudinal chromatic aberration of the imaging optical system p. When the overall length of the imaging optical system p is long, the imaging optical system n needs to be longer and the compound-eye optical system becomes larger. Conversely, when only the principal point position is shifted by maintaining the same actual lens position among the imaging optical systems, the lens has such a wholly strong meniscus shape that a high order aberration and low sensitivity occur and it is difficult to restrain a variety of aberrations.

On the other hand, when the value is lower than the lower limit of the conditional expression (37), a shift amount of the front principal point position of the focus unit becomes excessively smaller to the shift amount of the front focus position of the focus unit, in-focus images having different angles of view cannot be simultaneously obtained with the same moving amount of the focus unit to a short distance object.

Thus, the conditional expression (37) needs be satisfied so as to simultaneously obtain in-focus images having different angles of view for a short distance object with the same moving amount of the focus unit. A shift amount at the front focus position can be corrected since the front principal point position of the focus unit is maintained in this range.

The following conditional expression may be satisfied where ffi denotes a focal length of the focus unit in an arbitrary imaging optical system i among a plurality of imaging optical systems, and ft is a focal length of the imaging optical system having the longest focal length.

$$0.5 < |ff i/ft| < 1.6 \quad (38)$$

The conditional expression (38) defines a condition for equal focusing moving amounts of the imaging optical systems having different focal lengths with a chromatic aberration and curvature of field reduced. When a value is higher than the upper limit of the conditional expression (38), a focusing moving amount is too large relative to the focal length of the imaging optical system, the overall length of the optical system becomes long, and the entire image pickup apparatus becomes larger. When the value is lower than the lower limit of the conditional expression (38), the focal length of the focus unit becomes too small relative to the focal length of the imaging optical system, and it becomes difficult to correct a focus change, such as the curvature of field and the chromatic aberration.

For easy integral holding, lenses are arranged at the same position in the direction perpendicular to each optical axis between adjacent optical systems. For integral molding, lenses are made by the same material in the optical systems adjacent to each other in the direction perpendicular to each optical axis. At least one focus lens adjacent to one focus lens in the direction perpendicular to each optical axis may be made of the same material in the plurality of focus lens units. A front lens position in each optical system is located at almost the same position so that a light flux of each optical system does not interfere with another optical system. Each image plane (image pickup area) position may be equal so as to simplify the arrangement and adjustment of the image sensor. A surface shape of a lens in one optical system is different from a surface shape of another lens in the other adjacent optical system in the direction perpendicular to the optical axis. A sufficient optical imaging performance can be maintained with a differently shaped lens even when the lens is made of the same material. A focal length ratio between a wide angle ommatidium and the telephoto ommatidium is made 1.5 times or more for a high magnification varying ratio sufficient for the image pickup apparatus.

Figure 2:
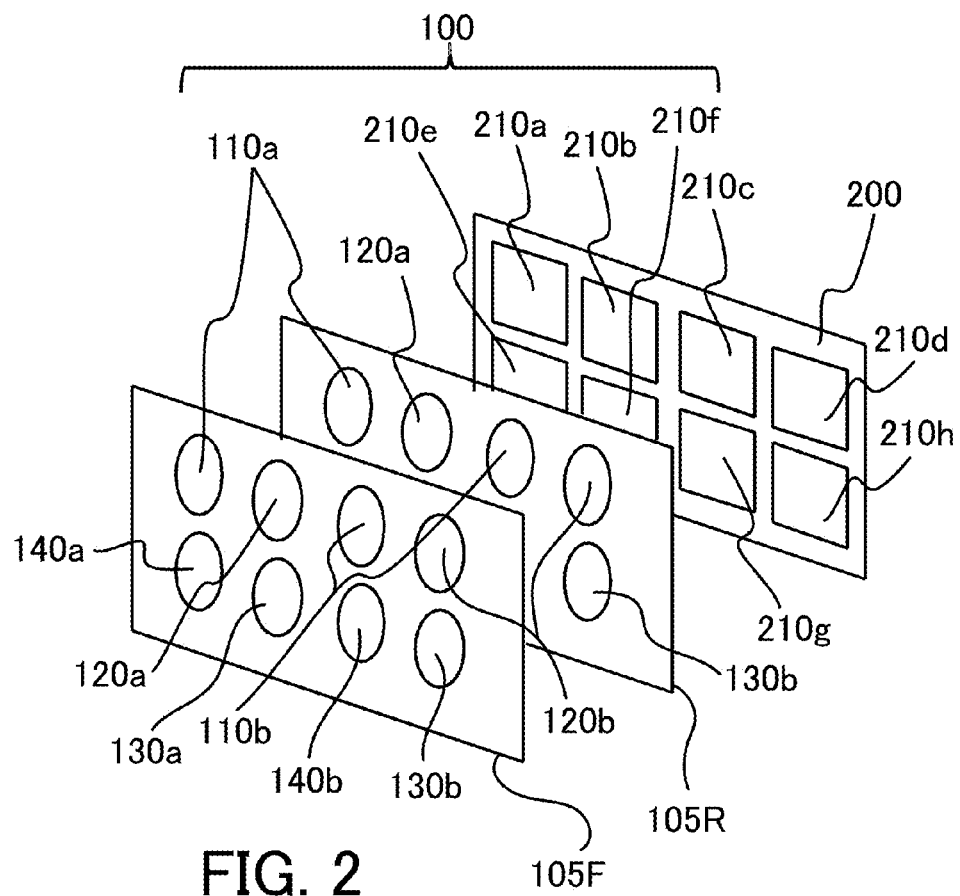
FIG. 2 is a perspective view of an image pickup unit in the compound-eye image pickup apparatus illustrated in FIG. 1.
Figure 3:
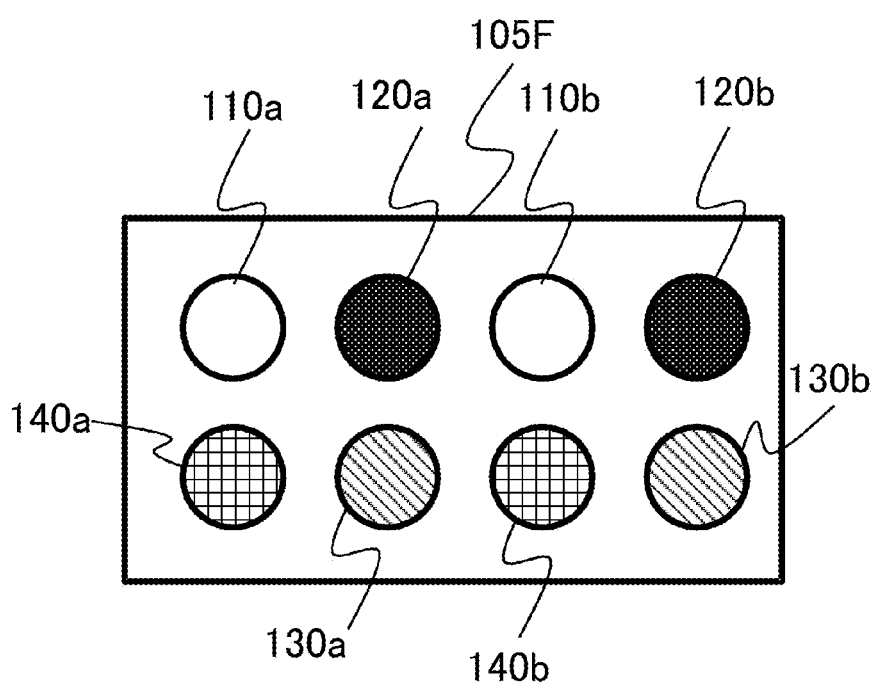
FIG. 3 is a front view of the image pickup unit illustrated in FIG. 2.

FIG. 1 is a block diagram of a compound-eye image pickup apparatus 1 according to this embodiment, FIG. 2 is a perspective view of an image pickup unit 100 in the compound-eye image pickup apparatus 1, and FIG. 3 is a front view of the image pickup unit 100.

The compound-eye image pickup apparatus 1 includes the image pickup unit 100, an A/D converter 10, an image processor 20, a system controller 30, an image pickup controller 40, an information input unit 50, an image recording medium 60, a display unit 70, and a distance information calculator 80. The compound-eye image pickup apparatus 1 may be a lens integrated type image pickup apparatus or includes a lens apparatus having an imaging optical system (image pickup optical system), and an image pickup apparatus body including an image sensor to which a lens apparatus is attachable.

As illustrated in FIGS. 1 to 3, the image pickup unit 100 includes eight imaging optical systems (image pickup optical systems) 110a, b, 120a, b, 130a, b, and 140a, b, and a plurality of image sensors each of which corresponds to one of the plurality of imaging optical systems. FIG. 1 is a sectional view containing optical axes of the imaging optical systems 110a and 140a of the image pickup unit 100.

Each imaging optical system includes a focus unit (focus lens unit or front lens unit) 105F and a rear unit (fixed lens unit) 105R. Each focus unit 105F is integrally held and driven by the holder 300 as illustrated in FIG. 1 so as to move by the same amount as the object position changes (in focusing).

As long as the plurality of focus lens units may be moved by the same moving amount, it is not always necessary to integrally hold them using the holder 300 unlike this embodiment.

Each rear unit 105R is integrally held by a holder 310, is fixed in focusing, and includes another unit, such as a diaphragm, for each imaging optical system. A method of integrally moving a part of the optical system in focusing is known as partial focusing. Each imaging optical system in the focus unit 105F includes at least one focus lens.

A plurality of image sensors 210a-f are integrally held and constitute an image sensor unit 200. The image sensor 210a corresponds to the imaging optical system 110a, the image sensor 210b corresponds to the imaging optical system 120b, the image sensor 210c corresponds to the imaging optical system 110b, and the image sensor 210d corresponds to imaging optical system 120b. The image sensor 210e corresponds to the imaging optical system 140a, the image sensor 210f corresponds to the imaging optical system 130a, the image sensor 210g corresponds to the imaging optical system 140b, and the image sensor 210h corresponds to imaging optical system 130d.

As illustrated in FIG. 3, the eight imaging optical systems (ommatidia) 110a, 120a, 130a, 140a, 110b, 120b, 130b, and 140b are arranged so that the optical axes can be parallel to each other. Two imaging optical systems a and b with the same reference numeral has the same focal length and there are four pairs of imaging optical systems having different focal lengths. The imaging optical system 110a and b (wide angle ommatidium) are a pair of wide-angle imaging optical systems having the shortest focal length among the eight imaging optical systems. The focal lengths of the imaging optical systems 120a and b (wide-angle-middle ommatidium) are longer than those of the imaging optical system 110a and b. The focal lengths of the imaging optical systems 130a and b (telephoto-middle ommatidium) is longer than those of the imaging optical systems 120a and b. The focal lengths of imaging optical systems 140a and b (telephoto ommatidium) are longer than those of the imaging optical systems 130a and b.

FIG. 4 illustrates captured images 1110a, 1120a, 1130a, and 1140a corresponding to the imaging optical systems 110a, 120a, 130a, and 140a. As illustrated in FIG. 4, the captured image 1110a corresponding to the image pickup optical system 110a is the largest object space, the captured object spaces become narrower in order of the captured images 1120a, 1130a, and 1140a corresponding to the imaging optical systems 120a, 130a, and 140a according to the focal length.

Turning back to FIG. 1, the imaging optical systems 110a and 140a constitute a compound eye, and the image sensors 210a and 210e convert optical images that reach the image sensor planes through imaging optical systems 110a and 140 into electric signals (analogue signals).

The A/D converter 10 converts analogue signals output from the image sensors 210a-f into digital signals and supplies them to the image processor 20.

The image processor 20 performs predetermined pixel interpolation processing, color conversion processing, etc. for image data from the A/D converter 10 and executes predetermined calculation processing using each captured image data. The processing result by the image processor 20 is sent to the system controller 30.

The image processor 20 includes an ultra-resolution processor 21, an image synthesizer 22, a blurring unit 23, and an object remover 24.

The ultra-resolution processor 21 performs image resolution improving processing utilizing a plurality of images, as described later.

The image synthesizer 22 utilizes a plurality of images, generates one synthesized image having an image characteristic different from any of the plurality of images, and provides processing, such as reducing a noise level and producing a high dynamic range image. The image characteristic contains one of a dynamic range, a resolution, a blur amount, an angle of view, and a removing ratio of a captured object.

The blurring unit 23 blurs an image on the basis of distance information obtained by a distance information obtaining method, which will be described later.

The object remover 24 obtains an image, for example, in which an unnecessary background other than the principal object which is designated by a photographer on the basis of the distance information.

The information input unit 50 acquires information input by the user who has selected desired image pickup condition, from an information acquirer 51 and supplies data to the system controller 30. The information input unit 50 has the information acquirer 51. The information acquirer 51 acquires present image pickup condition information (such as F number, focal length, and exposure time) from the image pickup controller 40 and the system controller 30. The system controller 30 controls the image pickup controller 40 based upon the supplied data, and the image pickup controller 40 obtains a necessary image by controlling a moving amount of focus unit 105F, an aperture value of each imaging optical system, an exposure time period, and a corresponding image sensor.

Figure 5:
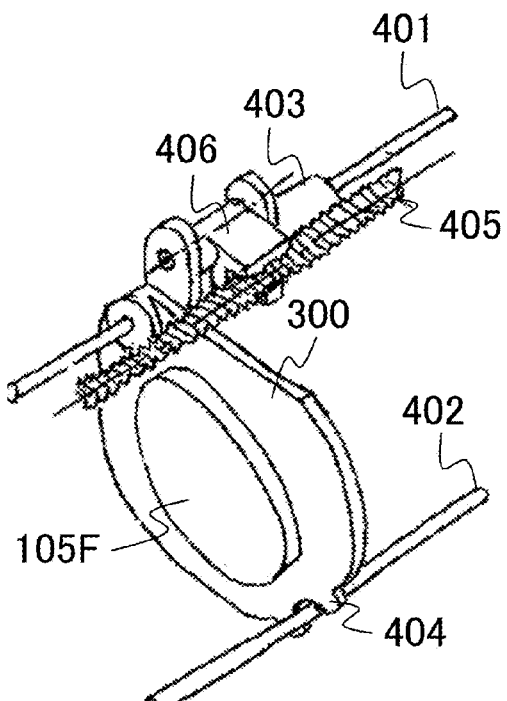
FIG. 5 is a partially enlarged perspective view of a focus driver in the compound-eye image pickup apparatus illustrated in FIG. 1.

FIG. 5 is a partially enlarged perspective view of a focus driver in the image pickup unit 100. The holder 300 of the focus unit 105F has a sleeve unit 403 engaged with and held by a first guide bar 401 placed in parallel to an optical axis of each imaging optical system, and a U-shaped groove 404 whose rotation is restricted by a second guide bar 402. The image pickup unit 100 has an output shaft 405 that is rotated by an actuator, such as a stepping motor (not illustrated), and a rack unit 406 engaged with the output shaft 405. Although a shape of the focus unit 105F is different between FIG. 2 and FIG. 5, these shapes are merely illustrative and actually identical.

Thereby, the holder 300 configured to hold the focus unit 105F equipped with a part of a plurality of imaging optical systems is integrally moved in the optical axis directions (dotted line directions illustrated in FIG. 1) as the output shaft 405 rotates.

Each focus unit satisfies the conditional expression (25) so as to equalize the focusing moving amounts in a plurality of imaging optical systems having different focal lengths. By capturing images at the position of the focus unit 105F controlled by the image pickup controller 40, one control provides a plurality of in-focus images having different object space ranges (angles of view) and the same angle of view.

The image recording medium 60 stores a plurality of still and motion images, and a file header of an image file. The display unit 70 displays an image, a state, abnormality, etc., and may include a liquid display element, etc.

The conditional expression (25) is satisfied where $\beta_{Fi}$ and $\beta_{Fh}$ are lateral magnifications of the focus units in the arbitrary imaging optical systems i and h among a plurality of imaging optical systems, $\beta_{Ri}$ and $\beta_{Rh}$ are lateral magnifications of the entire image side units located on the image side of the focus units, and $f_i$ and $f_h$ are focal lengths of the imaging optical systems. The lateral magnifications of the each unit are lateral magnifications of the imaging optical systems i and h when the object is infinitely distant.

The conditional expression (25) defines the condition for equal focusing moving amounts in arbitrary imaging optical systems having different focal lengths. When the value is higher than the upper limit of the conditional expression (25), a defocus amount of the imaging optical system i exceeds its depth of focus on the image side and the image is defocused when the focus unit is moved by the same amount in focusing in the imaging optical system h. When the value is lower than the lower limit of the conditional expression (25), a defocus amount of the imaging optical system i exceeds its depth of focus on the image side and the image is defocused when the focus unit is moved by the same amount in focusing in the imaging optical system h. When the conditional expression (25) is satisfied, a defocus amount can fall within a depth of focus of an arbitrary imaging optical system and in-focus images having different angles of view can be simultaneously obtained by the equal moving amounts of the focus units.

Thus, focusing moving amounts can be made equal to each other in the image pickup optical systems having different focal lengths by properly setting the lateral magnifications of the focus units and the image side units in each imaging optical system. Thereby, the in-focus images having different angles of view can be simultaneously obtained and the focus driver can be simplified.

A conditional expression (39) may be satisfied where $\beta_{Fi}$ and $\beta_{Ft}$ are lateral magnifications of the focus units in an arbitrary imaging optical system i and in the imaging optical system having the longest focal length among a plurality of imaging optical systems:

$$0 < \frac{1 - |\beta_{Fi}|}{1 - |\beta_{Ft}|} \leq 1.1 \tag{39}$$

The conditional expression (39) defines a moving direction of the focus unit in each imaging optical system. When the conditional expression (39) is satisfied, the moving direction of each focus unit can be made equal in focusing and the focus driver can be made smaller. When the value is higher than the upper limit of the conditional expression (39), a defocus amount of the imaging optical system i exceeds its depth of focus on the object side and the image is defocused when the focus unit is moved by the same amount in focusing in the imaging optical system having the longest focal length. When the value is lower than the lower limit of the conditional expression (39), a moving direction of the focus unit in focusing is a reverse direction and the focus driver becomes larger.

A conditional expression (40) may be satisfied where $f_{Fi}$ denotes a focal length of the focus unit in the arbitrary imaging optical system i among a plurality of imaging optical system, and $f_t$ denotes a focal length of the imaging optical system having the longest focal length:

$$0.4 < \left| \frac{f_{Fi}}{f_t} \right| < 80 \tag{40}$$

The conditional expression (40) relates to a focus unit in the arbitrary imaging optical system and a focal length of the imaging optical system closest to the telephoto end, and defines a condition for equal focusing moving amounts of the imaging optical systems with a chromatic aberration and curvature of field reduced. When the value is higher than the upper limit of the conditional expression (40), the focusing moving amount is too large to the focal length of the imaging optical system, an overall length of the optical system is longer, and the entire image pickup apparatus becomes larger. When the value is lower than the lower limit of the conditional expression (40), the focal length of the focus unit becomes small relative to the focal length of the imaging optical system and it becomes difficult to correct a focus change, such as the field of curvature and the chromatic aberration.

The following expression may be satisfied where $f_t$ is a focal length of the imaging optical system having the longest focal length among the plurality of imaging optical systems, $\beta_{Ft}$ is a lateral magnification of that focus unit, $\beta_{Rt}$ is a lateral magnification of the entire image side unit placed on the image side of that focus unit, and $f_w$ is a focal length of the imaging optical system having the short focal length in the plurality of imaging optical systems:

$$1 < \left| (1 - \beta_{Ft}^2)\beta_{Rt}^2 \times \frac{f_t}{f_w} \right| < 20 \tag{41}$$

The conditional expression (41) relates to lateral magnifications of the focus unit and the image side unit in the imaging optical system having the longest focal length, and defines a condition for equal focusing moving amounts of the imaging optical systems having different focal lengths with a chromatic aberration and curvature of field reduced. When the value is lower than the lower limit of the conditional expression (41), the focusing moving amount is too large relative to the focal length of the imaging optical system, the overall length of the optical system becomes long, and the entire image pickup apparatus becomes large. When the value is higher than an upper limit of the conditional expression (41), the focal length of the focus unit becomes too small relative to the focal length of the imaging optical system and it becomes difficult to correct a focus change, such as the curvature of field and the chromatic aberration.

A conditional expression (42) may be satisfied where vFi denotes an Abbe number of at least one lens in the focus unit in the arbitrary imaging optical system i. The lens may be made of a plastic material:

$$55 < v_{Fi} < 90 \tag{42}$$

The conditional expression (42) defines an Abbe number for the lens in the focus unit. When the Abbe number is lower than the lower limit of the conditional expression (42), the dispersion becomes too large and it is difficult to correct the chromatic aberration caused by the focus fluctuation. When the value is higher than the upper limit of the conditional expression (42), the selection of the material becomes difficult. The conditional expression (42) may be turned into $60 < v_{Fi} < 90$.

The compound-eye optical system of this embodiment solves a problem of an image plane correcting amount to an object fluctuation amount that is different among a plurality of imaging optical systems having different focal lengths. When a moving amount of the focus unit is different, simultaneous obtaining of in-focus images having different angles of view is incompatible with simplifying of the focus driver. The compound-eye optical system of this embodiment adopts partial focusing in at least one imaging optical system, and satisfies the conditional expression (25) so as to equalize the focusing moving amounts in a plurality of imaging optical systems having different focal lengths. More specifically, the lateral magnification $\beta_F$ of the focus unit F and the lateral magnification $\beta_R$ of the image side unit R located on the image side of the focus unit F are appropriately set.

For easy integral holding, lenses are arranged at the same position in the direction perpendicular to each optical axis between adjacent optical systems. For integral molding, lenses are made by the same material in the optical systems adjacent to each other in the direction perpendicular to each optical axis.

The distance information calculator 80 includes a base image selector 81, a corresponding point extractor 82, and a parallactic amount calculator 83. The base image selector 81 selects a base image from a plurality of parallax images formed by each imaging optical system, and the corresponding point extractor 82 extracts a corresponding pixel in the parallax image. The parallactic amount calculator 83 calculates a parallactic amount of all corresponding points that are extracted, and the distance information calculator 80 calculates (obtains) object distance information in the image based upon the calculated parallactic amount.

Figure 6:
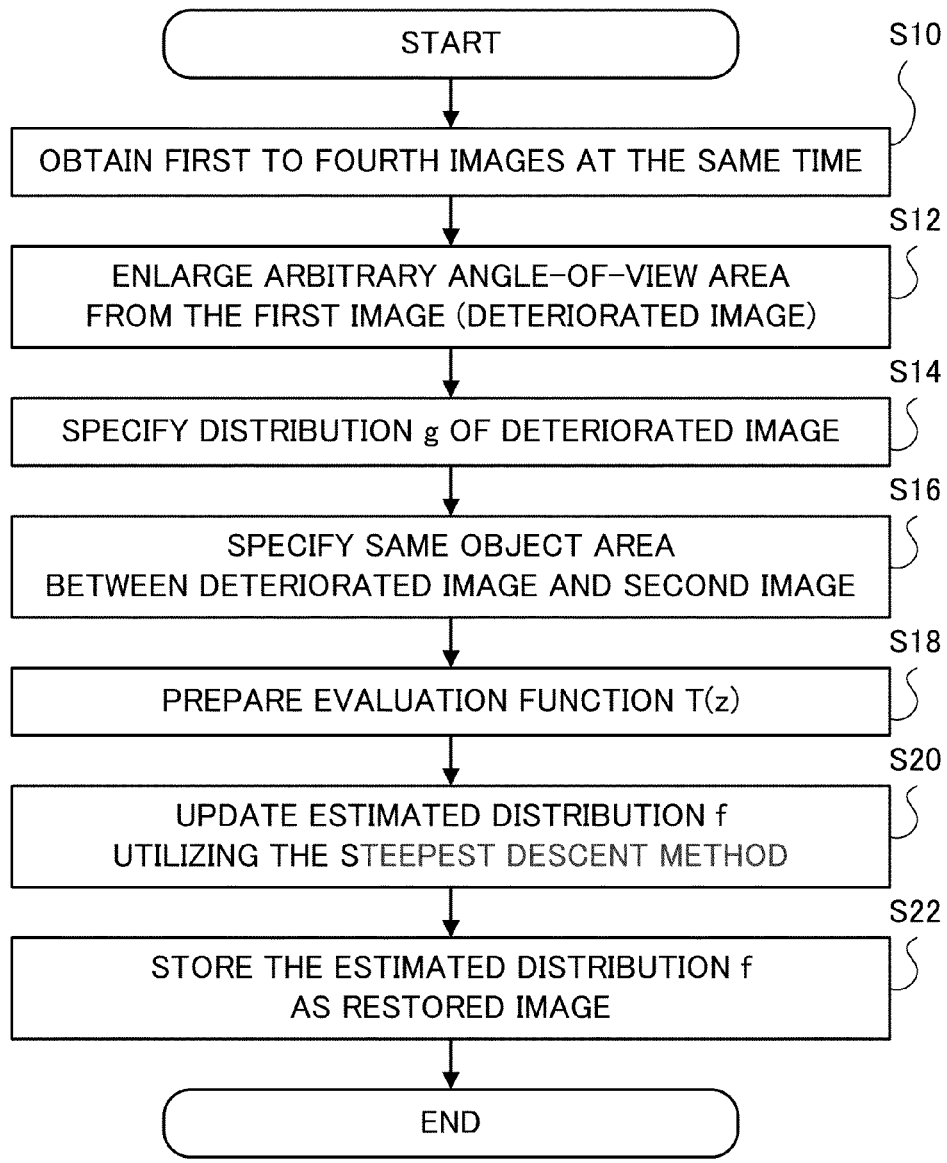
FIG. 6 is a flowchart for explaining an image pickup operation in the compound-eye image pickup apparatus illustrated in FIG. 1.

FIG. 6 is a flowchart for explaining an image pickup operation that achieves a continuous zoom function in the compound-eye image pickup apparatus 1, and "S" stands for the step (process). The image recovering method illustrated in FIG. 6 can be implemented as a program that enables the system controller 30 as a microcomputer (processor) to execute the function of each step.

Initially, when an image signal is input from the user, the system controller 30 simultaneously acquires a first image 1110*a*, a second image 1120*a*, a third image 1130*a*, and a fourth image 1140*a* as a wide angle image to a telephoto image illustrated in FIG. 4 (S10). Since the positional sensitivity ES of each focus unit is controlled in the optical system of this embodiment so as to satisfy the expression (25), the first to fourth images are captured in-focus and sufficiently high-resolution images upon the same object from a wide angle end to a telephoto end.

Next, the system controller 30 cuts a desired angle of view out of the first image 1110*a* and enlarges it, which is input from the user through the information input unit 50 (S12). The image is enlarged and deteriorated by a linear interpolation in the conventional digital zooming.

Next, the system controller 30 specifies a distribution g of the deteriorated image (S14) and identifies an area in the deteriorated image which corresponds to the object area in the second image (reference image) 1120*a* (S16). A block matching method described later etc. may be used to specify the object area. In specifying the object area, the second image 1120*a* may be reduced down to the same size as the deteriorated image or the deteriorated image may be enlarged for comparison purposes.

Next, the system controller 30 performs ultra-resolution processing. Herein, the system controller 30 prepares an evaluation function T(f) given by the expression (14) (S18). This embodiment can restore an image more precisely than the conventional method by adding to a term of Z(f) in the evaluation function T(f) a correlation function in which a value reduces as a correlation of the object area becomes higher between the deteriorated image and the second image 1120*a*. The deteriorated image and the second image 1120*a* are made by capturing the same object, and a relationship of β1<β2 is satisfied where β1 and β2 are image pickup magnifications of these images. Since the obtained reference image can contain a high frequency component of the object, and the image can be precisely restored to the high-frequency component.

Next, the system controller 30 calculates a distribution f that minimizes the evaluation function by using the steepest descent method etc. (S20), stores the image of the calculated distribution f as the restored image, and completes processing (S22).

The display unit 70 may display an image that is made by performing the predetermined displaying processing for the processed image, or an unprocessed image, or an image that has received simple corrective processing. For the display of capturing, a first image area may be displayed and the user after capturing the image may designate a desired angle of view and start processing or may designate the desired processing during capturing. A correction amount may be determined based upon an allowance in the implementation, such as a purpose of an image quality level to be obtained and a load of the processing.

The continuous zooming in a high magnification area can be realized by utilizing the second image 1120*a* and more telephoto images, such as the third image 1130*a* and the fourth image 1140*a*. The following conditional expression (43) may be satisfied in the imaging optical systems having continuous and different angles of view where W is an angle of view of an arbitrary imaging optical system in the plurality of imaging optical systems, and Wn is an angle of view of an imaging optical system having the second narrowest angle of view:

$$1.1 < W/Wn < 3 \tag{43}$$

When the value is lower than the lower limit of the conditional expression (43), many imaging optical systems are necessary for the high magnification varying ratio in the image pickup apparatus and the image pickup apparatus becomes larger. When the value is higher than the upper limit of the conditional expression (43), it is difficult to highly precisely restore an image even with the ultra-resolution technology and the image quality after zooming deteriorates.

Since the image pickup apparatus of this embodiment can simultaneously acquire in-focus images having different angles of view by one image pickup control utilizing a plurality of imaging optical systems having different focal lengths, this embodiment can provide continuous zooming that maintains the resolution of the captured image. The focus driver can be simplified by integrally holding the focus units without any zoom driver, etc., and the compound-eye image pickup apparatus can be made thinner.

Figure 7:
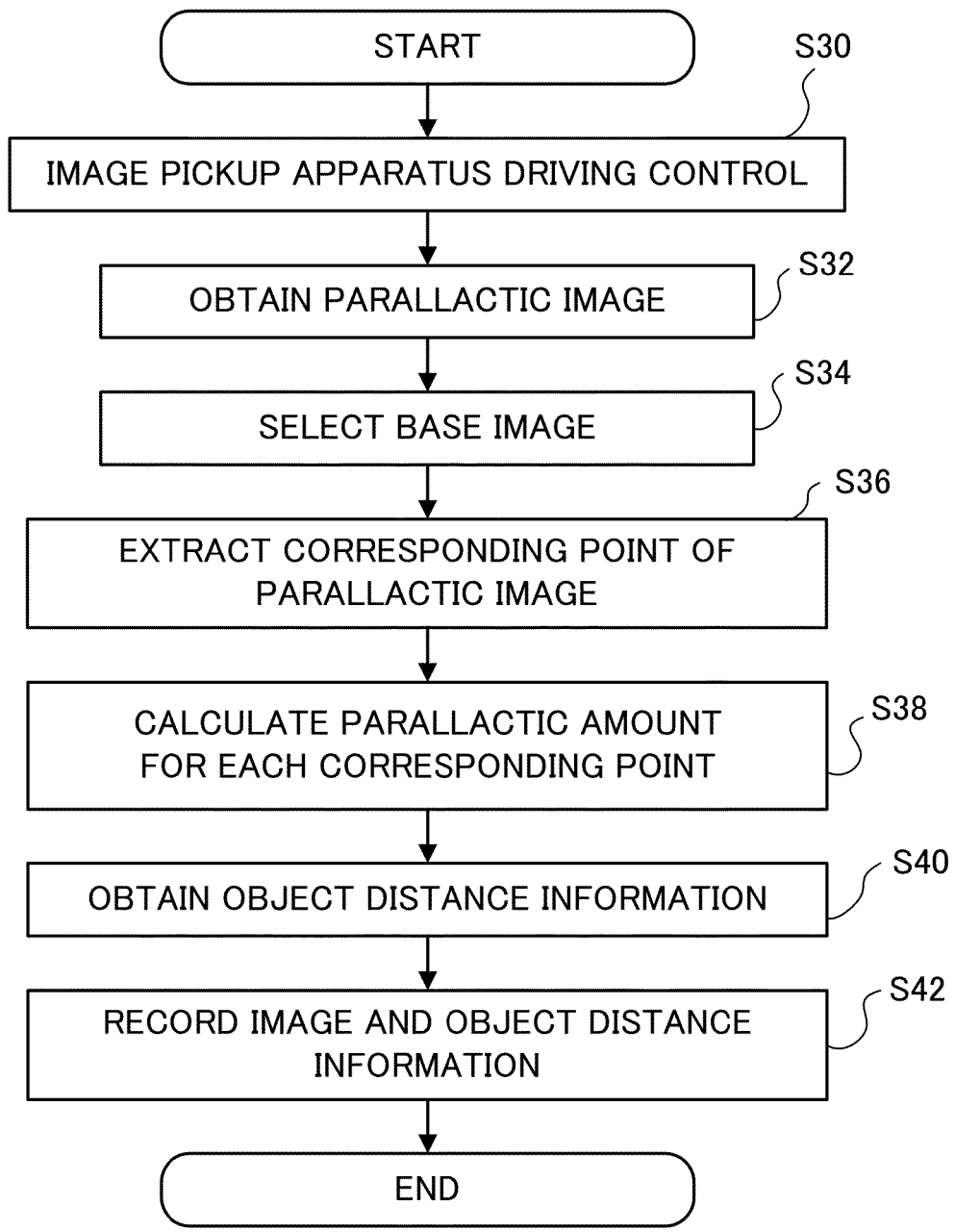
FIG. 7 is a flowchart for explaining an object distance information recording operation in the compound-eye image pickup apparatus illustrated in FIG. 1.

FIG. 7 is a flowchart for explaining an object distance information recording operation of the compound-eye image pickup apparatus 1 of this embodiment, and "S" stands for the step (process). The method illustrated in FIG. 7 can be implemented as a program that enables the system controller 30 as a microcomputer (processor) to execute the function of each step. A description will now be given of an operation using a parallax image obtained by a pair of wide-angle optical systems 110a and 110b each configured to capture an image of the widest object space.

Initially, the system controller 30 when receiving an image signal from the user sends via the image sensors 210a-g and the A/D converter 10 to the image processor 20, a parallax image formed through the imaging optical systems, for performing predetermined calculation processing and for generating image data (S30, S32).

Next, the system controller 30 selects one of the parallax image data selected by the base image selector 81 as a base image for the parallactic amount calculation (S34). This embodiment selects as the base image an image obtained by the imaging optical system 110a.

Next, the system controller 30 sets to a reference image through corresponding point extractor 82, the image obtained from the imaging optical system 110b for the selected base image, and extracts a corresponding pixel (S36). The "corresponding pixel," as used herein, means each pixel corresponding to the same object A in the parallax image data obtained for a point image object A in a captured model illustrated in FIG. 21.

In the corresponding point extracting method, the system controller 30 utilizes an image coordinate (X,Y), and the image the coordinate (X,Y) defines the upper left of a pixel group as an origin in FIG. 22. The horizontal direction is set to the X axis and its perpendicular direction is set to the Y axis. The brightness at the image the coordinate (X,Y) of base image data 501 is set to F1(X,Y), and the brightness of reference image data 502 is set to F2(X,Y).

The pixel of the reference image data 502 (vertical line) corresponding to the arbitrary coordinate (X,Y) (vertical line pixel) in the base image data 501 can be found by searching the brightness of the reference image data 502 that is most similar to the brightness F1(X,Y) of the base image data 501 at the coordinate (X,Y).

Since it is difficult to find out a pixel that is most similar to the arbitrary pixel, a pixel near the image coordinate (X,Y) is used and a similar image is searched by a method called the block matching. For example, in the block matching processing with a block size of three, brightness values of totally three pixels, i.e., the arbitrary coordinate (X,Y) of the base image data 501 and the front and back pixels (X−1,Y) and (X+1,Y) become F1(X,Y), F1(X−1,Y), and F1(X+1,Y). On the other hand, brightness values of the reference image data that shifts from the coordinate (X,Y) by k in the x direction become F2(X+k,Y), F2(X+k−1,Y), and F2(X+k+1,Y).

The similarity degree E to the pixel at the coordinate (X,Y) the base image data 501 is defined by the following expression:

$$E = \left[\begin{array}{c} F1(X,Y) - \\ F2(X+k,Y) \end{array}\right] + \left[\begin{array}{c} F1(X-1,Y) - \\ F2(X+k-1,Y) \end{array}\right] + \left[\begin{array}{c} F1(X+1,Y) - \\ F2(X+k+1,Y) \end{array}\right] = \quad (44)$$

$$\sum_{j=-1}^{1}\left[\begin{array}{c} F1(X+j,Y) - \\ F2(X+k+j,Y) \end{array}\right]$$

The expression (44) calculates a value of the similarity degree E by sequentially changing a value of k, and (X+k,Y) that gives the minimum similarity degree E is a corresponding point to the coordinate (X,Y) of the base image data 501. While the parallax image has a baseline in the horizontal direction for simplicity, the corresponding points can be detected by using a similar principle in a vertical direction and a diagonal direction.

Next, the system controller 30 calculates a parallactic amount of each extracted, corresponding point via the parallactic amount calculator 83 (S38). One calculation method calculates the parallactic amount as a pixel positional difference from each pixel of the reference image data corresponding to each pixel in the base image data obtained by the block matching method.

Next, the system controller 30 calculates distance information, via the distance information calculator 80, on a captured object based upon the calculated parallactic amount, the focal length of the imaging optical system as image pickup condition information from the information acquirer 51, and the baseline length data of the imaging optical systems 110a and 110b (S40).

Figure 21:
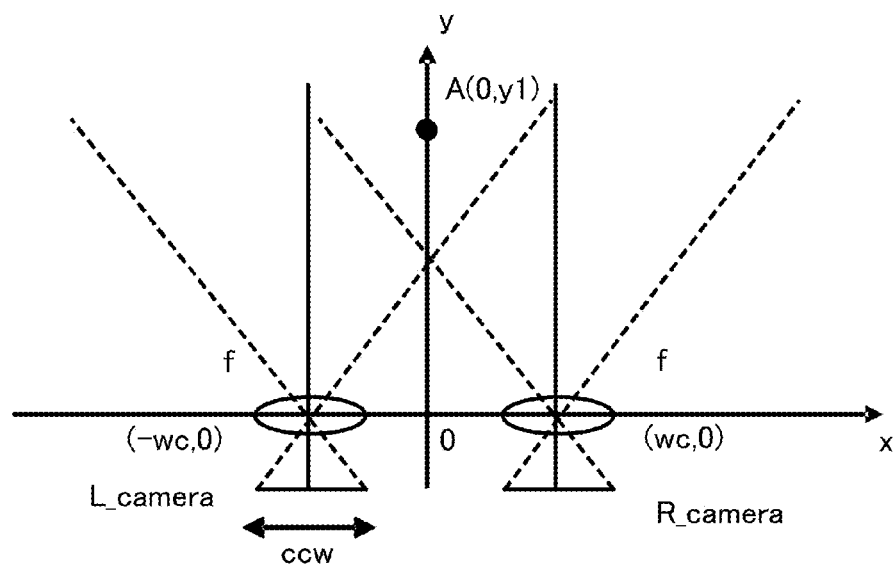
FIG. 21 is a view for explaining a model of a general stereo photography.

A description will now be given of the principle of the object distance calculation in the compound-eye image pickup apparatus 1. FIG. 21 is a view for explaining a general stereo photography model. An origin of the coordinate is set to the center of left and right cameras. The horizontal direction is set to the x axis, the depth direction is set to the y axis, and the height direction is omitted for simplicity. The principal points of the imaging optical system of the left and right cameras are arranged at (−Wc,0) and (Wc,0), respectively and the focal lengths of the imaging optical systems of right and left cameras are f. An object A located on the y axis at (0,y1) is captured with each camera. Then, a shift amount of the object image A from the sensor center between the right and left cameras can be expressed by the following expression where Plc and Prc are image pickup parallaxes:

$$Prc = \frac{wc}{y1} \cdot f \quad (45)$$

$$Plc = -\frac{wc}{y1} \cdot f \quad (46)$$

The same object is captured from different viewpoints under the above principle as left and right parallax images having shift amounts expressed by the expressions (45) and (46) in the principal position shift (baseline) direction. The distance y1 to the object A can be calculated by the following expression based upon the shift amounts:

$$y1 = \frac{2wc}{Prc - Plc} \cdot f \quad (47)$$

While the distance information calculation using the imaging optical systems 110a and 110b has been described, the distance information can be calculated with another pair of imaging optical systems (such as a pair of the imaging pickup systems 140a and 140b) under the similar principle. When the above method is applied to images having different angles of view, a part corresponding to the image having a narrow angle of view may be cut out of an image of a wide angle of view so as to extract corresponding points.

As mentioned above, the compound-eye image pickup apparatus includes a pair of imaging optical systems having the same focal length, achieves a thin profile, a high magnification varying ratio, and post-capturing zooming, and calculates distance information. An application of the distance information obtained by the above method is a 3D modeling mode of the object etc. An image in which a main object is highlighted is obtained by blurring the background based upon the calculated object distance information. The object remover 24 can obtain an image in which a background other than the main object has been removed based upon the calculated object distance information.

This embodiment can simultaneously obtain the in-focus images at different angles of view as well as simplifying the focus driver. In addition, this embodiment can provide a thin and high zoom ratio compound-eye image pickup apparatus configured to zoom a captured image. In other words, this embodiment can easily turn an image pickup apparatus, such as a video camera and a digital camera, into a thin and high zoom ratio image pickup apparatus configured to obtain space information about the capturing object space.

Figure 8:
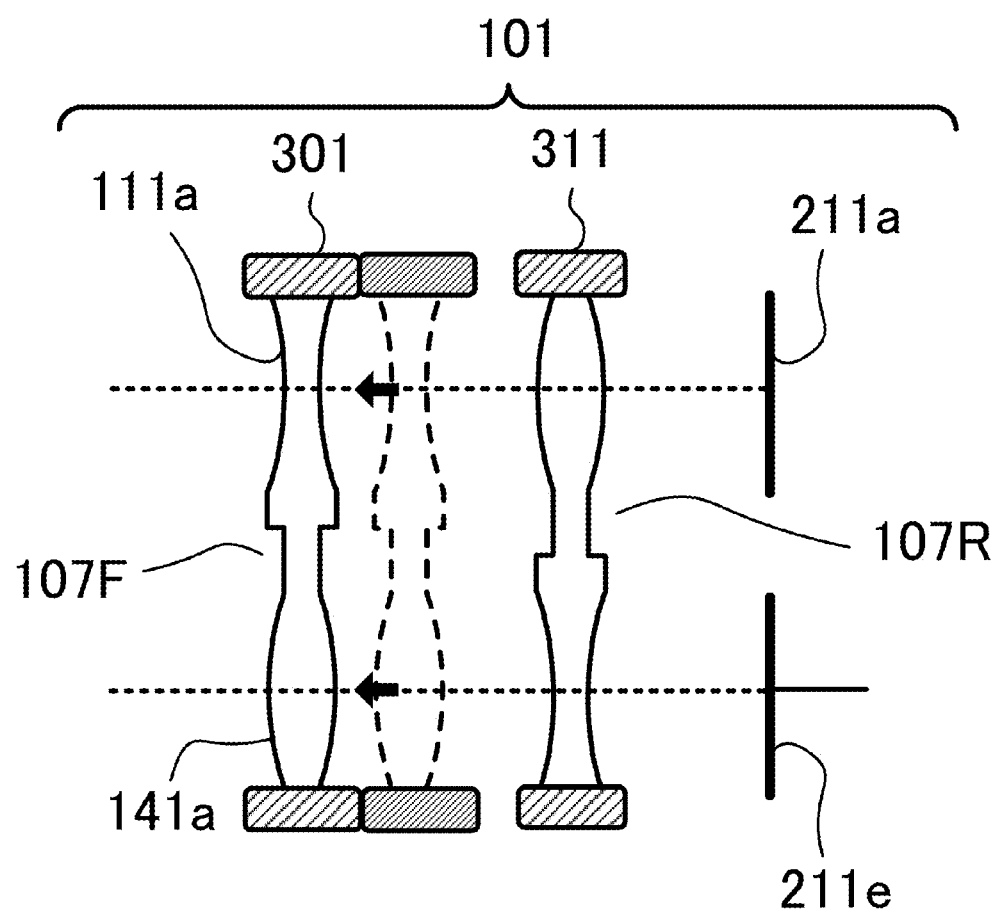
FIG. 8 is a sectional view of an image pickup unit according to another embodiment.
Figure 9:
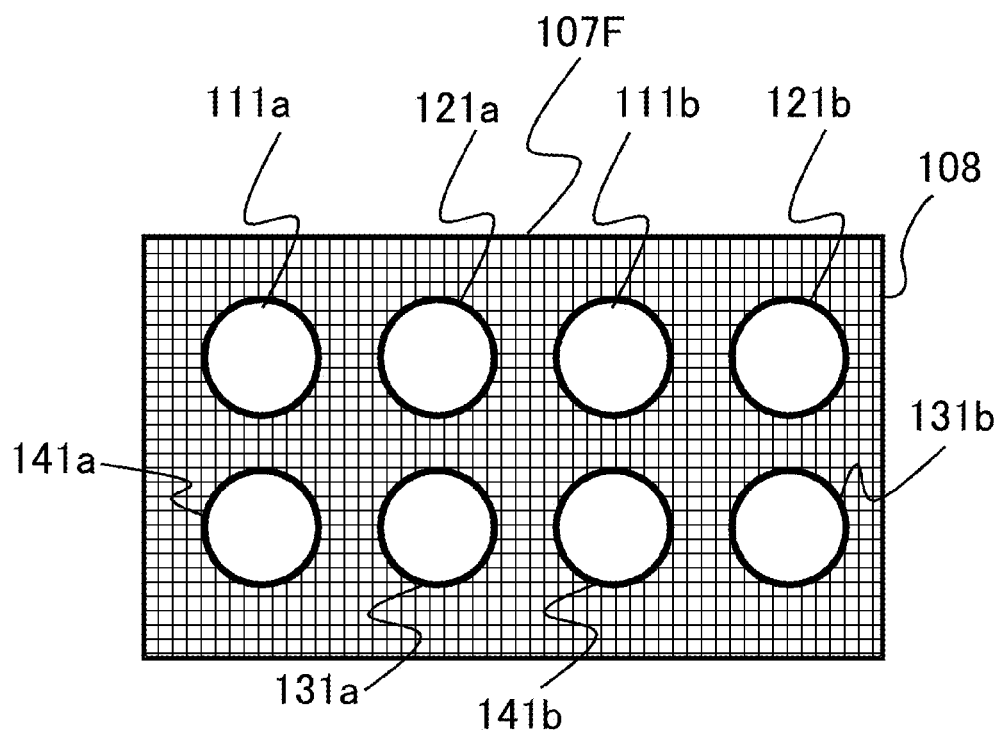
FIG. 9 is a front view of the image pickup unit illustrated in FIG. 8.

FIG. 8 is a sectional view of an image pickup unit 101 used for a compound-eye image pickup apparatus according to another embodiment. FIG. 9 is a front view of the image pickup unit 101. Since the structure of the image pickup apparatus other than the image pickup unit 101 is the same as that illustrated in FIG. 1, and the image pickup procedure is the same, a description thereof will be omitted.

In the image pickup unit 100 illustrated in FIG. 1, the holder 300 integrally holds the optical systems having different focal lengths of the focus unit 105F. On the other hand, the image pickup unit 101 integrally molds a focus unit 107F using the same material. The integral molding may use injection molding, glass molding in which glass is put in a mold and pressed, etc.

Thus, at least one focus lens is adjacent to and integrally molded with a focus lens in a vertical direction to each optical axis in a plurality of focus lens units. The lenses in the adjacent optical systems having different focal lengths are made of the same material and integrally molded as one unit. This configuration saves the number of processing steps in the manufacture and assembly, and reduces the cost.

The image pickup unit 101 includes, as illustrated in FIG. 9, eight imaging optical systems 111a, b, 121a, b, 131a, b, and 141a, b, and a plurality of image sensors each of which corresponds to one of the plurality of imaging optical systems. This embodiment may form a light shielding mask 108, as illustrated in FIG. 9, by sticking a light shield upon a cross line portion outside the effective diameter of each imaging optical system. The light shielding mask 108 can reduce unnecessary light other than imaging light upon each image sensor.

Figure 10:
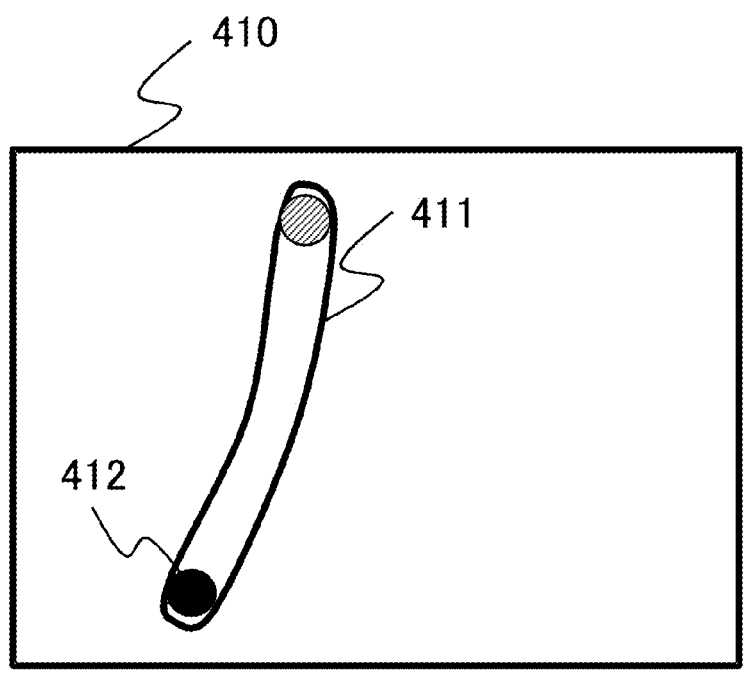
FIG. 10 is a partially plane view of a focus driver in the image pickup unit illustrated in FIG. 8.

FIG. 10 is a partially plane view of the focus driver for the image pickup unit 101 according to this embodiment. A cam ring 410 has a cam groove 411 with which a columnar cam follower 412 of the holder 301 is engaged. An actuator (not illustrated), such as a stepping motor, rotates the cam ring 410, and moves the cam follower 412 along the cam groove 411. Thereby, the focus unit 107F moves as one unit in the optical axis direction without rotating. Three cam followers 412 are formed at 120° intervals on the holder 301 with respect to the center of gravity of the focus unit 107F, thereby supports the focus unit 107F at three points, and prevents a fall to an optical axis and a positional gap in the optical axis direction. The focus driver illustrated in FIG. 5 may be used.

This embodiment can simultaneously obtain the in-focus images at different angles of view as well as simplifying the focus driver. In addition, this embodiment can provide a thin and high zoom ratio compound-eye image pickup apparatus configured to zoom a captured image. In other words, this embodiment can easily turn an image pickup apparatus, such as a video camera and a digital camera, into a thin and high zoom ratio image pickup apparatus configured to obtain space information about the capturing object space.

Next follows a description of first to fourth compound-eye optical systems applicable to the compound-eye image pickup apparatus according to the embodiment. The compound-eye optical system according to this embodiment adopts partial focusing in at least one imaging optical system, satisfies the conditional expression (25), and equalizes focusing moving amounts in the imaging optical systems having different focal lengths. More specifically, this embodiment properly sets the lateral magnification $\beta_F$ for the focus unit F and the lateral magnification $\beta_R$ for the image side unit located on the image side of the focus unit, which affect the positional sensitivity ES of the focus unit.

As a calculation condition of the conditional expression, the focal length and positional sensitivity of the optical system having the longest focal length in the compound-eye optical systems are substituted for $f_T$ and $ES_{FT}$ in the conditional expression (25). In addition, the focal length and positional sensitivity of the target imaging optical system are substituted for $f_T$ and $ES_{FT}$ in the conditional expression (25).

When each optical system satisfies the conditional expression (25) in this calculation condition, all ommatidium optical systems can be focused upon the same object even with the same moving amount of the focus units as that of the telephoto ommatidium having the shallowest depth of focus.

For easy integral holding, lenses are arranged at the same position in the direction perpendicular to each optical axis between adjacent optical systems. For integral molding, lenses are made by the same material in the optical systems adjacent to each other in the direction perpendicular to each optical axis. A front lens position in each optical system is located at almost the same position so that a light flux of each optical system does not interfere with another optical system. Each image plane (image pickup area) position may be equal so as to simplify the arrangement and adjustment of the image sensor. A surface shape of a lens in one optical system is different from a surface shape of another lens in the other adjacent optical system in the direction perpendicular to the optical axis. A sufficient optical imaging performance can be maintained with a differently shaped lens even when the lens is made of the same material. A focal length ratio between a wide angle ommatidium and the telephoto ommatidium is made 1.5 times or more for a high magnification varying ratio sufficient for the image pickup apparatus.

First Embodiment

FIGS. 11A, 11B, 11C, and 11D are lens sectional views of a wide angle ommatidium, a wide-angle-middle ommatidium, a telephoto-middle ommatidium, and a telephoto ommatidium of a first compound-eye image pickup system according to the first embodiment. The left side is an object side (front side), and the right side is an image side (rear side) in the lens sectional view. F is a focus unit, R is an image side unit (rear unit), SP is an aperture diaphragm, and IP is an image plane. The image plane IP corresponds to an image pickup plane of a solid state image sensor, such as a CCD sensor and a CMOS sensor (photoelectric conversion element). It corresponds to a film plane when the film is used. This applies to other embodiments.

FIGS. 12A, 12B, 12C, and 12D are aberrational diagrams of a wide angle end, a wide-angle-middle position, a telephoto-middle position, and a telephoto end according to a numerical example 1 corresponding to the first compound-eye optical system. In the aberrational diagram, d and g denote the d-line and g-line, ΔM and ΔS are the meridional and sagittal image planes. The lateral chromatic aberration is illustrated by the g-line, ω is half an angle of view, and Fno is an F-number. This definitions are applied to other embodiments.

The first compound-eye optical system adopts front focusing in which the focus unit F moves to the object side and the image side unit R is fixed in focusing from an infinite object to a short distance object. Hereafter, a lens construction of each lens unit will be described in order from the object side to the image side.

Figures 11A, 11B, 11C, 11D:
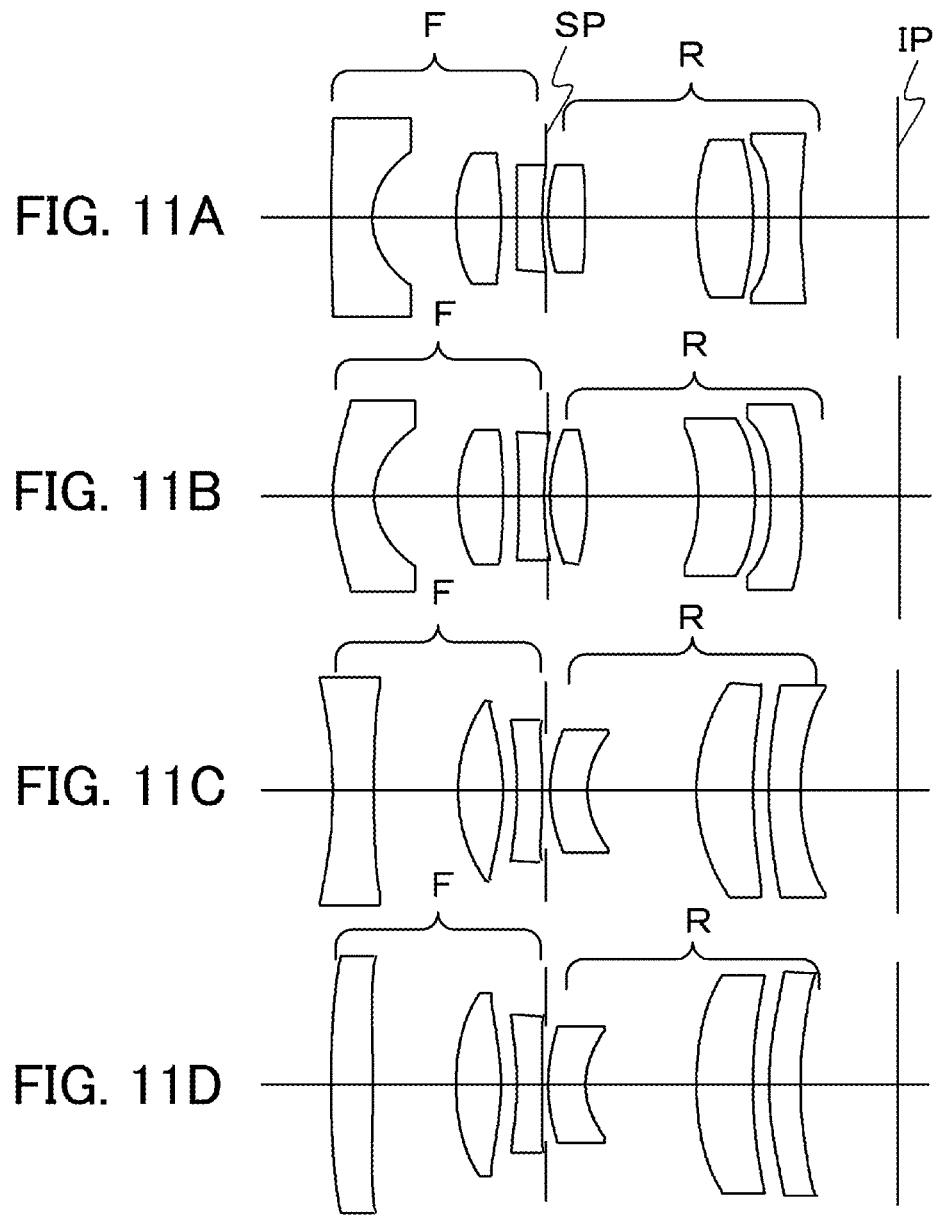
FIGS. 11A-11D are lens sectional views of a wide angle ommatidium, a wide-angle-middle ommatidium, a telephoto-middle ommatidium, and a telephoto ommatidium in a compound-eye optical system according to a first embodiment of the present invention.
Figure 12A:
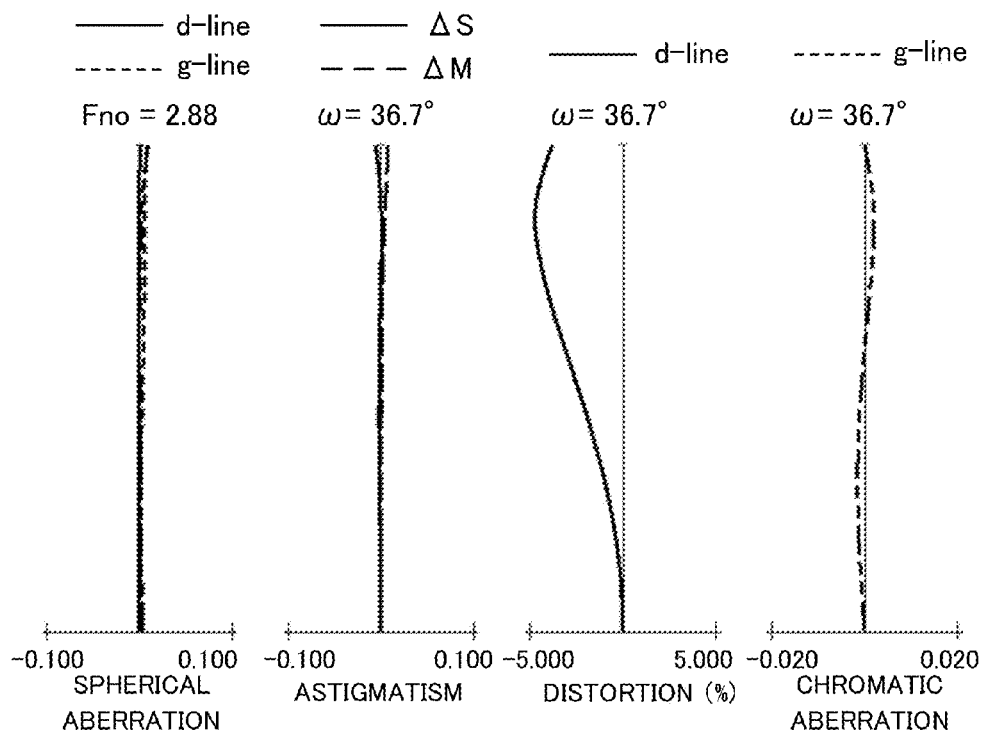
FIGS. 12A-12D are aberrational diagrams at a wide angle end, a wide-angle-middle position, a telephoto-middle position, and a telephoto end according to a numerical example 1 corresponding to the compound-eye optical system that illustrates in FIGS. 11A-11D according to the first embodiment.
Figure 12B:
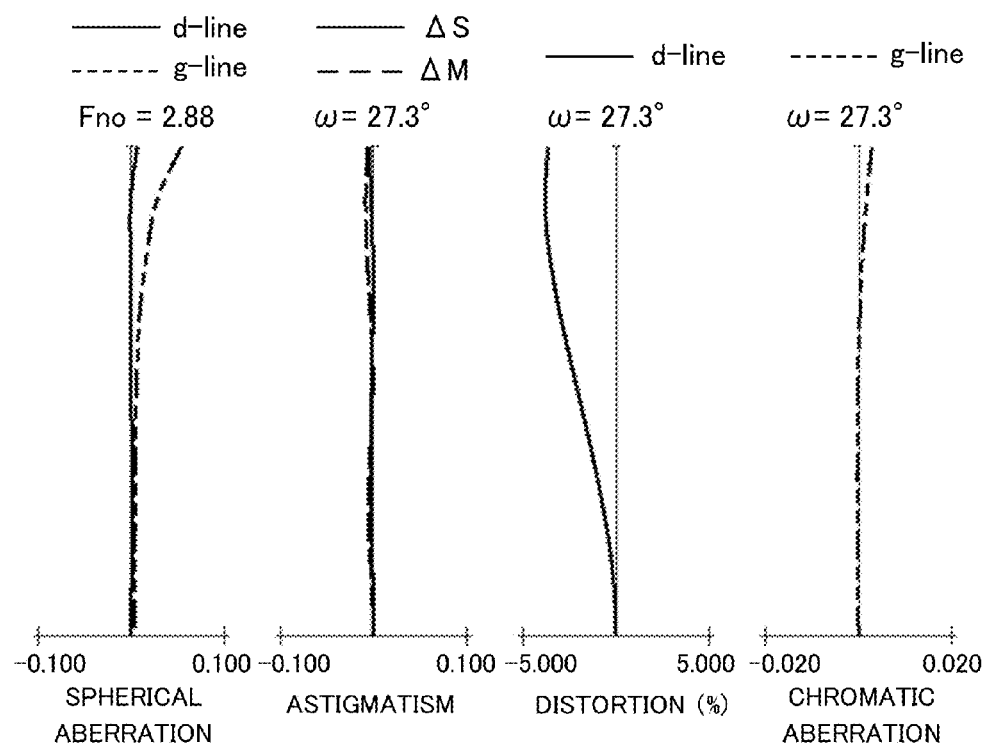
Figure 12C:
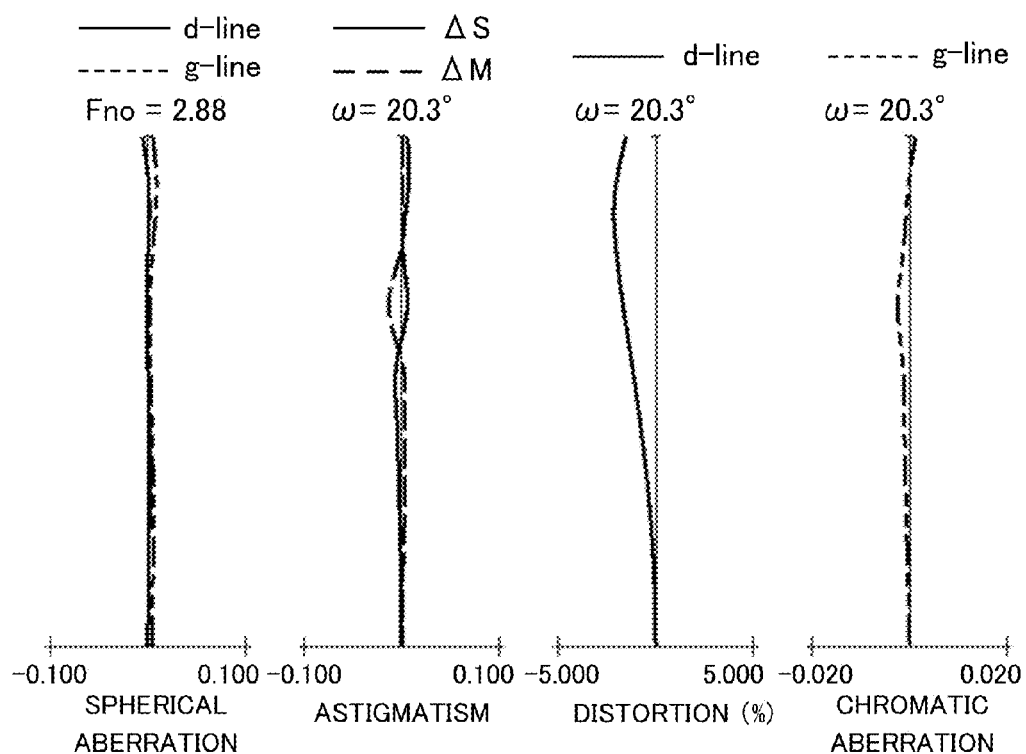
Figure 12D:
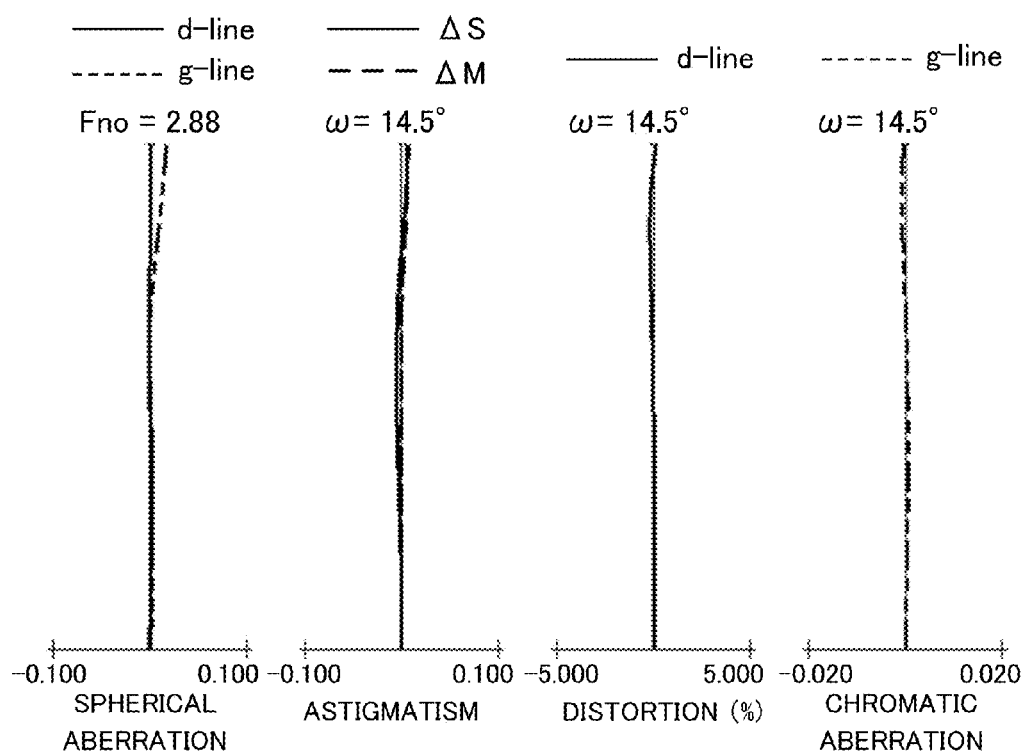
Figure 14A:
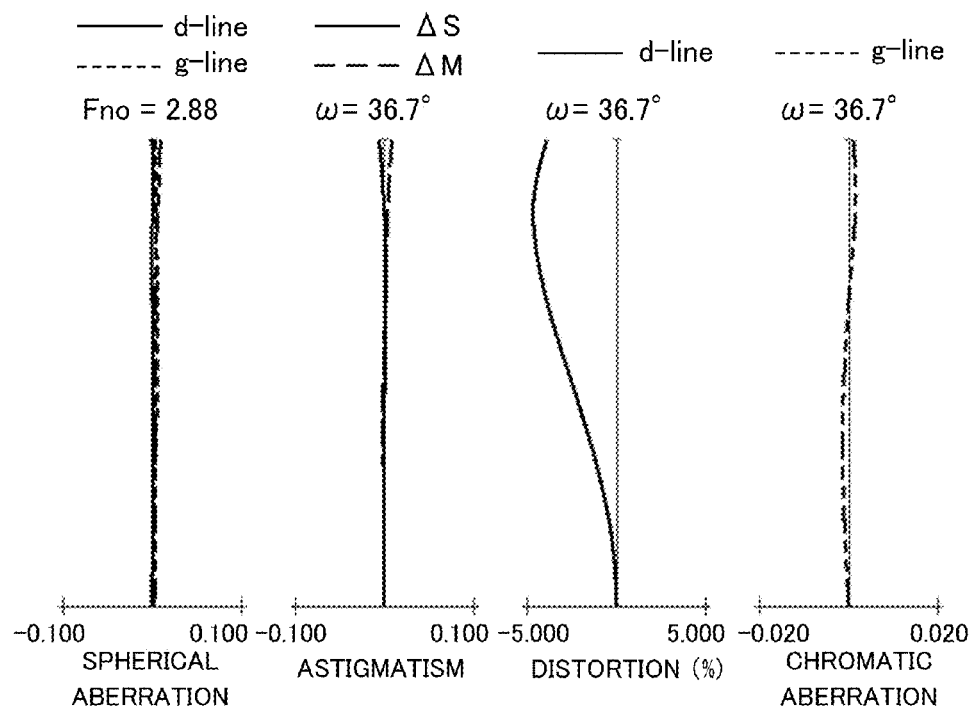
FIGS. 14A-14D are aberrational diagrams at a wide angle end, a wide-angle-middle position, a telephoto-middle position, and a telephoto end according to a numerical example 2 corresponding to the compound-eye optical system that illustrates in FIGS. 13A-13D according to the second embodiment.
Figure 14B:
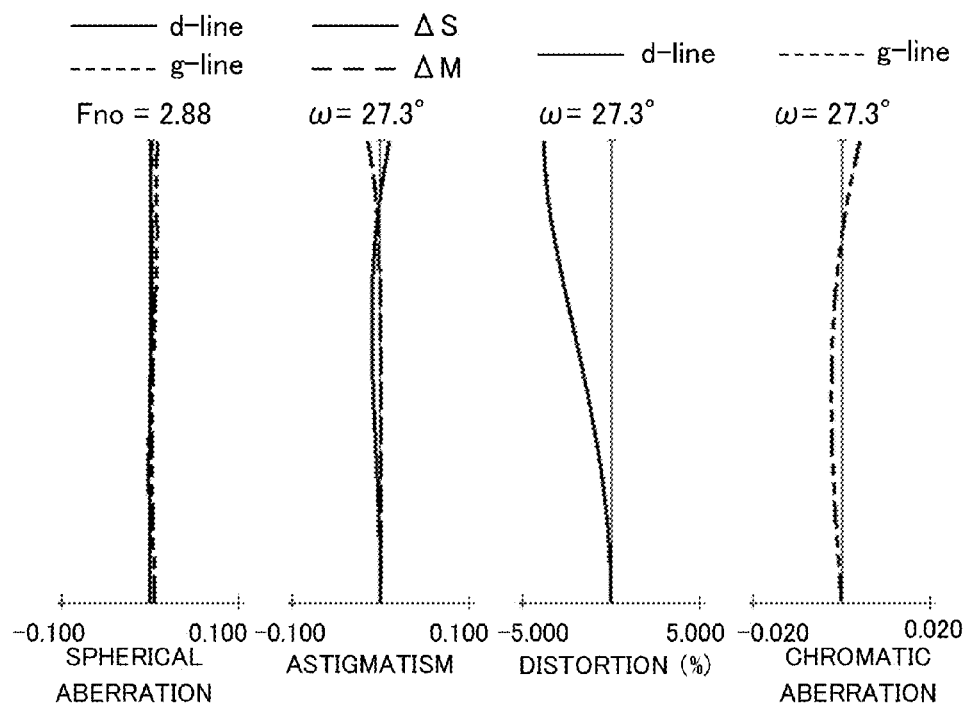
Figure 14C:
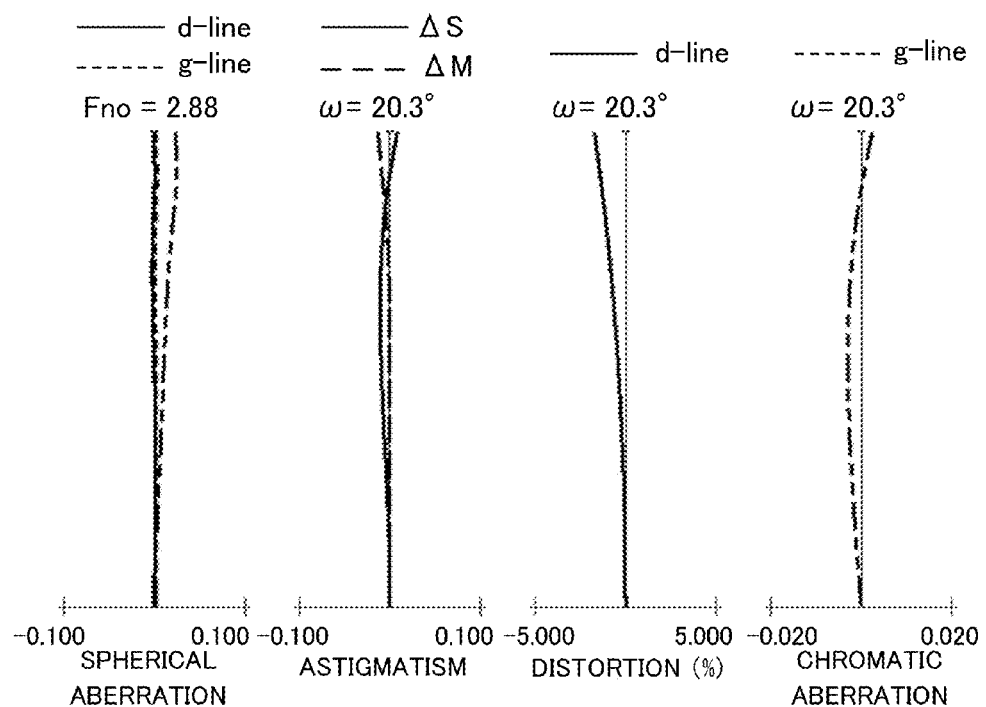
Figure 14D:
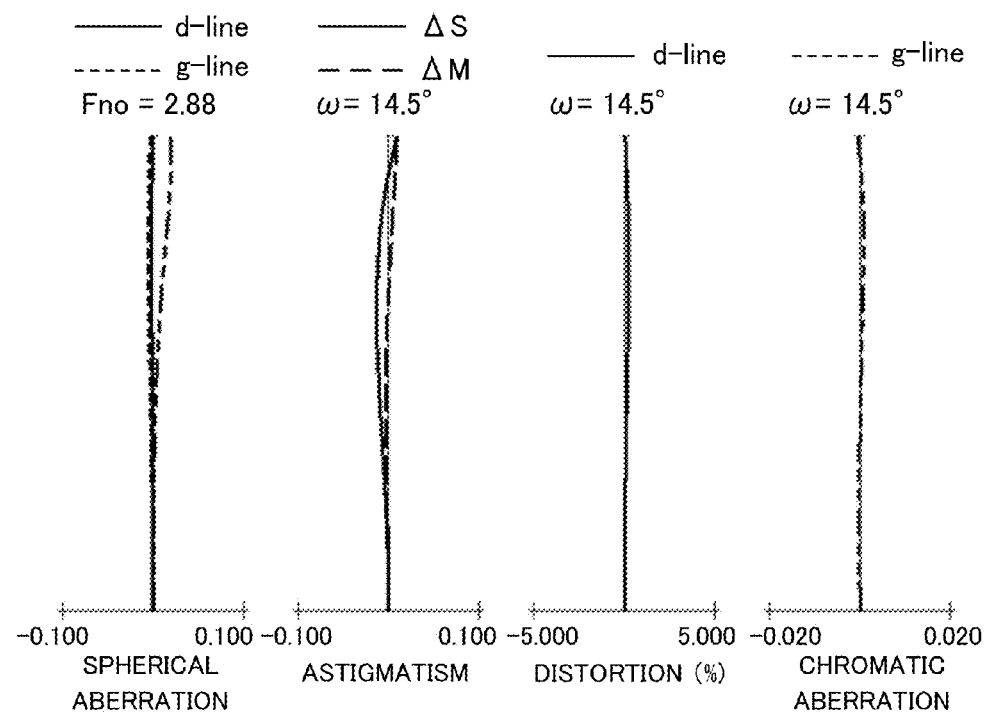
Figure 16A:
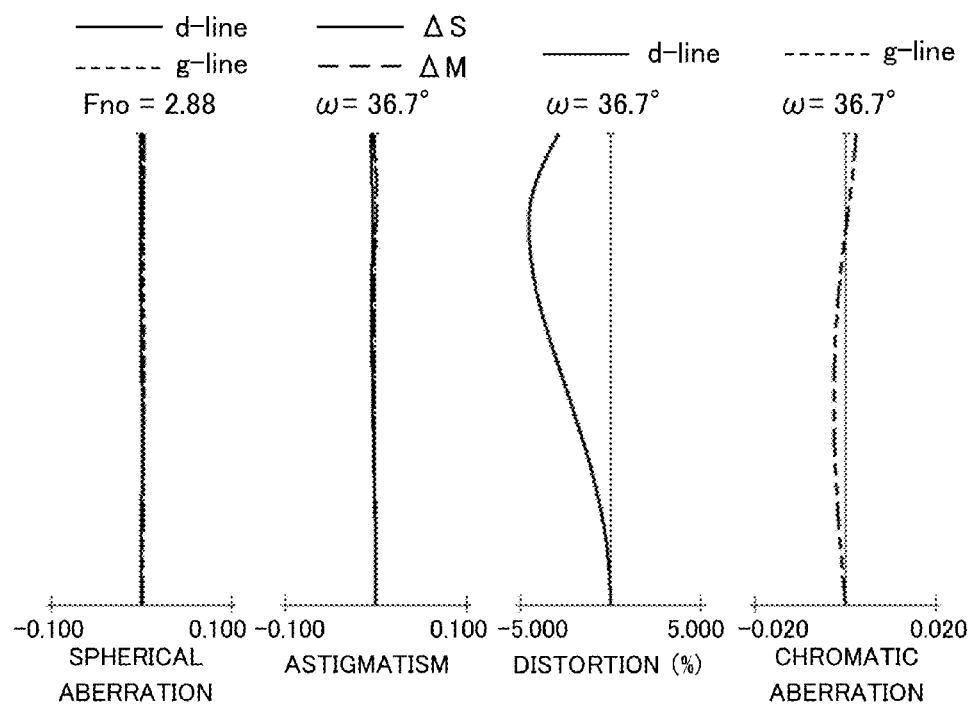
FIGS. 16A-16D are aberrational diagrams at a wide angle end, a wide-angle-middle position, a telephoto-middle position, and a telephoto end according to a numerical example 3 corresponding to the compound-eye optical system that illustrates in FIGS. 15A-15D according to the third embodiment.
Figure 16B:
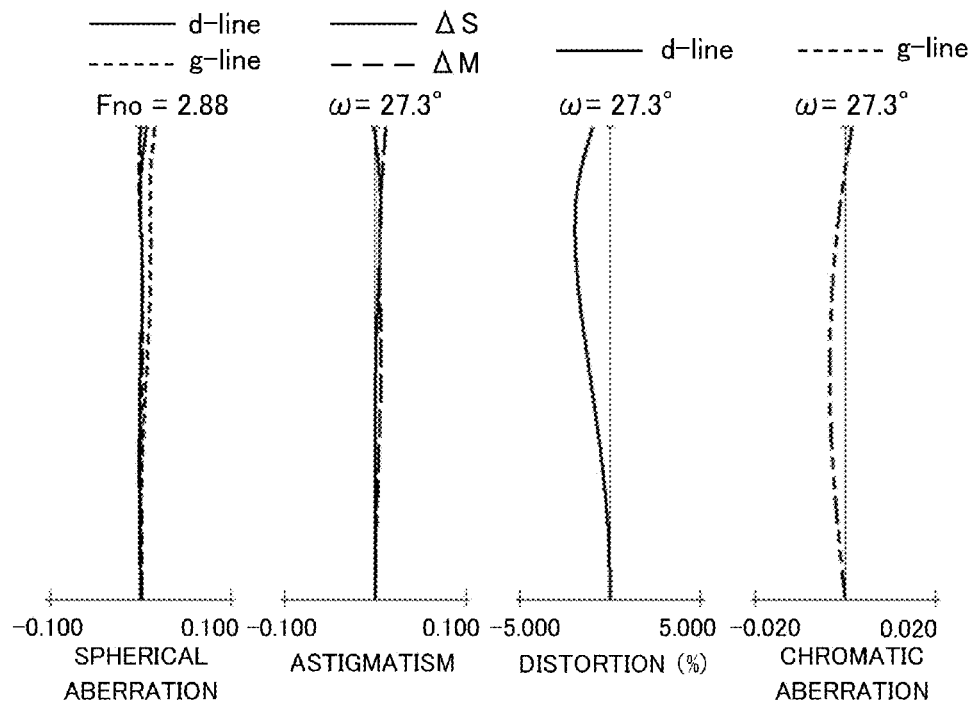
Figure 16C:
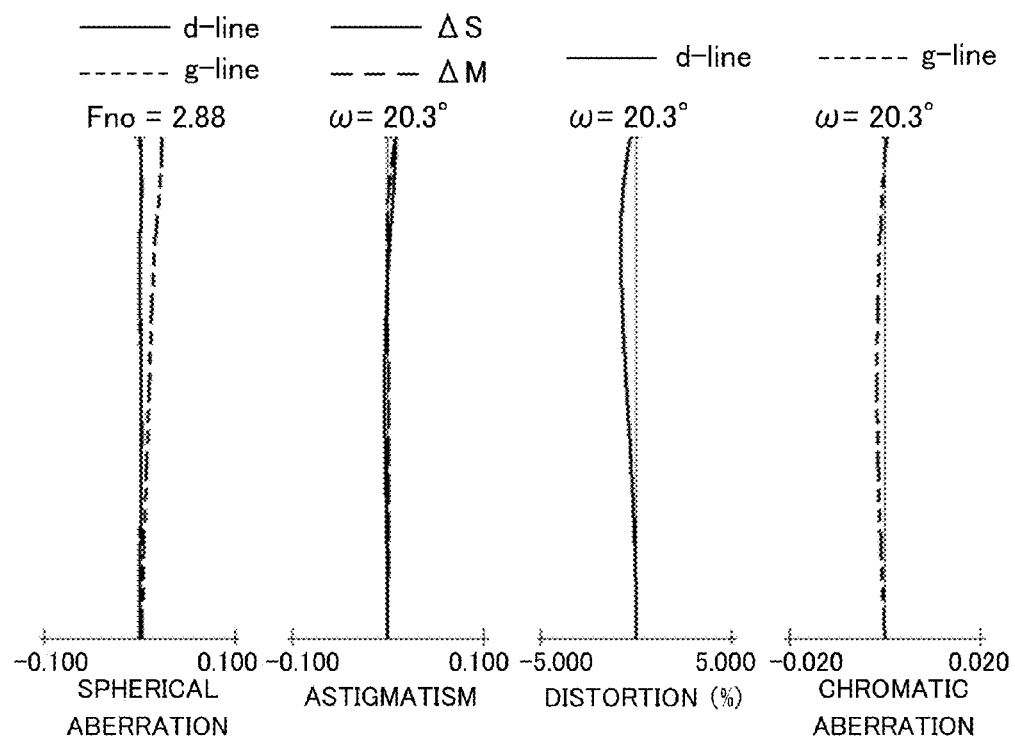
Figure 16D:
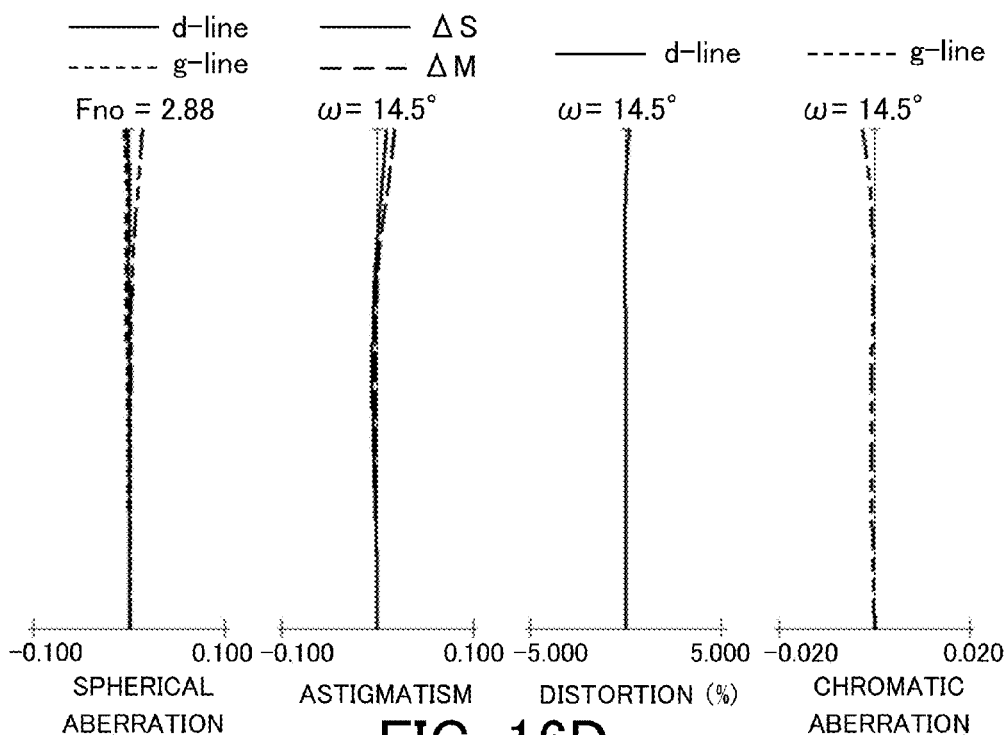

In the wide angle ommatidium illustrated in FIG. 11A, the focus unit F includes a negative meniscus lens with a concave surface facing the image side, a positive biconvex lens having an Abbe number of 68.3, and a negative lens, effectively miniaturizing the optical system and correcting the distortion and chromatic aberration. The image side unit R includes a positive biconvex lens, a positive lens, and a negative lens.

In the wide-angle-middle ommatidium illustrated in FIG. 11B, the focus unit F includes a negative meniscus lens with a concave surface facing the image side, a positive biconvex lens having an Abbe number of 68.3, and a negative lens, effectively miniaturizing the optical system and correcting the distortion and chromatic aberration. The image side unit R includes a positive biconvex lens, a positive lens, and a negative lens.

In the telephoto-middle ommatidium illustrated in FIG. 11C, the focus unit F includes a negative biconcave lens, a positive biconvex lens having an Abbe number of 68.3, and a negative lens, effectively miniaturizing the optical system and correcting the chromatic aberration. The image side unit R includes a negative meniscus lens with a concave surface facing the image side, a positive lens, and a negative meniscus lens with a concave surface facing the image side.

In the telephoto ommatidium illustrated in FIG. 11D, the focus unit F includes a positive lens, a positive biconvex lens having an Abbe number of 68.3, and a negative lens, effectively miniaturizing the optical system and correcting the chromatic aberration. The image side unit R includes a negative meniscus lens with a concave surface facing the image side, a positive lens, and a negative meniscus lens with a concave surface facing the image side.

This embodiment can simultaneously obtain the in-focus images at different angles of view as well as simplifying the focus driver. In addition, this embodiment can provide a thin and high zoom ratio compound-eye image pickup apparatus configured to zoom a captured image. In other words, this embodiment can easily turn an image pickup apparatus, such as a video camera and a digital camera, into a thin and high zoom ratio image pickup apparatus configured to obtain space information about the capturing object space Second Embodiment FIGS. 13A, 13B, 13C, and 13D are lens sectional views of a wide angle ommatidium, a wide-angle-middle ommatidium, a telephoto-middle ommatidium, and a telephoto ommatidium of a second compound-eye image pickup system according to the second embodiment. The second compound-eye optical system adopts inner focusing in which the focus unit F moves to the image side and the image side unit R is fixed in focusing from an infinite object to a short distance object.

FIGS. 14A, 14B, 14C, and 14D are aberrational diagrams of a wide angle end, a wide-angle-middle position, a telephoto-middle position, and a telephoto end according to a numerical example 2 corresponding to the second compound-eye optical system. Hereafter, a lens construction of each lens unit will be described in order from the object side to the image side.

In the wide angle ommatidium illustrated in FIG. 13A, the front unit includes a negative meniscus lens with a concave surface facing the image side, and a positive lens, effectively miniaturizing the optical system and correcting the distortion. The focus unit F includes a negative meniscus lens with a concave surface facing the image side, and a positive biconvex lens having an Abbe number of 60.1, effectively correcting the chromatic aberration. The image side unit R includes a positive biconvex lens, and a negative lens.

In the wide-angle-middle ommatidium illustrated in FIG. 13B, the front unit includes a negative meniscus lens with a concave surface facing the image side, and a negative lens, effectively miniaturizing the optical system and correcting the distortion. The focus unit F includes a negative meniscus lens with a concave surface facing the image side, and a positive biconvex lens having an Abbe number of 60.1, effectively correcting the chromatic aberration. The image side unit R includes a positive meniscus lens with a concave surface facing the image side, and a negative lens.

In the telephoto-middle ommatidium illustrated in FIG. 13C, the front unit includes a negative biconcave lens, and a positive lens, effectively miniaturizing the optical system. The focus unit F includes a negative meniscus lens with a concave surface facing the object side, and a negative lens having an Abbe number of 60.1, effectively correcting the chromatic aberration. The image side unit R includes a negative meniscus lens with a concave surface facing the image side, and a positive lens.

In the telephoto ommatidium illustrated in FIG. 13D, the front unit includes a positive lens and a positive lens, effectively miniaturizing the optical system. The focus unit F includes a negative meniscus lens with a concave surface facing the object side, and a negative lens having an Abbe number of 60.1, effectively correcting the chromatic aberration. The image side unit R includes a negative meniscus lens with a concave surface facing the image side, and a positive lens.

This embodiment can simultaneously obtain the in-focus images at different angles of view as well as simplifying the focus driver. In addition, this embodiment can provide a thin and high zoom ratio compound-eye image pickup apparatus configured to zoom a captured image. In other words, this embodiment can easily turn an image pickup apparatus, such as a video camera and a digital camera, into a thin and high zoom ratio image pickup apparatus configured to obtain space information about the capturing object space.

Third Embodiment

FIGS. 15A, 15B, 15C, and 15D are lens sectional views of a wide angle ommatidium, a wide-angle-middle ommatidium, a telephoto-middle ommatidium, and a telephoto ommatidium of a third compound-eye image pickup system according to the third embodiment. The third compound-eye optical system adopts rear focusing in which the focus unit F moves to the object side and no image side unit R exists (rear focusing type).

FIGS. 16A, 16B, 16C, and 16D are aberrational diagrams of a wide angle end, a wide-angle-middle position, a telephoto-middle position, and a telephoto end according to a numerical example 3 corresponding to the third compound-eye optical system. Hereafter, a lens construction of each lens unit will be described in order from the object side to the image side.

In the wide angle ommatidium illustrated in FIG. 15A, the front unit includes a negative meniscus lens with a concave surface facing the image side, a positive lens, a negative meniscus lens with a concave surface facing the image side, and a positive lens, effectively miniaturizing the optical system and correcting the distortion. The focus unit F includes a positive biconvex lens having an Abbe number of 68.3, a negative lens, effectively correcting the chromatic aberration.

In the wide-angle-middle ommatidium illustrated in FIG. 15B, the front unit includes a negative meniscus lens with a concave surface facing the image side, a positive lens, a negative meniscus lens with a concave surface facing the image side, and a positive lens, effectively miniaturizing the optical system and correcting the distortion. The focus unit F includes a positive meniscus lens having a concave surface facing the image side and an Abbe number of 68.3, and a negative lens, effectively correcting the chromatic aberration.

In the telephoto-middle ommatidium illustrated in FIG. 15C, the front unit includes a negative lens, a positive lens, a negative meniscus lens with a concave surface facing the image side, and a positive lens, effectively miniaturizing the optical system. The focus unit F includes a positive meniscus lens having an Abbe number of 68.3 and a concave surface facing the image side, and a negative lens, effectively correcting the chromatic aberration.

In the telephoto ommatidium illustrated in FIG. 15D, the front unit includes a negative meniscus lens with a concave surface facing the image side, a positive lens, a negative meniscus lens with a concave surface facing the image side, and a negative lens, effectively miniaturizing the optical system. The focus unit F includes a positive lens having an Abbe number of 68.3, and a positive meniscus lens with a concave surface facing the image side, effectively correcting the chromatic aberration.

This embodiment can simultaneously obtain the in-focus images at different angles of view as well as simplifying the focus driver. In addition, this embodiment can provide a thin and high zoom ratio compound-eye image pickup apparatus configured to zoom a captured image. In other words, this embodiment can easily turn an image pickup apparatus, such as a video camera and a digital camera, into a thin and high zoom ratio image pickup apparatus configured to obtain space information about the capturing object space.

Fourth Embodiment

Figure 17A:
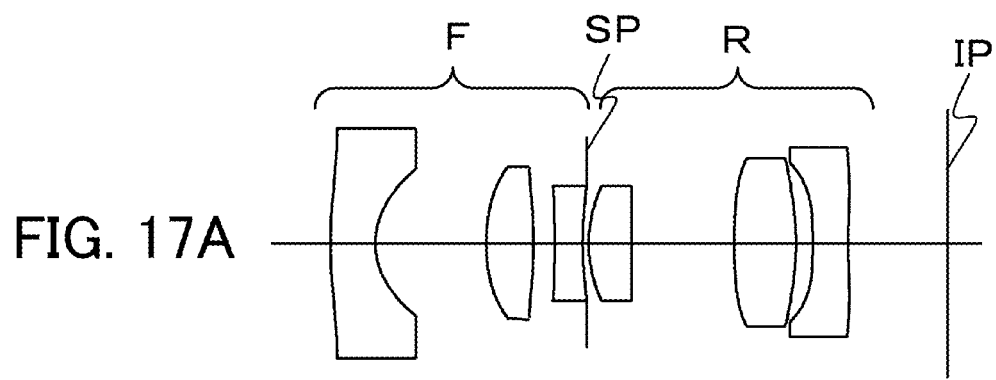
FIGS. 17A and 17B are lens sectional views of a wide angle ommatidium and a telephoto ommatidium in a compound-eye optical system according to a fourth embodiment of the present invention.
Figure 17B:
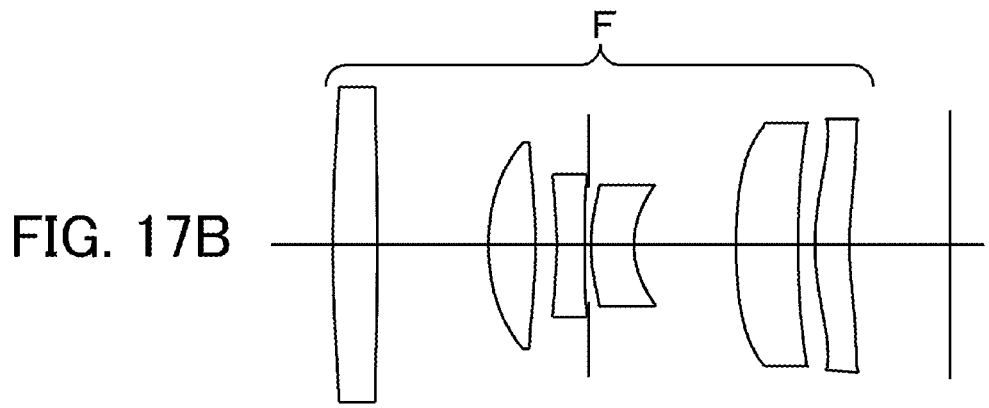

FIGS. 17A and 17B are lens sectional views of a wide angle ommatidium and a telephoto ommatidium of a fourth compound-eye image pickup system according to the fourth embodiment. In the fourth compound-eye optical system, the focus unit F moves to the object side. In the wide angle ommatidium, the image side unit R is fixed in focusing, and there is no image side unit R in the telephoto ommatidium. In other words, as a focusing method, the front focusing is used for the wide angle ommatidium and whole feeding is used for the telephoto ommatidium. The conditional expression (25) can be thus satisfied even when one unit uses whole feeding, if the other unit uses partial focusing.

Figure 18A:
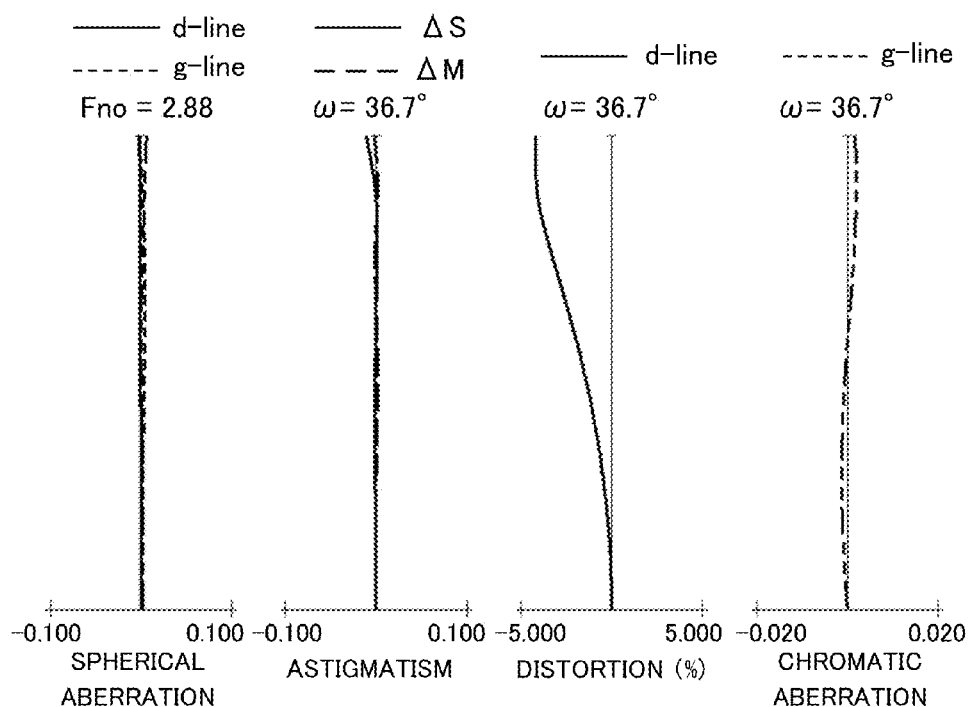
FIGS. 18A and 18B are aberrational diagrams at a wide angle end and a telephoto end according to a numerical example 4 corresponding to the compound-eye optical system that illustrates in FIGS. 17A and 17B according to the fourth embodiment.
Figure 18B:
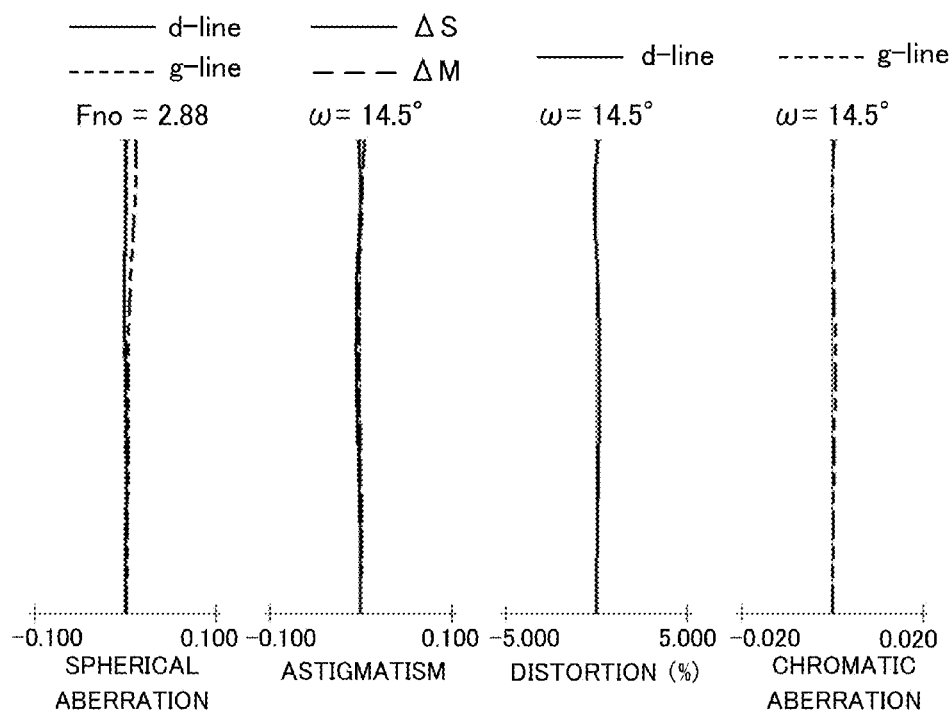

FIGS. 18A and 18B are aberrational diagrams of a wide angle end and a telephoto end according to a numerical example 4 corresponding to the fourth compound-eye optical system. Hereinafter, a lens structure of each lens unit will be described in order of the object side and the image side.

In the wide angle ommatidium illustrated in FIG. 17A, the focus unit F includes a negative meniscus lens with a concave surface facing the image side, a positive biconvex lens having an Abbe number of 68.3, and a negative lens, effectively correcting the chromatic aberration and correcting the distortion and chromatic aberration. The image side unit R includes a positive lens, a positive lens, and a negative meniscus lens with a concave surface facing the object side.

In the telephoto ommatidium illustrated in FIG. 17B, the focus unit F includes a positive biconvex lens, a positive biconvex lens having an Abbe number of 68.3, a negative lens, a negative meniscus lens with a concave surface facing the image side, a positive lens, and a positive lens.

This embodiment can simultaneously obtain the in-focus images at different angles of view as well as simplifying the focus driver. In addition, this embodiment can provide a thin and high zoom ratio compound-eye image pickup apparatus configured to zoom a captured image. In other words, this embodiment can easily turn an image pickup apparatus, such as a video camera and a digital camera, into a thin and high zoom ratio image pickup apparatus configured to obtain space information about the capturing object space.

Fifth Embodiment

FIGS. 23A, 23B, 23C, and 23D are lens sectional views of a wide angle ommatidium, a wide-angle-middle ommatidium, a telephoto-middle ommatidium, and a telephoto ommatidium of a fifth compound-eye image pickup system according to the fifth embodiment. FIGS. 24A, 24B, 24C, and 24D are aberrational diagrams of a wide angle end, a wide-angle-middle position, a telephoto-middle position, and a telephoto end corresponding to the fifth compound-eye optical system.

The fifth compound-eye optical system adopts front focusing in which the focus unit F moves to the object side and the image side unit R is fixed in focusing upon the infinite object to the short distance object. Hereafter, a lens construction of each lens unit will be described in order from the object side to the image side.

In the wide angle ommatidium illustrated in FIG. 23A, the focus unit F includes a negative meniscus lens with a concave surface facing the image side, a positive lens having an Abbe number of 68.3, and a negative lens, effectively miniaturizing the optical system and correcting the distortion and chromatic aberration. The image side unit R includes a positive biconvex lens, a positive lens, and a negative lens.

In the wide-angle-middle ommatidium illustrated in FIG. 23B, the focus unit F includes a negative lens, a positive lens having an Abbe number of 68.3, and a negative lens, effectively miniaturizing the optical system and correcting the chromatic aberration. The image side unit R includes a positive biconvex lens, a positive lens, and a negative lens.

In the telephoto-middle ommatidium illustrated in FIG. 23C, the focus unit F includes a negative biconcave lens, a positive biconvex lens having an Abbe number of 68.3, and a negative lens, effectively miniaturizing the optical system and correcting the chromatic aberration. The image side unit R includes a negative meniscus lens with a concave surface facing the image side, a positive lens, and a negative meniscus lens with a concave surface facing the image side.

In the telephoto ommatidium illustrated in FIG. 23D, the focus unit F includes a positive lens, a positive lens having an Abbe number of 68.3, and a negative lens, effectively miniaturizing the optical system and correcting the chromatic aberration. The image side unit R includes a negative meniscus lens with a concave surface facing the image side, a positive lens, and a positive meniscus lens with a concave surface facing the image side.

This embodiment can simultaneously obtain the in-focus images at different angles of view as well as simplifying the focus driver. In addition, this embodiment can provide a thin and high zoom ratio compound-eye image pickup apparatus configured to zoom a captured image. In other words, this embodiment can easily turn an image pickup apparatus, such as a video camera and a digital camera, into a thin and high zoom ratio image pickup apparatus configured to obtain space information about the capturing object space.

Sixth Embodiment

FIGS. 27A, 27B, 27C, and 27D are lens sectional views of a wide angle ommatidium, a wide-angle-middle ommatidium, a telephoto-middle ommatidium, and a telephoto ommatidium of a sixth compound-eye image pickup system according to the sixth embodiment. FIGS. 28A, 28B, 28C, and 28D are aberrational diagrams of a wide angle end, a wide-angle-middle position, a telephoto-middle position, and a telephoto end corresponding to the sixth compound-eye optical system.

The sixth compound-eye optical system adopts front focusing in which the focus unit F moves to the object side and the image side unit R is fixed in focusing upon the infinite object to the short distance object. A lens structure of each lens unit will be described in order from the object side to the image side.

In the wide angle ommatidium illustrated in FIG. 27A, the focus unit F includes two negative meniscus lenses each having a concave surface facing the image side, and a positive meniscus lens with a convex surface facing the image side, effectively miniaturizing the optical system and correcting the distortion and chromatic aberration. The image side unit R includes a positive biconvex lens, a negative meniscus lens with a concave surface facing the image side, and a negative biconcave lens.

In the wide-angle-middle ommatidium illustrated in FIG. 27B, the focus unit F includes two negative meniscus lenses each having a concave surface facing the image side, and a positive meniscus lens with a convex surface facing the image side, effectively miniaturizing the optical system and correcting the distortion and the chromatic aberration. The image side unit R includes a positive biconvex lens, a negative meniscus lens with a concave surface facing the image side, and a negative biconcave lens.

In the telephoto-middle ommatidium illustrated in FIG. 27C, the focus unit F includes a positive meniscus lens with a concave surface facing the image side, a negative biconcave lens, and a positive biconvex lens, effectively miniaturizing the optical system and correcting the chromatic aberration. The image side unit R includes a negative lens, a positive biconvex lens, and a negative meniscus lens with a concave surface facing the image side.

In the telephoto ommatidium illustrated in FIG. 27D, the focus unit F includes a positive meniscus lens with a concave surface facing the image side, a negative biconcave lens, and a positive biconvex lens, effectively miniaturizing the optical system and correcting the chromatic aberration. The image side unit R includes a positive meniscus lens with a convex surface facing the image side, a negative meniscus lens with a concave surface facing the image side, and a negative meniscus lens with a concave surface facing the image side.

This embodiment can simultaneously obtain the in-focus images at different angles of view as well as simplifying the focus driver. In addition, this embodiment can provide a thin and high zoom ratio compound-eye image pickup apparatus configured to zoom a captured image. In other words, this embodiment can easily turn an image pickup apparatus, such as a video camera and a digital camera, into a thin and high zoom ratio image pickup apparatus configured to obtain space information about the capturing object space.

Seventh Embodiment

FIGS. 29A, 29B, 29C, and 29D are lens sectional views of a wide angle ommatidium, a wide-angle-middle ommatidium, a telephoto-middle ommatidium, and a telephoto ommatidium of a seventh compound-eye image pickup system according to the seventh embodiment. FIGS. 30A, 30B, 30C, and 30D are aberrational diagrams of a wide angle end, a wide-angle-middle position, a telephoto-middle position, and a telephoto end corresponding to the seventh compound-eye optical system.

The seventh compound-eye optical system adopts front focusing in which the focus unit F moves to the object side and the image side unit R is fixed in focusing upon the infinite object to the short distance object. A lens structure of each lens unit will be described in order from the object side to the image side.

Figure 29A:
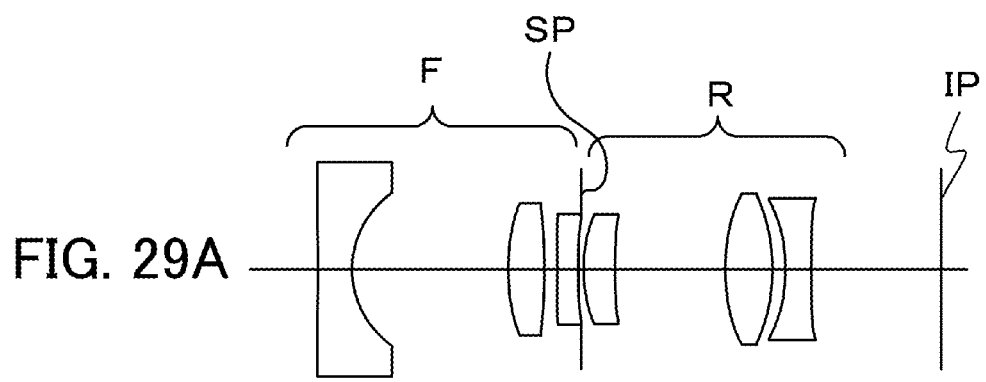
FIGS. 29A-29D are lens sectional views of a wide angle ommatidium, a wide-angle-middle ommatidium, a telephoto-middle ommatidium, and a telephoto ommatidium of the compound-eye optical system according to a seventh embodiment of the present invention.

In the wide angle ommatidium illustrated in FIG. 29A, the focus unit F includes a negative meniscus lens with a concave surface facing the image side, a positive biconvex lens having an Abbe number of 68.3, and a negative meniscus lens with a convex surface facing the image side, effectively miniaturizing the optical system and correcting the distortion and chromatic aberration. The image side unit R includes a positive meniscus lens with a convex surface facing the image side, a positive biconvex lens, and a negative biconcave lens.

Figure 29B:
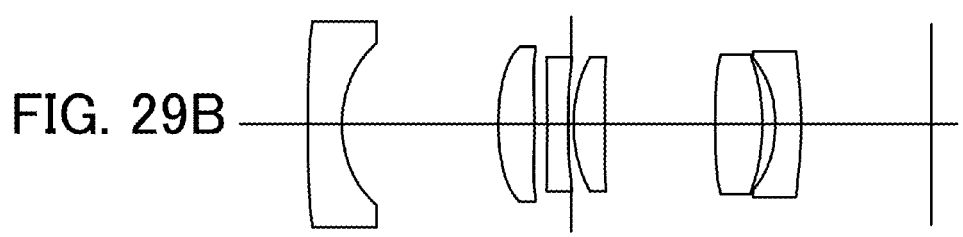

In the wide-angle-middle ommatidium illustrated in FIG. 29B, the focus unit F includes a negative meniscus lens with a concave surface facing the image side, a positive lens having an Abbe number of 68.3, and a negative biconcave lens, effectively miniaturizing the optical system and correcting the distortion and the chromatic aberration. The image side unit R includes two positive biconvex lenses, and a negative meniscus lens with a convex surface facing the image side.

Figure 29C:
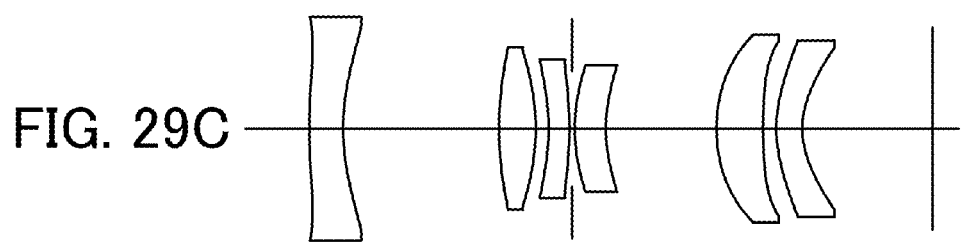

In the telephoto-middle ommatidium illustrated in FIG. 29C, the focus unit F includes a negative meniscus lens with a concave surface facing the image side, a positive lens having an Abbe number of 68.3, and a negative meniscus lens with a convex surface facing the image side, effectively miniaturizing the optical system and correcting the chromatic aberration. The image side unit R includes a negative meniscus lens with a concave surface facing the image side, a positive lens, and a negative meniscus lens with a concave surface facing the image side.

Figure 29D:
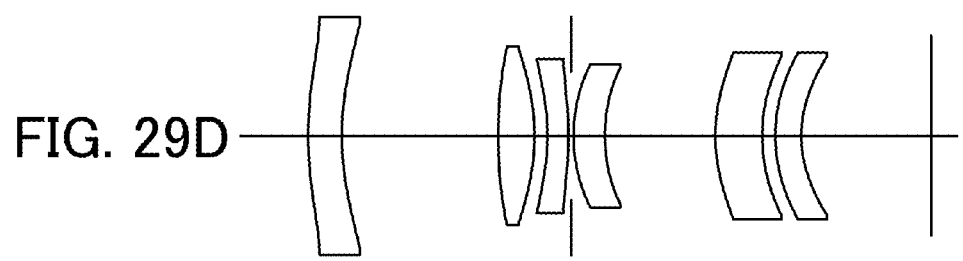
Figure 30A:
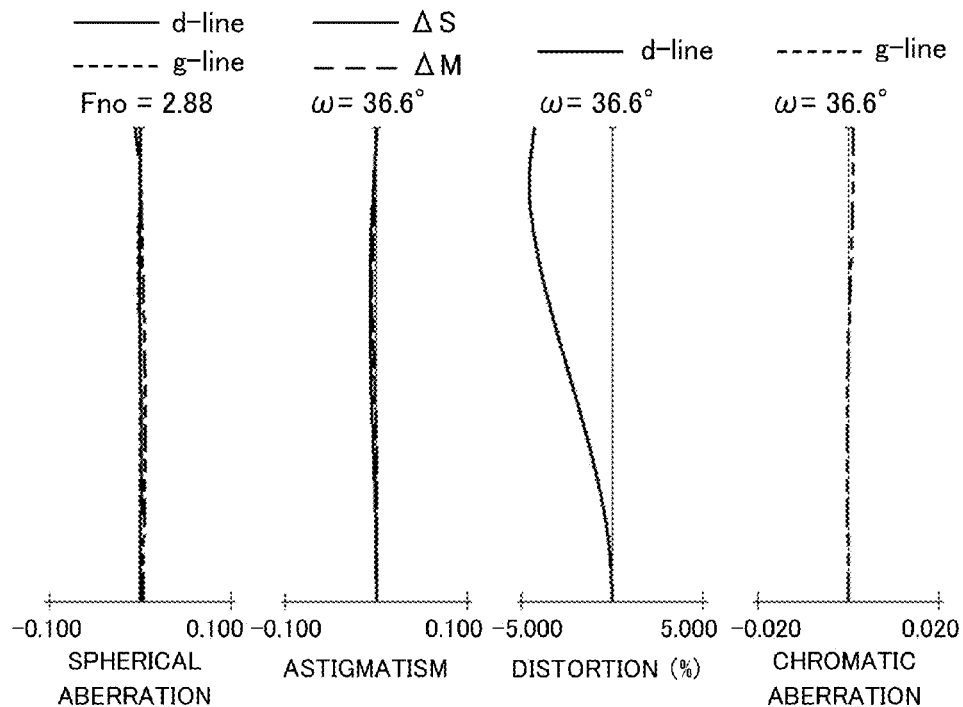
FIGS. 30A-30D are aberrational diagrams at a wide angle end, a wide-angle-middle position, a telephoto-middle position, and a telephoto end according to a numerical example 7 corresponding to the compound-eye optical system that illustrates in FIGS. 29A-29D according to the seventh embodiment.
Figure 30B:
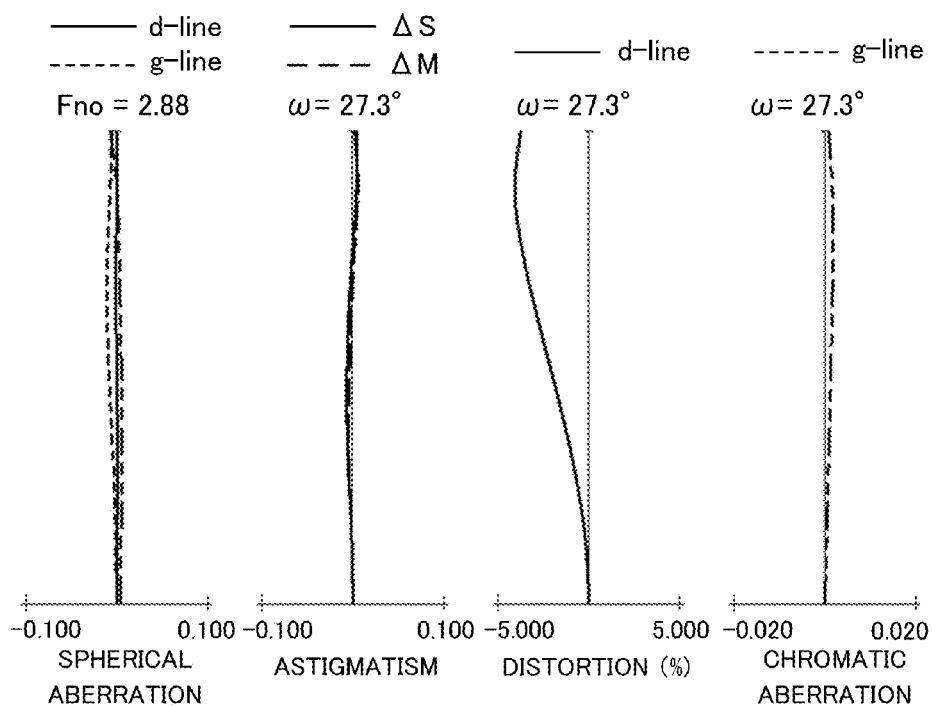
Figure 30C:
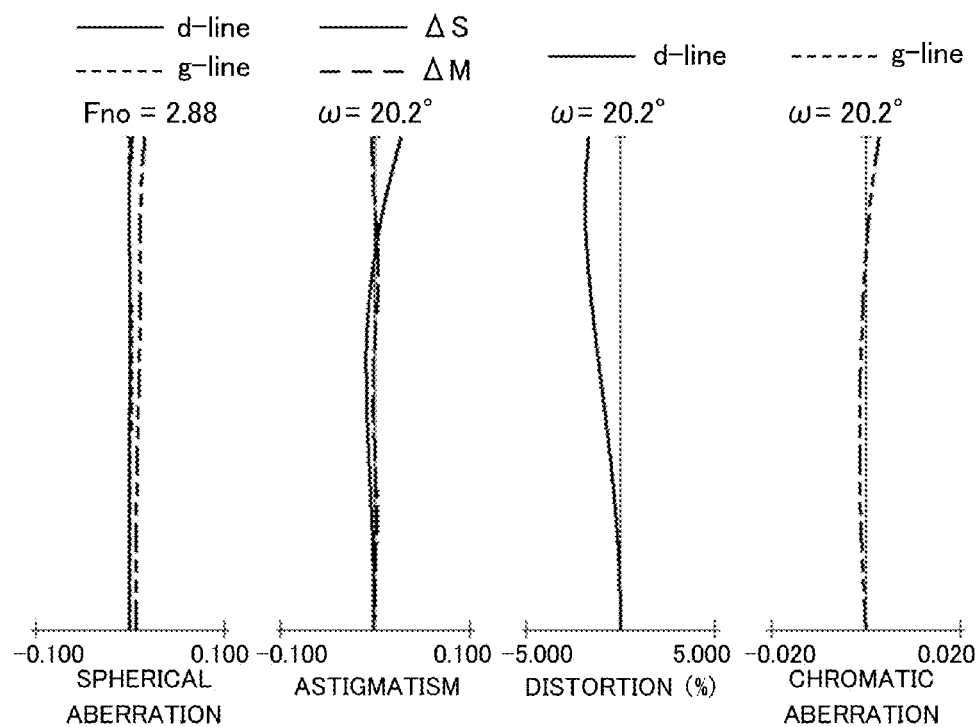
Figure 30D:
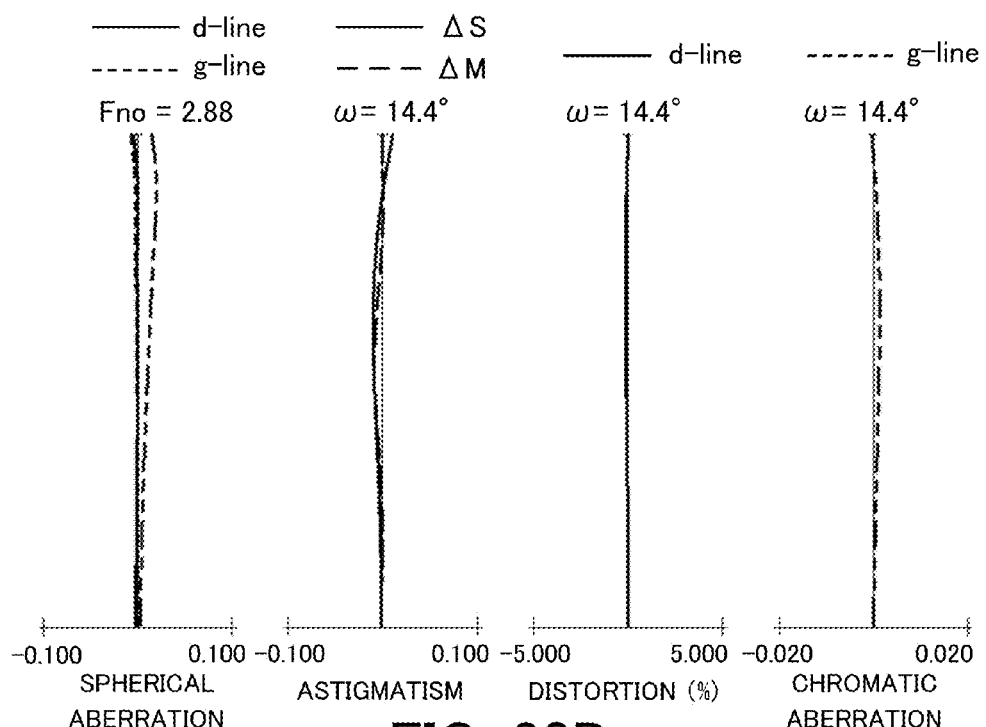

In the telephoto ommatidium illustrated in FIG. 29D, the focus unit F includes a negative meniscus lens with a concave surface facing the image side, a positive biconvex lens having an Abbe number of 68.3, and a negative meniscus lens with a convex surface facing the image side, effectively miniaturizing the optical system and correcting the chromatic aberration. The image side unit R includes two positive meniscus lenses each having a convex surface facing the image side, and a negative meniscus lens with a concave surface facing the image side.

This embodiment can simultaneously obtain the in-focus images at different angles of view as well as simplifying the focus driver. In addition, this embodiment can provide a thin and high zoom ratio compound-eye image pickup apparatus configured to zoom a captured image. In other words, this embodiment can easily turn an image pickup apparatus, such as a video camera and a digital camera, into a thin and high zoom ratio image pickup apparatus configured to obtain space information about the capturing object space.

While the image pickup units illustrated in FIGS. 1 to 3 each includes two lenses, such as the focus unit F and image side unit R, may include a focus unit holder and a driver according to the optical systems from the first to seventh embodiments.

Specific numeric data of numerical examples 1 to 7 corresponding to the first to seventh image pickup systems will be described. In each numeric example, "i" denotes a surface number counted from the object side. "ri" denotes a radius of curvature on an i-th optical surface (i-th surface). "di" denotes an axial interval between the i-th surface and the (i+1)-th surface. "ndi" and "vdi" are a refractive index and an Abbe number of a material of the i-th optical element for the d-line. "f" denotes a focal length, Fno denotes an F-number, and "ω" denotes half an angle of view. An interval d of 0 means joining between the front and back surfaces.

An aspheric shape is expressed by a radius of curvature R and aspheric coefficients K, A3, A4, A5, A6, A7, A8, A9, A10, A11, and A12:

$$X=(H^2/R)/[1+\{1-(1+K)(H/R)2\}^{1/2}]+A3 \cdot H^3+A4 \cdot H^4+ A5 \cdot H^5+A6 \cdot H^6+A7 \cdot H^7+A8 \cdot H^8+A9 \cdot H^9+A10 \cdot H_{10}+ A11 \cdot H^{11}+A12 \cdot H^{12} \quad (48)$$

"E±XX" in each aspheric coefficient means "×10±XX".

Table 1 summarizes a relationship between the conditional expression (25) and each numerical example. For simplicity, as the calculation condition of the conditional expression, a focal length and lateral magnifications of the focus unit F and the image side unit R located on the image side of the focus unit F of the optical system having the longest focal length in each compound-eye optical system are substituted for $f_h$, $\beta_{Fh}$, and $\beta_{Rh}$ in the conditional expression (25). The focal length and lateral magnifications of the focus unit F and the image side unit R located on the image side of the focus unit F of the target imaging optical system are substituted for $f_i$, $\beta_{Fi}$, and $\beta_{Ri}$ in the conditional expression (25). When each optical system satisfies the conditional expression (25) in this calculation condition, all ommatidium optical systems can be focused upon the same object even with the same moving amount of the focus unit as that of the telephoto ommatidium having the shallowest depth of focus.

Table 2 summarizes a relationship between the conditional expression (39) and the numerical examples 1 to 5. Table 3 summarizes a relationship between the conditional expression (40) and the numerical examples 1 to 5. Table 4 summarizes a relationship between the conditional expression (41) and the numerical examples 1 to 5. Table 9 is a list of the focal length of each focus unit in the numerical examples 1 and 4 to 7, and Table 5 summarizes the conditional expression (35) and the numerical examples 1 and 4 to 7. Although the conditional expression (35) is established in each compound-eye image pickup system, Table 5 illustrates only part of it. More specifically, in Table 5, the focal length of the focus unit of the optical system that has the longest focal length among the compound-eye optical systems is substituted for ffh of the conditional expression (35) and the focal length of the focus unit of the target imaging optical system is substituted for ffi of the conditional expression (35). When each optical system satisfies the conditional expression (35) in this calculation condition, all ommatidium optical systems can be focused upon the same object even with the same moving amount of the focus unit as that of the telephoto ommatidium having the shallowest depth of focus.

Table 10 summarizes a distance from the front principal point position of each focus unit in the numerical examples 1 and 4 to 7 to the image plane. Table 6 summarizes a relationship between the conditional expression (36) and each numerical example. Each imaging optical system that satisfies the conditional expression (36) enables in-focus images to be simultaneously obtained for a shorter distance object.

Table 3 summarizes a relationship between the conditional expression (37) and each numerical example. Although the conditional expression (37) is established among the optical systems having different focal lengths of the focus units, Table 7 describes only part, or maximum and minimum values of the conditional expression (37). The maximum value is calculated with the ommatidia A and C and the minimum value is calculated with the ommatidia B and D in the numerical examples 1, 5, 6, and 7, Table 7 describes these values. The numerical example is directed to a two-ommatidium optical system, and Table 7 calculates both maximum and minimum values with the ommatidia A and B. In each numerical example, each imaging optical system that satisfies the conditional expression (37) enables in-focus images to be simultaneously obtained for a shorter distance object.

Table 8 summarizes a relationship between the conditional expression (38) and each numerical example. Each imaging optical system that satisfies the conditional expression (38) has a different focal length and approximately the same focusing moving amount, corrects a variety of aberrations well.

Values of the focal length, the F number, and the angle of view are obtained the infinite object is brought into a focus. BF denotes a value in which a distance from the final lens surface to the image plane is converted by air.

NUMERICAL EXAMPLE 1

| Wide-angle ommatidium Unit mm | | | | | |
|---|---|---|---|---|---|
| surface data | | | | | |
| surface no | r | d | nd | vd | effective diameter |
| 1* | 40.382 | 1.30 | 1.62041 | 60.3 | 5.88 |
| 2* | 2.411 | 2.67 | | | 4.00 |
| 3* | 6.203 | 1.40 | 1.59240 | 68.3 | 3.87 |
| 4* | −11.433 | 0.50 | | | 3.49 |
| 5* | −62.116 | 0.80 | 1.80518 | 25.4 | 3.14 |
| 6* | 15.255 | 0.10 | | | 3.13 |
| 7(diaphragm) | ∞ | 0.10 | | | 3.14 |
| 8* | 6.018 | 1.20 | 1.64000 | 60.1 | 3.20 |
| 9* | −12.756 | 3.48 | | | 3.11 |
| 10* | 9.928 | 1.80 | 1.59240 | 68.3 | 4.65 |
| 11* | −11.658 | 0.50 | | | 4.57 |

-continued

| | | | | | |
|---|---|---|---|---|---|
| 12* | −28.136 | 1.00 | 1.84666 | 23.8 | 4.44 |
| 13* | 8.934 | | | | 5.01 |
| Image plane | ∞ | | | | |

Aspheric data

First surface

K = −8.61567e+001   A4 = −9.22230e−004   A6 = 4.19663e−005

Second surface

K = −9.30223e−001   A4 = 7.19408e−003   A6 = 6.36185e−004

Third surface

K = 3.54414e+000   A4 = 2.81499e−003   A6 = 2.34019e−004

Fourth surface

K = −3.53906e+000   A4 = 1.43935e−003   A6 = 1.07092e−004

Fifth surface

K = 3.15676e+000   A4 = 1.79932e−003   A6 = −9.65503e−004

Sixth surface

K = 4.96423e+001   A4 = 1.09416e−003   A6 = −7.97966e−004

Eighth surface

K = −3.06847e+000   A4 = −1.51330e−004   A6 = 3.84651e−004

Ninth surface

K = 9.75797e+000   A4 = −3.28928e−004   A6 = 5.50566e−004

Tenth surface

K = −1.10481e+001   A4 = 2.90917e−004   A6 = 5.26599e−004

Eleventh surface

K = 1.72650e+001   A4 = −4.08824e−003   A6 = 9.11055e−004

Twelfth surface

K = −7.35482e+001   A4 = −1.54275e−002   A6 = 3.85072e−004

Thirteenth surface

K = 7.43385e+000   A4 = −1.07701e−002   A6 = 4.92519e−004

Various data

| | |
|---|---|
| Focal length | 5.20 |
| Fno | 2.88 |
| Angle of view | 36.69 |
| Image height | 3.88 |
| Lens overall length | 17.91 |
| BF | 3.06 |
| Entrance pupil position | 3.15 |
| Exit pupil position | −4.86 |
| Front principal point position | 4.94 |
| Rear principal points position | −2.14 |

Single lens data

| Lens | starting surface | Focal length |
|---|---|---|
| 1 | 1 | −4.19 |
| 2 | 3 | 6.99 |
| 3 | 5 | −15.14 |
| 4 | 8 | 6.55 |
| 5 | 10 | 9.34 |
| 6 | 12 | −7.91 |

Wide-angle-middle ommatidium
Unit mm surface data

| surface no | r | d | nd | vd | effective diameter |
|---|---|---|---|---|---|
| 1* | 6.194 | 1.30 | 1.62041 | 60.3 | 5.61 |
| 2* | 2.200 | 2.67 | | | 4.05 |
| 3* | 6.346 | 1.40 | 1.59240 | 68.3 | 3.96 |
| 4* | −26.449 | 0.50 | | | 3.86 |
| 5* | −41.518 | 0.80 | 1.80518 | 25.4 | 3.76 |
| 6* | 14.348 | 0.10 | | | 3.77 |
| 7(diaphragm) | ∞ | 0.10 | | | 3.75 |
| 8* | 4.979 | 1.20 | 1.64000 | 60.1 | 3.89 |
| 9* | −7.878 | 3.48 | | | 3.82 |
| 10* | −7.653 | 1.80 | 1.59240 | 68.3 | 4.02 |
| 11* | −7.611 | 0.50 | | | 4.64 |
| 12* | −12.407 | 1.00 | 1.84666 | 23.8 | 4.60 |
| 13* | 52.342 | | | | 5.45 |
| Image plane | ∞ | | | | |

Aspheric data

First surface

K = −5.86699e+000   A4 = −8.96118e−004   A6 = 1.23087e−006

Second surface

K = −1.11462e+000   A4 = 5.18382e−003   A6 = 7.47793e−004

Third surface

K = 2.23083e+000   A4 = 2.29189e−003   A6 = 9.11689e−005

Fourth surface

K = 3.98608e+001   A4 = −1.07969e−003   A6 = −1.03444e−004

Fifth surface

K = −2.66134e+001   A4 = 2.91291e−004   A6 = −5.80559e−004

Sixth surface

K = 3.25993e+001   A4 = 1.05064e−003   A6 = −3.89850e−004

Eighth surface

K = −3.31035e+000   A4 = 9.36039e−004   A6 = 4.48060e−005

Ninth surface

K = 1.62170e+000   A4 = −1.30807e−004   A6 = 1.97962e−004

Tenth surface

K = −1.84308e+001   A4 = −9.71624e−003   A6 = 5.68105e−004

Eleventh surface

K = −2.88780e+001   A4 = −1.01570e−002   A6 = 1.38466e−004

Twelfth surface

K = −9.00000e+001   A4 = −1.47730e−002   A6 = −1.20913e−005

Thirteenth surface

K = −5.42659e+001   A4 = −8.67083e−003   A6 = 3.90008e−004

Various data

| | |
|---|---|
| Focal length | 7.50 |
| Fno | 2.88 |
| Angle of view | 27.32 |
| Image height | 3.88 |
| Lens overall length | 17.91 |
| BF | 3.06 |
| Entrance pupil position | 4.05 |
| Exit pupil position | −4.94 |
| Front principal point position | 4.52 |
| Rear principal points position | −4.44 |

Single lens data

| Lens | starting surface | Focal length |
|---|---|---|
| 1 | 1 | −6.28 |
| 2 | 3 | 8.78 |
| 3 | 5 | −13.16 |
| 4 | 8 | 4.95 |

-continued

| 5 | 10 | 138.07 |
| 6 | 12 | −11.76 |

Telephoto-middle ommatidium
Unit mm surface data

| surface no | r | d | nd | vd | effective diameter |
|---|---|---|---|---|---|
| 1* | −14.915 | 1.30 | 1.62041 | 60.3 | 6.70 |
| 2* | 69.090 | 2.67 | | | 6.19 |
| 3* | 5.672 | 1.40 | 1.59240 | 68.3 | 5.30 |
| 4* | −7.487 | 0.50 | | | 5.08 |
| 5* | −9.447 | 0.80 | 1.80518 | 25.4 | 4.14 |
| 6* | −22.100 | 0.10 | | | 3.74 |
| 7(diaphragm) | ∞ | 0.10 | | | 3.67 |
| 8* | 3.929 | 1.20 | 1.64000 | 60.1 | 3.60 |
| 9* | 2.484 | 3.48 | | | 3.41 |
| 10* | 6.037 | 1.80 | 1.59240 | 68.3 | 6.30 |
| 11* | 21.097 | 0.50 | | | 6.25 |
| 12* | 13.374 | 1.00 | 1.84666 | 23.8 | 6.25 |
| 13* | 6.940 | | | | 5.99 |
| Image plane | ∞ | | | | |

Aspheric data

First surface

K = 3.23218e+000  A4 = −3.05400e−004  A6 = 4.53521e−005

Second surface

K = −9.00000e+001  A4 = 1.59130e−004  A6 = 5.15981e−005

Third surface

K = −1.64767e+000  A4 = 2.27739e−003  A6 = −6.09668e−006

Fourth surface

K = −7.51140e+000  A4 = 2.83658e−004  A6 = 7.41960e−005

Fifth surface

K = 8.77500e+000  A4 = 1.90647e−004  A6 = 7.09546e−004

Sixth surface

K = 7.06211e+000  A4 = −1.29880e−003  A6 = 6.54962e−004

Eighth surface

K = −7.69118e−001  A4 = −1.53255e−003  A6 = −1.23634e−004

Ninth surface

K = −9.82229e−001  A4 = 2.51720e−004  A6 = −1.95089e−004

Tenth surface

K = −4.39310e+000  A4 = 2.05043e−003  A6 = −1.72957e−005

Eleventh surface

K = 3.04604e+001  A4 = 9.28199e−004  A6 = −1.81115e−004

Twelfth surface

K = 5.49088e+000  A4 = −1.18023e−003  A6 = 3.43330e−005

Thirteenth surface

K = 2.34608e+000  A4 = −3.33103e−003  A6 = 1.61864e−004

Various data

| Focal length | 10.50 |
| Fno | 2.88 |
| Angle of view | 20.26 |
| Image height | 3.88 |
| Lens overall length | 17.91 |

-continued

| BF | 3.06 |
| Entrance pupil position | 4.64 |
| Exit pupil position | −5.12 |
| Front principal point position | 1.66 |
| Rear principal points position | −7.44 |

Single lens data

| Lens | starting surface | Focal length |
|---|---|---|
| 1 | 1 | −19.66 |
| 2 | 3 | 5.67 |
| 3 | 5 | −21.09 |
| 4 | 8 | −15.62 |
| 5 | 10 | 13.67 |
| 6 | 12 | −18.35 |

Telephoto ommatidium
Unit mm surface data

| surface no | r | d | nd | vd | effective diameter |
|---|---|---|---|---|---|
| 1* | 36.807 | 1.30 | 1.62041 | 60.3 | 7.62 |
| 2* | −41.677 | 2.67 | | | 7.15 |
| 3* | 8.270 | 1.40 | 1.59240 | 68.3 | 5.38 |
| 4* | −7.910 | 0.50 | | | 4.98 |
| 5* | −9.885 | 0.80 | 1.80518 | 25.4 | 4.08 |
| 6* | −54.358 | 0.10 | | | 3.71 |
| 7(diaphragm) | ∞ | 0.10 | | | 3.66 |
| 8* | 5.124 | 1.20 | 1.64000 | 60.1 | 3.45 |
| 9* | 2.412 | 3.48 | | | 3.17 |
| 10* | 10.272 | 1.80 | 1.59240 | 68.3 | 6.40 |
| 11* | 16.743 | 0.50 | | | 6.42 |
| 12* | 9.281 | 1.00 | 1.84666 | 23.8 | 6.58 |
| 13* | 10.176 | | | | 6.54 |
| Image plane | ∞ | | | | |

Aspheric data

First surface

K = −9.00000e+001  A4 = 3.25623e−005  A6 = 1.37046e−005

Second surface

K = 6.54916e+001  A4 = 9.61894e−004  A6 = 1.97095e−005

Third surface

K = −5.20341e−001  A4 = 2.82359e−003  A6 = 1.62204e−005

Fourth surface

K = −1.07451e+001  A4 = 1.35610e−003  A6 = −1.75272e−005

Fifth surface

K = 9.36306e+000  A4 = 3.65867e−003  A6 = 3.57432e−004

Sixth surface

K = −1.69149e+001  A4 = 1.12483e−003  A6 = 6.25155e−004

Eighth surface

K = −6.38373e−001  A4 = −3.54965e−003  A6 = 1.25622e−006

Ninth surface

K = −9.28207e−001  A4 = −1.83232e−003  A6 = −1.58220e−004

Tenth surface

K = 6.03894e−001  A4 = 1.13103e−003  A6 = 4.35985e−005

Eleventh surface

K = −8.36796e+000  A4 = 9.48431e−004  A6 = −5.05453e−005

Twelfth surface

K = −2.24043e+000  A4 = −9.07528e−004  A6 = 9.61281e−007

Thirteenth surface

K = 6.10242e+000  A4 = −2.60010e−003  A6 = 1.92825e−005

-continued

| Various data | |
|---|---|
| Focal length | 15.00 |
| Fno | 2.88 |
| Angle of view | 14.48 |
| Image height | 3.88 |
| Lens overall length | 17.91 |
| BF | 3.06 |
| Entrance pupil position | 6.90 |
| Exit pupil position | −6.27 |
| Front principal point position | −2.20 |
| Rear principal points position | −11.94 |

| Single lens data | | |
|---|---|---|
| Lens | starting surface | Focal length |
| 1 | 1 | 31.71 |
| 2 | 3 | 7.05 |
| 3 | 5 | −15.13 |
| 4 | 8 | −8.61 |
| 5 | 10 | 40.66 |
| 6 | 12 | 82.43 |

NUMERICAL EXAMPLE 2

Wide-angle ommatidium
Unit mm

| surface no | r | d | nd | vd | effective diameter |
|---|---|---|---|---|---|
| 1* | −42.834 | 1.30 | 1.72916 | 54.7 | 5.77 |
| 2* | 3.863 | 1.95 | | | 4.01 |
| 3* | 10.061 | 1.40 | 1.59240 | 68.3 | 3.55 |
| 4* | −254.805 | 0.97 | | | 3.15 |
| 5(diaphragm) | ∞ | 0.20 | | | 3.07 |
| 6* | 60.619 | 0.80 | 1.80518 | 25.4 | 3.13 |
| 7* | 15.022 | 0.20 | | | 3.34 |
| 8* | 12.585 | 1.20 | 1.64000 | 60.1 | 3.68 |
| 9* | −6.869 | 1.35 | | | 4.07 |
| 10* | 6.405 | 1.80 | 1.59240 | 68.3 | 5.04 |
| 11* | −9.227 | 1.28 | | | 5.17 |
| 12* | 42.308 | 1.00 | 1.84666 | 23.8 | 4.47 |
| 13* | 4.861 | | | | 4.27 |
| Image plane | ∞ | | | | |

Aspheric data

First surface $K = -9.00000e+001$  $A4 = 1.68209e-003$  $A6 = 2.18378e-005$

Second surface $K = 1.56201e+000$  $A4 = 2.31919e-004$  $A6 = 2.49857e-005$

Third surface $K = 1.56344e+001$  $A4 = -2.30989e-003$  $A6 = -3.90307e-004$

Fourth surface $K = -9.00000e+001$  $A4 = 8.76797e-004$  $A6 = -3.09096e-004$

Sixth surface $K = -9.00000e+001$  $A4 = 7.22417e-004$  $A6 = 1.69814e-004$

Seventh surface $K = -5.28938e+001$  $A4 = 3.20245e-003$  $A6 = 2.63310e-004$

Eighth surface $K = -3.31531e+001$  $A4 = 3.32480e-003$  $A6 = -1.76152e-005$

Ninth surface $K = -1.14135e+000$  $A4 = -8.15775e-004$  $A6 = 3.19305e-006$

Tenth surface $K = -8.67401e+000$  $A4 = 2.26418e-003$  $A6 = -3.63267e-004$

Eleventh surface $K = 2.68548e+000$  $A4 = -2.16758e-003$  $A6 = -4.66522e-005$

Twelfth surface $K = 9.00000e+001$  $A4 = -8.67976e-003$  $A6 = 6.91067e-004$

Thirteenth surface $K = -5.35623e+000$  $A4 = 9.73749e-004$  $A6 = 7.24657e-004$

| Various data | |
|---|---|
| Focal length | 5.20 |
| Fno | 2.88 |
| Angle of view | 36.69 |
| Image height | 3.88 |
| Lens overall length | 18.00 |
| BF | 4.55 |
| Entrance pupil position | 2.89 |
| Exit pupil position | −4.03 |
| Front principal point position | 4.94 |
| Rear principal points position | −0.65 |

| Single lens data | | |
|---|---|---|
| Lens | starting surface | Focal length |
| 1 | 1 | −4.80 |
| 2 | 3 | 16.37 |
| 3 | 6 | −25.00 |
| 4 | 8 | 7.11 |
| 5 | 10 | 6.67 |
| 6 | 12 | −6.57 |

Wide-angle-middle ommatidium
Unit mm

| surface no | r | d | nd | vd | effective diameter |
|---|---|---|---|---|---|
| 1* | 7.207 | 1.30 | 1.72916 | 54.7 | 5.93 |
| 2* | 4.000 | 1.95 | | | 4.48 |
| 3* | 7.876 | 1.40 | 1.59240 | 68.3 | 3.66 |
| 4* | 4.755 | 0.97 | | | 3.02 |
| 5(diaphragm) | ∞ | 0.20 | | | 3.10 |
| 6* | 11.962 | 0.80 | 1.80518 | 25.4 | 3.19 |
| 7* | 5.782 | 0.20 | | | 3.60 |
| 8* | 7.462 | 1.20 | 1.64000 | 60.1 | 4.06 |
| 9* | −5.083 | 1.35 | | | 4.34 |
| 10* | 4.011 | 1.80 | 1.59240 | 68.3 | 5.60 |
| 11* | 7.357 | 1.28 | | | 5.12 |
| 12* | 12.505 | 1.00 | 1.84666 | 23.8 | 5.07 |
| 13* | 5.927 | | | | 4.87 |
| Image plane | ∞ | | | | |

Aspheric data

First surface $K = -4.55173e+000$  $A4 = 1.04524e-003$  $A6 = 5.22673e-005$

Second surface $K = 1.07655e+000$  $A4 = -2.68944e-003$  $A6 = 1.76360e-004$

Third surface $K = -5.98889e+000$  $A4 = -7.72514e-003$  $A6 = 4.93606e-004$

Fourth surface $K = -6.75596e+000$  $A4 = -4.98007e-003$  $A6 = 5.07961e-004$

Sixth surface $K = -7.89069e+001$  $A4 = -2.69850e-003$  $A6 = 3.52609e-004$

-continued

Seventh surface

| K = −2.27576e+001 | A4 = 1.42455e−003 | A6 = −1.01831e−005 |

Eighth surface

| K = −3.33768e+001 | A4 = 4.50455e−003 | A6 = −2.18686e−004 |

Ninth surface

| K = −2.68795e−002 | A4 = −2.95824e−004 | A6 = 1.05748e−004 |

Tenth surface

| K = −2.20833e+000 | A4 = 3.37019e−003 | A6 = 3.11853e−005 |

Eleventh surface

| K = 1.71227e+000 | A4 = −4.49146e−005 | A6 = 1.17908e−004 |

Twelfth surface

| K = 5.70869e−001 | A4 = −3.54385e−003 | A6 = 2.46582e−004 |

Thirteenth surface

| K = −1.78719e+000 | A4 = −7.83362e−004 | A6 = 3.59345e−004 |

Various data

| | |
|---|---|
| Focal length | 7.50 |
| Fno | 2.88 |
| Angle of view | 27.32 |
| Image height | 3.88 |
| Lens overall length | 18.00 |
| BF | 4.55 |
| Entrance pupil position | 4.41 |
| Exit pupil position | −4.23 |
| Front principal point position | 5.51 |
| Rear principal points position | −2.95 |

Single lens data

| Lens | starting surface | Focal length |
|---|---|---|
| 1 | 1 | −14.87 |
| 2 | 3 | −24.32 |
| 3 | 6 | −14.75 |
| 4 | 8 | 4.91 |
| 5 | 10 | 12.41 |
| 6 | 12 | −14.31 |

Telephoto-middle ommatidium
Unit mm surface data

| surface no | r | d | nd | vd | effective diameter |
|---|---|---|---|---|---|
| 1* | −15.000 | 1.30 | 1.72916 | 54.7 | 5.68 |
| 2* | 17.960 | 1.95 | | | 5.41 |
| 3* | 6.796 | 1.40 | 1.59240 | 68.3 | 5.21 |
| 4* | −7.146 | 0.97 | | | 5.03 |
| 5(diaphragm) | ∞ | 0.20 | | | 4.07 |
| 6* | −14.236 | 0.80 | 1.80518 | 25.4 | 4.05 |
| 7* | −98.169 | 0.20 | | | 4.23 |
| 8* | 5.334 | 1.20 | 1.64000 | 60.1 | 4.68 |
| 9* | 4.199 | 1.35 | | | 4.28 |
| 10* | 5.372 | 1.80 | 1.59240 | 68.3 | 5.33 |
| 11* | 9.899 | 1.28 | | | 5.01 |
| 12* | 5.128 | 1.00 | 1.84666 | 23.8 | 5.36 |
| 13* | 3.875 | | | | 5.42 |
| Image plane | ∞ | | | | |

Aspheric data

First surface

| K = 8.00699e+000 | A4 = −1.47327e−003 | A6 = 7.30169e−005 |

Second surface

| K = −3.65224e+001 | A4 = −5.44314e−004 | A6 = 5.29084e−005 |

Third surface

| K = −3.27830e+000 | A4 = 9.82143e−004 | A6 = 1.93818e−005 |

Fourth surface

| K = −1.26439e+000 | A4 = 1.25692e−003 | A6 = −7.42342e−006 |

Sixth surface

| K = −5.37243e+000 | A4 = 1.00930e−003 | A6 = 8.59265e−005 |

Seventh surface

| K = −9.00000e+001 | A4 = 2.44487e−003 | A6 = 1.02366e−004 |

Eighth surface

| K = −5.01056e+000 | A4 = 8.62296e−003 | A6 = 6.49491e−005 |

Ninth surface

| K = 6.14970e−001 | A4 = 2.64291e−003 | A6 = 4.35217e−004 |

Tenth surface

| K = 7.18277e−001 | A4 = 3.35315e−003 | A6 = −1.54486e−004 |

Eleventh surface

| K = 1.51189e+000 | A4 = 5.61145e−003 | A6 = −1.70734e−004 |

Twelfth surface

| K = 9.04194e−001 | A4 = −6.62979e−003 | A6 = −1.55750e−004 |

Thirteenth surface

| K = −6.57254e−003 | A4 = −9.21593e−003 | A6 = 2.82444e−005 |

Various data

| | |
|---|---|
| Focal length | 10.50 |
| Fno | 2.88 |
| Angle of view | 20.26 |
| Image height | 3.88 |
| Lens overall length | 18.00 |
| BF | 4.55 |
| Entrance pupil position | 3.62 |
| Exit pupil position | −4.01 |
| Front principal point position | 1.25 |
| Rear principal points position | −5.95 |

Single lens data

| Lens | starting surface | Focal length |
|---|---|---|
| 1 | 1 | −11.03 |
| 2 | 3 | 6.11 |
| 3 | 6 | −20.77 |
| 4 | 8 | −52.55 |
| 5 | 10 | 17.27 |
| 6 | 12 | −29.54 |

Telephoto ommatidium
Unit mm surface data

| surface no | r | d | nd | vd | effective diameter |
|---|---|---|---|---|---|
| 1* | 33.245 | 1.30 | 1.72916 | 54.7 | 6.83 |
| 2* | 144.445 | 1.95 | | | 6.48 |
| 3* | 12.849 | 1.40 | 1.59240 | 68.3 | 5.67 |
| 4* | −9.797 | 0.97 | | | 5.38 |
| 5(diaphragm) | ∞ | 0.20 | | | 4.27 |
| 6* | −13.239 | 0.80 | 1.80518 | 25.4 | 4.27 |
| 7* | 60.932 | 0.20 | | | 4.27 |
| 8* | 5.788 | 1.20 | 1.64000 | 60.1 | 4.52 |
| 9* | 4.534 | 1.35 | | | 4.21 |
| 10* | 5.805 | 1.80 | 1.59240 | 68.3 | 5.00 |
| 11* | 4.659 | 1.28 | | | 5.17 |

-continued

| | | | | | |
|---|---|---|---|---|---|
| 12* | 5.752 | 1.00 | 1.84666 | 23.8 | 6.01 |
| 13* | 6.534 | | | | 5.99 |
| Image plane | ∞ | | | | |

Aspheric data

First surface

K = −8.19456e+001   A4 = −5.31853e−004   A6 = −7.42778e−006

Second surface

K = −9.00000e+001   A4 = 9.14133e−005   A6 = 1.43749e−005

Third surface

K = −1.08476e+001   A4 = 1.16459e−003   A6 = −1.83197e−005

Fourth surface

K = 9.72251e−001   A4 = 1.35326e−004   A6 = 7.81170e−006

Sixth surface

K = −6.39115e+001   A4 = 2.15637e−003   A6 = 1.05300e−005

Seventh surface

K = −9.00000e+001   A4 = 4.80467e−003   A6 = 7.24665e−005

Eighth surface

K = −1.02518e+001   A4 = 6.60769e−003   A6 = 1.61089e−004

Ninth surface

K = 1.25753e+000   A4 = −2.95145e−005   A6 = 3.76702e−004

Tenth surface

K = −1.25455e+000   A4 = −1.16553e−003   A6 = 2.81324e−005

Eleventh surface

K = −4.99122e+000   A4 = 1.63656e−003   A6 = −1.60913e−004

Twelfth surface

K = −5.81002e−001   A4 = −3.88415e−003   A6 = 1.65437e−004

Thirteenth surface

K = 1.22656e+000   A4 = −4.86561e−003   A6 = 1.16617e−004

Various data

| | |
|---|---|
| Focal length | 15.00 |
| Fno | 2.88 |
| Angle of view | 14.48 |
| Image height | 3.88 |
| Lens overall length | 18.00 |
| BF | 4.55 |
| Entrance pupil position | 5.25 |
| Exit pupil position | −4.71 |
| Front principal point position | −4.04 |
| Rear principal points position | −10.45 |

Single lens data

| Lens | starting surface | Focal length |
|---|---|---|
| 1 | 1 | 58.93 |
| 2 | 3 | 9.60 |
| 3 | 6 | −13.44 |
| 4 | 8 | −52.19 |
| 5 | 10 | −95.85 |
| 6 | 12 | 35.77 |

NUMERICAL EXAMPLE 3

Wide-angle ommatidium
Unit mm surface data

| surface no | r | d | nd | vd | effective diameter |
|---|---|---|---|---|---|
| 1* | −278.039 | 1.15 | 1.69680 | 55.5 | 7.35 |
| 2* | 6.000 | 2.75 | | | 5.56 |
| 3* | −13.838 | 1.55 | 1.59240 | 68.3 | 4.28 |
| 4* | −4.335 | 0.50 | | | 4.19 |
| 5* | 5.392 | 0.80 | 1.80518 | 25.4 | 2.95 |
| 6* | 3.393 | 0.43 | | | 2.55 |
| 7(diaphragm) | ∞ | 1.56 | | | 2.59 |
| 8* | −20.462 | 1.20 | 1.64000 | 60.1 | 4.26 |
| 9* | −3.385 | 0.59 | | | 4.61 |
| 10* | 11.995 | 1.65 | 1.59240 | 68.3 | 5.01 |
| 11* | −11.271 | 1.37 | | | 5.25 |
| 12* | −9.279 | 1.00 | 1.84666 | 23.8 | 4.65 |
| 13* | 9.946 | | | | 4.76 |
| Image plane | ∞ | | | | |

Aspheric data

First surface

K = −1.51839e+001   A4 = 6.01752e−004   A6 = 2.86999e−005

Second surface

K = 1.96510e+000   A4 = −3.86322e−004   A6 = −1.66133e−005

Third surface

K = 2.27610e+001   A4 = −8.92074e−004   A6 = −6.83728e−004

Fourth surface

K = −7.29708e+000   A4 = −6.23057e−003   A6 = −1.69117e−004

Fifth surface

K = −9.67598e−001   A4 = −7.68250e−003   A6 = −2.57460e−004

Sixth surface

K = −4.96656e+000   A4 = 7.15623e−004   A6 = 8.72707e−006

Eighth surface

K = −6.04476e−001   A4 = −1.54465e−003   A6 = 2.57992e−004

Ninth surface

K = −1.00603e+000   A4 = −2.23851e−003   A6 = −9.07492e−005

Tenth surface

K = −3.55816e+001   A4 = 7.39878e−005   A6 = −4.05799e−004

Eleventh surface

K = 3.15494e+000   A4 = −5.45664e−003   A6 = 4.27810e−005

Twelfth surface

K = −1.09737e+001   A4 = −4.17651e−003   A6 = 3.03530e−004

Thirteenth surface

K = −1.89271e+001   A4 = 3.28962e−003   A6 = 1.01426e−004

Various data

| | |
|---|---|
| Focal length | 5.20 |
| Fno | 2.88 |
| Angle of view | 36.69 |
| Image height | 3.88 |
| Lens overall length | 18.00 |
| BF | 3.45 |
| Entrance pupil position | 3.90 |
| Exit pupil position | −4.05 |
| Front principal point position | 5.49 |
| Rear principal points position | −1.75 |

Single lens data

| Lens | starting surface | Focal length |
|---|---|---|
| 1 | 1 | −8.41 |
| 2 | 3 | 10.05 |
| 3 | 5 | −13.83 |
| 4 | 8 | 6.17 |

-continued

| | | |
|---|---|---|
| 5 | 10 | 10.07 |
| 6 | 12 | −5.54 |

Wide-angle-middle ommatidium
Unit mm surface data

| surface no | r | d | nd | vd | effective diameter |
|---|---|---|---|---|---|
| 1 | 246.153 | 1.15 | 1.69680 | 55.5 | 5.74 |
| 2* | 6.000 | 2.75 | | | 4.83 |
| 3* | 27.183 | 1.55 | 1.59240 | 68.3 | 4.40 |
| 4* | −4.038 | 0.50 | | | 4.17 |
| 5* | 5.849 | 0.80 | 1.80518 | 25.4 | 3.40 |
| 6* | 3.626 | 0.43 | | | 3.20 |
| 7(diaphragm) | ∞ | 1.56 | | | 3.18 |
| 8* | −30.741 | 1.20 | 1.64000 | 60.1 | 3.90 |
| 9* | −6.722 | 0.59 | | | 4.13 |
| 10* | 5.066 | 1.65 | 1.59240 | 68.3 | 4.77 |
| 11* | 6.280 | 1.37 | | | 4.45 |
| 12* | 18.583 | 1.00 | 1.84666 | 23.8 | 4.57 |
| 13* | 6.571 | (variable) | | | 4.88 |
| Image plane | ∞ | | | | |

Aspheric data

First surface

K = 9.00000e+001   A4 = −8.39451e−004   A6 = 2.35285e−005

Second surface

K = −5.34082e+000   A4 = 4.03329e−003   A6 = −1.66191e−005

Third surface

K = 6.33715e+001   A4 = 2.67153e−003   A6 = −1.61664e−004

Fourth surface

K = −5.22262e+000   A4 = −1.37728e−003   A6 = 2.77794e−005

Fifth surface

K = −2.62749e+000   A4 = −9.55365e−003   A6 = 2.40785e−004

Sixth surface

K = −5.84224e+000   A4 = −6.94200e−003   A6 = 1.86444e−004

Eighth surface

K = 9.00000e+001   A4 = 8.35122e−003   A6 = 1.58826e−004

Ninth surface

K = −1.03311e+001   A4 = 3.42515e−003   A6 = 6.46597e−004

Tenth surface

K = −3.10477e+000   A4 = 3.57728e−003   A6 = 1.57487e−004

Eleventh surface

K = −3.74031e+000   A4 = −8.18470e−004   A6 = 4.37137e−004

Twelfth surface

K = −9.00000e+001   A4 = −7.97372e−003   A6 = 3.60044e−004

Thirteenth surface

K = −1.19739e+001   A4 = −3.83591e−003   A6 = 4.12780e−004

Various data

| | |
|---|---|
| Focal length | 7.50 |
| Fno | 2.88 |
| Angle of view | 27.32 |
| Image height | 3.88 |
| Lens overall length | 18.00 |
| BF | 3.45 |
| Entrance pupil position | 4.17 |
| Exit pupil position | −3.91 |

-continued

| | |
|---|---|
| Front principal point position | 4.03 |
| Rear principal points position | −4.05 |

Single lens data

| Lens | starting surface | Focal length |
|---|---|---|
| 1 | 1 | −8.84 |
| 2 | 3 | 6.05 |
| 3 | 5 | −14.11 |
| 4 | 8 | 13.19 |
| 5 | 10 | 29.38 |
| 6 | 12 | −12.48 |

Telephoto-middle ommatidium
Unit mm surface data

| surface no | r | d | nd | vd | effective diameter |
|---|---|---|---|---|---|
| 1* | 42.658 | 1.15 | 1.69680 | 55.5 | 6.75 |
| 2* | 8.092 | 2.75 | | | 6.22 |
| 3* | 3.713 | 1.55 | 1.59240 | 68.3 | 5.17 |
| 4* | −32.881 | 0.50 | | | 4.75 |
| 5* | 5.257 | 0.80 | 1.80518 | 25.4 | 3.65 |
| 6* | 3.116 | 0.43 | | | 3.12 |
| 7(diaphragm) | ∞ | 1.56 | | | 3.11 |
| 8* | −5.288 | 1.20 | 1.64000 | 60.1 | 3.84 |
| 9* | −4.931 | 0.59 | | | 4.56 |
| 10* | 5.092 | 1.65 | 1.59240 | 68.3 | 5.88 |
| 11* | 5.827 | 1.37 | | | 5.27 |
| 12* | 11.995 | 1.00 | 1.84666 | 23.8 | 5.52 |
| 13* | 7.874 | | | | 5.71 |
| Image plane | ∞ | | | | |

Aspheric data

First surface

K = −2.66383e+001   A4 = −2.18872e−003   A6 = 6.31429e−005

Second surface

K = 2.08397e+000   A4 = −3.26063e−003   A6 = 2.84905e−005

Third surface

K = 1.10583e−001   A4 = 2.75665e−004   A6 = −1.47214e−005

Fourth surface

K = −6.74747e+001   A4 = 3.16266e−003   A6 = −8.64586e−005

Fifth surface

K = −1.66566e+000   A4 = −3.71526e−003   A6 = 1.34066e−004

Sixth surface

K = 5.41702e−001   A4 = −9.62595e−003   A6 = 1.70734e−004

Eighth surface

K = 3.16668e+000   A4 = 4.62242e−003   A6 = 1.81580e−004

Ninth surface

K = 1.69035e+000   A4 = 5.27071e−003   A6 = 1.69765e−004

Tenth surface

K = 1.13673e+000   A4 = 3.22950e−006   A6 = 2.93792e−005

Eleventh surface

K = 2.99335e+000   A4 = −2.40678e−003   A6 = 7.59485e−005

Twelfth surface

K = −9.39873e+000   A4 = −2.70967e−003   A6 = 5.48169e−005

-continued

Thirteenth surface

| K = −8.61644e+000 | A4 = −1.90799e−003 | A6 = 9.68595e−005 |

Various data

| Focal length | 10.50 |
| Fno | 2.88 |
| Angle of view | 20.26 |
| Image height | 3.88 |
| Lens overall length | 18.00 |
| BF | 3.45 |
| Entrance pupil position | 5.41 |
| Exit pupil position | −4.58 |
| Front principal point position | 2.18 |
| Rear principal points position | −7.05 |

Single lens data

| Lens | starting surface | Focal length |
|---|---|---|
| 1 | 1 | −14.53 |
| 2 | 3 | 5.72 |
| 3 | 5 | −11.40 |
| 4 | 8 | 49.39 |
| 5 | 10 | 37.12 |
| 6 | 12 | −30.46 |

Telephoto ommatidium
Unit mm surface data

| surface no | r | d | nd | vd | effective diameter |
|---|---|---|---|---|---|
| 1* | 8.009 | 1.15 | 1.69680 | 55.5 | 7.69 |
| 2* | 7.508 | 2.75 | | | 7.04 |
| 3* | 3.702 | 1.55 | 1.59240 | 68.3 | 5.20 |
| 4* | 88.710 | 0.50 | | | 4.61 |
| 5* | 7.031 | 0.80 | 1.80518 | 25.4 | 3.83 |
| 6* | 3.311 | 0.43 | | | 3.16 |
| 7(diaphragm) | ∞ | 1.56 | | | 3.15 |
| 8* | −9.083 | 1.20 | 1.64000 | 60.1 | 3.62 |
| 9* | 25.053 | 0.59 | | | 4.35 |
| 10* | 7.503 | 1.65 | 1.59240 | 68.3 | 5.50 |
| 11* | 15.709 | 1.37 | | | 5.83 |
| 12* | 5.989 | 1.00 | 1.84666 | 23.8 | 6.90 |
| 13* | 7.775 | | | | 6.75 |
| Image plane | ∞ | | | | |

Aspheric data

First surface

| K = 5.90804e−001 | A4 = −3.95356e−004 | A6 = −1.87359e−005 |

Second surface

| K = 9.02179e−001 | A4 = −6.68247e−004 | A6 = −4.35238e−005 |

Third surface

| K = 7.86019e−002 | A4 = 1.00348e−004 | A6 = 5.36889e−006 |

Fourth surface

| K = 9.00000e+001 | A4 = 2.36995e−003 | A6 = −5.00552e−005 |

Fifth surface

| K = −5.90637e+000 | A4 = −5.74098e−004 | A6 = 1.24577e−004 |

Sixth surface

| K = 7.11639e−001 | A4 = −6.13172e−003 | A6 = 2.01076e−004 |

Eighth surface

| K = 9.12926e+000 | A4 = 5.29083e−003 | A6 = −8.33091e−004 |

Ninth surface

| K = 9.00002e+001 | A4 = 6.28003e−003 | A6 = −7.33225e−004 |

-continued

Tenth surface

| K = 1.72371e+000 | A4 = −2.97948e−004 | A6 = −2.54947e−006 |

Eleventh surface

| K = −6.66245e+001 | A4 = −1.60347e−003 | A6 = 1.06542e−004 |

Twelfth surface

| K = −3.71090e+000 | A4 = −1.38172e−003 | A6 = 1.02692e−004 |

Thirteenth surface

| K = 1.93714e+000 | A4 = −3.41454e−003 | A6 = 1.05240e−004 |

Various data

| Focal length | 15.00 |
| Fno | 2.88 |
| Angle of view | 14.48 |
| Image height | 3.88 |
| Lens overall length | 18.00 |
| BF | 3.45 |
| Entrance pupil position | 8.15 |
| Exit pupil position | −6.16 |
| Front principal point position | −0.26 |
| Rear principal points position | −11.55 |

Single lens data

| Lens | starting surface | Focal length |
|---|---|---|
| 1 | 1 | −2975.24 |
| 2 | 3 | 6.48 |
| 3 | 5 | −8.60 |
| 4 | 8 | −10.28 |
| 5 | 10 | 22.56 |
| 6 | 12 | 24.50 |

NUMERICAL EXAMPLE 4

Wide-angle ommatidium
Unit mm surface data

| surface no | r | d | nd | vd | effective diameter |
|---|---|---|---|---|---|
| 1* | 9.963 | 1.30 | 1.62041 | 60.3 | 6.14 |
| 2* | 2.063 | 3.16 | | | 4.23 |
| 3* | 5.403 | 1.40 | 1.59240 | 68.3 | 4.07 |
| 4* | −11.150 | 0.60 | | | 3.69 |
| 5* | −43.751 | 0.80 | 1.80518 | 25.4 | 3.07 |
| 6* | 15.608 | 0.10 | | | 3.02 |
| 7 (diaphragm) | ∞ | 0.10 | | | 3.03 |
| 8* | 4.764 | 1.20 | 1.64000 | 60.1 | 3.07 |
| 9* | −66.999 | 2.94 | | | 3.02 |
| 10* | 14.404 | 1.80 | 1.59240 | 68.3 | 4.48 |
| 11* | −9.500 | 0.50 | | | 4.37 |
| 12* | −17.138 | 1.00 | 1.84666 | 23.8 | 4.29 |
| 13* | 11.853 | | | | 5.09 |
| Image plane | ∞ | | | | |

Aspheric data

First surface

| K = −2.47869e+001 | A4 = −2.02166e−003 | A6 = 5.43003e−005 |

Second surface

| K = −1.79551e+000 | A4 = 1.25374e−002 | A6 = −4.89811e−005 |

Third surface

| K = 2.24981e+000 | A4 = 2.67772e−003 | A6 = 1.71832e−004 |

-continued

Fourth surface

K = −2.15785e+001  A4 = 1.38585e−003  A6 = −4.29296e−005

Fifth surface

K = −7.77189e+000  A4 = 2.90232e−003  A6 = −1.23226e−003

Sixth surface

K = 5.52064e+001  A4 = 2.30902e−003  A6 = −9.38603e−004

Eighth surface

K = 6.43691e−001  A4 = 1.22013e−003  A6 = 3.62473e−004

Ninth surface

K = −6.95418e+001  A4 = 3.79577e−003  A6 = 8.00925e−004

Tenth surface

K = −9.00000e+001  A4 = 5.32715e−003  A6 = 4.14940e−004

Eleventh surface

K = 1.36769e+001  A4 = −2.97992e−003  A6 = 1.43850e−003

Twelfth surface

K = −9.00000e+001  A4 = −2.16468e−002  A6 = 4.36176e−004

Thirteenth surface

K = 1.40560e+001  A4 = −1.25552e−002  A6 = 5.78256e−004

Various data

| | |
|---|---|
| Focal length | 5.20 |
| Fno | 2.88 |
| Angle of view | 36.69 |
| Image height | 3.88 |
| Lens overall length | 17.77 |
| BF | 2.87 |
| Entrance pupil position | 3.58 |
| Exit pupil position | −4.59 |
| Front principal point position | 5.15 |
| Rear principal points position | −2.33 |

Single lens data

| Lens | starting surface | Focal length |
|---|---|---|
| 1 | 1 | −4.47 |
| 2 | 3 | 6.34 |
| 3 | 5 | −14.20 |
| 4 | 8 | 6.99 |
| 5 | 10 | 9.94 |
| 6 | 12 | −8.15 |

Telephoto ommatidium
Unit mm surface data

| surface no | r | d | nd | vd | effective diameter |
|---|---|---|---|---|---|
| 1* | 32.268 | 1.30 | 1.62041 | 60.3 | 8.47 |
| 2* | −51.647 | 3.16 | | | 8.11 |
| 3* | 5.700 | 1.40 | 1.59240 | 68.3 | 5.55 |
| 4* | −12.800 | 0.60 | | | 5.22 |
| 5* | −9.999 | 0.80 | 1.80518 | 25.4 | 3.82 |
| 6* | 191.283 | 0.10 | | | 3.38 |
| 7 (diaphragm) | ∞ | 0.10 | | | 3.35 |
| 8* | 5.214 | 1.20 | 1.64000 | 60.1 | 3.27 |
| 9* | 2.487 | 2.94 | | | 3.24 |
| 10* | 18.649 | 1.80 | 1.59240 | 68.3 | 6.46 |
| 11* | 26.555 | 0.50 | | | 6.50 |
| 12* | 8.399 | 1.00 | 1.84666 | 23.8 | 6.65 |
| 13* | 11.838 | | | | 6.78 |
| Image plane | ∞ | | | | |

Aspheric data

First surface

K = −1.92634e+001  A4 = −2.82433e−004  A6 = 3.81416e−006

Second surface

K = 9.00000e+001  A4 = 3.23423e−004  A6 = 2.68125e−006

Third surface

K = −8.60800e−001  A4 = 2.63313e−003  A6 = 4.15438e−005

Fourth surface

K = −2.86471e+001  A4 = 8.10119e−004  A6 = 2.03306e−006

Fifth surface

K = 9.11794e+000  A4 = 5.04006e−003  A6 = 2.54023e−004

Sixth surface

K = 7.38599e+001  A4 = 2.81749e−003  A6 = 5.63571e−004

Eighth surface

K = −8.57667e−001  A4 = −3.65406e−003  A6 = −4.84007e−004

Ninth surface

K = −2.26017e−001  A4 = −3.68837e−003  A6 = −1.37027e−003

Tenth surface

K = 1.65894e+001  A4 = 2.55538e−003  A6 = 1.45887e−005

Eleventh surface

K = 9.21247e+000  A4 = 2.90663e−004  A6 = −7.09973e−006

Twelfth surface

K = −7.20764e+000  A4 = −1.10889e−003  A6 = −5.90829e−005

Thirteenth surface

K = 8.94495e+000  A4 = −3.28402e−003  A6 = −4.17715e−005

| | |
|---|---|
| Focal length | 15.00 |
| Fno | 2.88 |
| Angle of view | 14.48 |
| Image height | 3.88 |
| Lens overall length | 17.77 |
| BF | 2.87 |
| Entrance pupil position | 8.12 |
| Exit pupil position | −6.28 |
| Front principal point position | −1.49 |
| Rear principal points position | −12.13 |

Single lens data

| Lens | starting surface | Focal length |
|---|---|---|
| 1 | 1 | 32.20 |
| 2 | 3 | 6.85 |
| 3 | 5 | −11.78 |
| 4 | 8 | −8.97 |
| 5 | 10 | 97.49 |
| 6 | 12 | 30.14 |

NUMERICAL EXAMPLE 5

Wide-angle ommatidium
Unit mm surface data

| surface no | r | d | nd | vd | effective diameter |
|---|---|---|---|---|---|
| 1* | −15.549 | 1.70 | 1.62041 | 60.3 | 9.32 |
| 2* | 5.297 | 6.00 | | | 5.94 |
| 3* | −21.574 | 1.80 | 1.49700 | 81.5 | 4.31 |

-continued

| | | | | | |
|---|---|---|---|---|---|
| 4* | −6.160 | 0.50 | | | 4.30 |
| 5* | −60.682 | 0.80 | 1.84666 | 23.8 | 3.65 |
| 6* | −247.402 | 1.26 | | | 3.51 |
| 7 (diaphragm) | ∞ | 2.16 | | | 3.60 |
| 8* | 7.864 | 1.20 | 1.59240 | 68.3 | 5.23 |
| 9* | −65.198 | 3.81 | | | 5.42 |
| 10* | 7.418 | 2.20 | 1.49700 | 81.5 | 6.38 |
| 11* | −4.540 | 0.50 | | | 6.37 |
| 12* | −2.561 | 1.00 | 1.84666 | 23.8 | 5.89 |
| 13* | −5.241 | | | | 5.68 |
| Image plane | ∞ | | | | |

Aspheric data

First surface

K = −9.00000e+001    A4 = 2.40773e−003    A6 = −1.00607e−004
A8 = 2.29263e−006    A10 = −2.45268e−008

Second surface

K = −2.33052e+000    A4 = 8.76770e−003    A6 = −1.12324e−004
A8 = 1.59787e−005    A10 = −3.95043e−007

Third surface

K = −7.34310e+001    A4 = −4.21675e−003    A6 = −5.01453e−005
A8 = 2.53959e−005    A10 = −1.23794e−005

Fourth surface

K = −3.31004e−001    A4 = −4.70929e−003    A6 = 9.40943e−004
A8 = −2.39785e−004    A10 = 1.39342e−005

Fifth surface

K = −9.00000e+001    A4 = 1.91427e−003    A6 = 9.94935e−004
A8 = −2.72938e−004    A10 = 1.79532e−005

Sixth surface

K = −9.00000e+001    A4 = 3.13282e−003    A6 = 4.08003e−004
A8 = −1.04956e−004    A10 = 3.69894e−006

Eighth surface

K = −3.92356e+000    A4 = 6.68721e−005    A6 = −1.81875e−004
A8 = 1.27528e−005    A10 = −7.29409e−007

Ninth surface

K = −1.52035e+001    A4 = −8.29437e−004    A6 = −1.82468e−004
A8 = 1.31931e−005    A10 = −5.81891e−007

Tenth surface

K = 4.69580e−001    A4 = 8.49677e−005    A6 = −1.91505e−004
A8 = −1.85306e−007    A10 = 3.24269e−007

Eleventh surface

K = −1.29407e+001    A4 = −2.00018e−003    A6 = −1.00026e−004
A8 = 4.40120e−006    A10 = 8.21368e−008

Twelfth surface

K = −5.27817e+000    A4 = 6.66070e−003    A6 = −4.16248e−004
A8 = −4.05938e−006    A10 = 7.85917e−007

Thirteenth surface

K = −1.56342e+001    A4 = 9.46117e−003    A6 = 1.14746e−004
A8 = −5.53169e−005    A10 = 2.24424e−006

| | |
|---|---|
| Focal length | 4.40 |
| Fno | 2.88 |
| Angle of view | 41.37 |
| Image height | 3.88 |
| Lens overall length | 27.87 |
| BF | 4.93 |
| Entrance pupil position | 4.54 |
| Exit pupil position | −11.77 |

-continued

| | |
|---|---|
| Front principal point position | 7.78 |
| Rear principal points position | 0.53 |

Single lens data

| Lens | starting surface | Focal length |
|---|---|---|
| 1 | 1 | −6.18 |
| 2 | 3 | 16.70 |
| 3 | 5 | −95.15 |
| 4 | 8 | 11.92 |
| 5 | 10 | 6.04 |
| 6 | 12 | −7.13 |

Wide-angle-middle ommatidium
Unit mm surface data

| surface no | r | d | nd | vd | effective diameter |
|---|---|---|---|---|---|
| 1* | −6.311 | 1.70 | 1.62041 | 60.3 | 8.53 |
| 2* | −15.124 | 6.00 | | | 6.79 |
| 3* | −16.852 | 1.80 | 1.49700 | 81.5 | 4.62 |
| 4* | −8.778 | 0.50 | | | 4.41 |
| 5* | −23.424 | 0.80 | 1.84666 | 23.8 | 4.40 |
| 6* | −85.378 | 1.26 | | | 4.43 |
| 7 (diaphragm) | ∞ | 2.16 | | | 4.61 |
| 8* | 5.516 | 1.20 | 1.59240 | 68.3 | 5.22 |
| 9* | −26.626 | 3.81 | | | 5.23 |
| 10* | −24.787 | 2.20 | 1.49700 | 81.5 | 4.87 |
| 11* | −4.618 | 0.50 | | | 4.96 |
| 12* | −2.450 | 1.00 | 1.84666 | 23.8 | 4.85 |
| 13* | −4.979 | | | | 5.39 |
| Image plane | ∞ | | | | |

Aspheric data

First surface

K = −6.14800e+000    A4 = 3.70943e−003    A6 = −1.19809e−004
A8 = 2.73722e−006    A10 = −2.86757e−008

Second surface

K = −4.61616e+001    A4 = 4.57808e−003    A6 = 4.81717e−005
A8 = −4.17683e−006    A10 = 2.31980e−007

Third surface

K = −6.71054e+001    A4 = −1.25502e−003    A6 = 9.36993e−005
A8 = −1.48143e−005    A10 = −5.60547e−007

Fourth surface

K = 4.63442e−001    A4 = −3.77281e−003    A6 = 9.89592e−004
A8 = −1.41886e−004    A10 = 6.01938e−006

Fifth surface

K = 6.34661e+001    A4 = −2.18170e−003    A6 = 1.43846e−003
A8 = −1.94467e−004    A10 = 1.04358e−005

Sixth surface

K = 9.00000e+001    A4 = −5.67998e−004    A6 = 6.86542e−004
A8 = −8.66547e−005    A10 = 4.00686e−006

Eighth surface

K = −1.87501e+000    A4 = 1.01603e−003    A6 = −7.41257e−005
A8 = 1.05915e−005    A10 = −8.59893e−007

Ninth surface

K = −7.57858e+001    A4 = −2.99491e−004    A6 = −4.45123e−005
A8 = 7.88147e−006    A10 = −7.18324e−007

Tenth surface

K = 6.06182e+001    A4 = −5.70802e−004    A6 = 6.31739e−005
A8 = −3.12933e−005    A10 = 3.63305e−006

Eleventh surface

K = −8.53567e−001    A4 = 2.29916e−003    A6 = −4.31596e−005
A8 = −4.69019e−005    A10 = 2.10631e−006

-continued

Twelfth surface

| K = −1.63511e+000 | A4 = 5.28029e−003 | A6 = −2.97920e−004 |
| A8 = 2.96250e−006 | A10 = −2.68364e−006 | |

Thirteenth surface

| K = −3.21078e+000 | A4 = 4.29280e−003 | A6 = −5.56892e−005 |
| A8 = 1.00908e−005 | A10 = −1.04948e−006 | |

| | |
|---|---|
| Focal length | 8.10 |
| Fno | 2.88 |
| Angle of view | 25.57 |
| Image height | 3.88 |
| Lens overall length | 27.87 |
| BF | 4.93 |
| Entrance pupil position | 6.21 |
| Exit pupil position | −7.59 |
| Front principal point position | 9.07 |
| Rear principal points position | −3.17 |

Single lens data

| Lens | starting surface | Focal length |
|---|---|---|
| 1 | 1 | −18.85 |
| 2 | 3 | 34.32 |
| 3 | 5 | −38.35 |
| 4 | 8 | 7.82 |
| 5 | 10 | 11.02 |
| 6 | 12 | −6.96 |

Telephoto-middle ommatidium
Unit mm surface data

| surface no | r | d | nd | vd | effective diameter |
|---|---|---|---|---|---|
| 1* | 4154.388 | 1.70 | 1.62041 | 60.3 | 9.82 |
| 2* | 30.158 | 6.00 | | | 9.27 |
| 3* | 7.145 | 1.80 | 1.49700 | 81.5 | 7.31 |
| 4* | −37.728 | 0.50 | | | 6.89 |
| 5* | −19.914 | 0.80 | 1.84666 | 23.8 | 6.39 |
| 6* | −37.975 | 1.26 | | | 5.88 |
| 7 (diaphragm) | ∞ | 2.16 | | | 4.95 |
| 8* | 4.833 | 1.20 | 1.59240 | 68.3 | 4.25 |
| 9* | 3.773 | 3.81 | | | 4.11 |
| 10* | 7.364 | 2.20 | 1.49700 | 81.5 | 6.12 |
| 11* | 74.404 | 0.50 | | | 5.89 |
| 12* | 4.514 | 1.00 | 1.84666 | 23.8 | 5.98 |
| 13* | 3.251 | | | | 5.89 |
| Image plane | ∞ | | | | |

Aspheric data

First surface

| K = 9.00000e+001 | A4 = −1.24610e−004 | A6 = −4.39173e−006 |
| A8 = 1.38407e−007 | A10 = −1.64963e−010 | |

Second surface

| K = −1.04824e+001 | A4 = −1.76004e−005 | A6 = −8.98575e−006 |
| A8 = 2.94871e−007 | A10 = −1.37615e−009 | |

Third surface

| K = −4.46949e+000 | A4 = 1.98279e−003 | A6 = −5.84120e−005 |
| A8 = 1.69123e−006 | A10 = 3.04561e−009 | |

Fourth surface

| K = 5.46418e+001 | A4 = 1.83346e−003 | A6 = −1.23043e−004 |
| A8 = 4.22163e−006 | A10 = −7.99090e−009 | |

Fifth surface

| K = 6.34841e+000 | A4 = 2.99260e−003 | A6 = −8.63827e−005 |
| A8 = 5.35571e−007 | A10 = 1.25070e−007 | |

Sixth surface

| K = 9.00000e+001 | A4 = 2.60155e−003 | A6 = 6.19116e−006 |
| A8 = −3.70773e−006 | A10 = 3.38238e−007 | |

Eighth surface

| K = 1.72200e−001 | A4 = −1.75958e−003 | A6 = −2.06213e−004 |
| A8 = 2.14482e−006 | A10 = 6.85163e−007 | |

Ninth surface

| K = −3.10596e−001 | A4 = −2.00205e−003 | A6 = −4.63580e−004 |
| A8 = 1.96481e−005 | A10 = 6.90382e−007 | |

Tenth surface

| K = 9.19367e−001 | A4 = 4.32065e−003 | A6 = −3.08400e−004 |
| A8 = 1.26359e−005 | A10 = −5.30893e−007 | |

Eleventh surface

| K = 2.29759e+001 | A4 = 7.50550e−003 | A6 = −2.91010e−004 |
| A8 = −8.96536e−006 | A10 = 3.41671e−007 | |

Twelfth surface

| K = −1.58103e−002 | A4 = −8.58579e−003 | A6 = 1.48904e−004 |
| A8 = −6.94785e−006 | A10 = 5.72281e−007 | |

Thirteenth surface

| K = −2.83628e+000 | A4 = −6.33802e−003 | A6 = 3.87565e−004 |
| A8 = −1.64786e−005 | A10 = 8.57651e−007 | |

| | |
|---|---|
| Focal length | 15.00 |
| Fno | 2.88 |
| Angle of view | 14.48 |
| Image height | 3.88 |
| Lens overall length | 27.87 |
| BF | 4.93 |
| Entrance pupil position | 9.64 |
| Exit pupil position | −6.52 |
| Front principal point position | 5.00 |
| Rear principal points position | −10.07 |

Single lens data

| Lens | starting surface | Focal length |
|---|---|---|
| 1 | 1 | −48.97 |
| 2 | 3 | 12.25 |
| 3 | 5 | −50.48 |
| 4 | 8 | −50.18 |
| 5 | 10 | 16.27 |
| 6 | 12 | −21.56 |

Telephoto ommatidium
Unit mm surface data

| surface no | r | d | nd | vd | effective diameter |
|---|---|---|---|---|---|
| 1* | 16.751 | 1.70 | 1.62041 | 60.3 | 12.59 |
| 2* | 210.161 | 6.00 | | | 12.38 |
| 3* | 8.298 | 1.80 | 1.49700 | 81.5 | 7.39 |
| 4* | −81.483 | 0.50 | | | 6.66 |
| 5* | −16.474 | 0.80 | 1.84666 | 23.8 | 6.35 |
| 6* | 1466.568 | 1.26 | | | 5.76 |
| 7 (diaphragm) | ∞ | 2.16 | | | 5.23 |
| 8* | 6.911 | 1.20 | 1.59240 | 68.3 | 4.20 |
| 9* | 3.263 | 3.81 | | | 4.09 |
| 10* | 12.252 | 2.20 | 1.49700 | 81.5 | 6.72 |
| 11* | 16.214 | 0.50 | | | 6.66 |

-continued

| | | | | | |
|---|---|---|---|---|---|
| 12* | 8.301 | 1.00 | 1.84666 | 23.8 | 6.99 |
| 13* | 12.536 | | | | 6.93 |
| Image plane | ∞ | | | | |

Aspheric data

First surface

K = −1.55876e+000   A4 = 2.92366e−005   A6 = −1.09631e−006
A8 = −2.08632e−008   A10 = −3.05929e−010

Second surface

K = −8.25615e+001   A4 = 8.52712e−005   A6 = −3.92623e−006
A8 = 1.40034e−008   A10 = −2.69295e−010

Third surface

K = −3.67293e+000   A4 = 2.26440e−003   A6 = −4.59917e−005
A8 = 1.04881e−006   A10 = −6.76070e−008

Fourth surface

K = −8.25640e+001   A4 = 2.95461e−003   A6 = −1.69702e−004
A8 = 2.78863e−006   A10 = −9.81982e−009

Fifth surface

K = −8.54818e+000   A4 = 3.23331e−003   A6 = −6.52295e−005
A8 = 2.60563e−007   A10 = 2.06459e−008

Sixth surface

K = 9.00000e+001   A4 = 2.84444e−003   A6 = 5.54409e−005
A8 = −2.01728e−006   A10 = 1.47975e−008

Eighth surface

K = 9.01024e−001   A4 = −3.18032e−003   A6 = 1.87699e−005
A8 = 1.35237e−006   A10 = 4.20761e−007

Ninth surface

K = −5.97311e−001   A4 = −3.35059e−003   A6 = −8.80939e−005
A8 = 3.70614e−005   A10 = −1.59924e−006

Tenth surface

K = 4.33191e+000   A4 = 2.20495e−003   A6 = −1.96480e−004
A8 = 1.40411e−005   A10 = −1.95281e−007

Eleventh surface

K = 1.80446e+001   A4 = 1.78097e−003   A6 = −1.22296e−004
A8 = −3.36184e−006   A10 = 4.67220e−007

Twelfth surface

K = 2.52838e+000   A4 = −2.56453e−003   A6 = 1.27725e−004
A8 = −3.82035e−006   A10 = −8.84563e−008

Thirteenth surface

K = 2.03545e+000   A4 = −2.86765e−003   A6 = 1.81150e−004
A8 = −1.65134e−006   A10 = −1.51589e−007

| | |
|---|---|
| Focal length | 27.80 |
| Fno | 2.88 |
| Angle of view | 7.94 |
| Image height | 3.88 |
| Lens overall length | 27.87 |
| BF | 4.93 |
| Entrance pupil position | 18.15 |
| Exit pupil position | −10.54 |
| Front principal point position | −4.00 |
| Rear principal points position | −22.87 |

Single lens data

| Lens | starting surface | Focal length |
|---|---|---|
| 1 | 1 | 29.24 |
| 2 | 3 | 15.25 |
| 3 | 5 | −19.24 |
| 4 | 8 | −11.89 |
| 5 | 10 | 85.17 |
| 6 | 12 | 26.19 |

NUMERICAL EXAMPLE 6

Wide-angle ommatidium
Unit mm surface data

| surface no | r | d | nd | vd | effective diameter |
|---|---|---|---|---|---|
| 1* | 17.545 | 1.30 | 1.72916 | 54.7 | 6.84 |
| 2* | 4.492 | 1.60 | | | 4.62 |
| 3* | 7.232 | 0.42 | 1.84666 | 23.8 | 3.94 |
| 4* | 5.551 | 1.75 | | | 3.84 |
| 5* | −9.747 | 0.80 | 1.77250 | 49.6 | 3.23 |
| 6* | −6.483 | 0.87 | | | 3.05 |
| 7 (diaphragm) | ∞ | 1.46 | | | 2.95 |
| 8* | 4.952 | 1.20 | 1.59240 | 68.3 | 4.29 |
| 9* | −13.956 | 0.89 | | | 4.52 |
| 10* | 11.888 | 1.80 | 1.72916 | 54.7 | 4.80 |
| 11* | −6.936 | 0.50 | | | 4.68 |
| 12* | −4.690 | 0.60 | 1.84666 | 23.8 | 4.26 |
| 13* | 19.395 | | | | 4.07 |
| Image plane | ∞ | | | | | spheric data

First surface

K = 1.93798e+001   A4 = 3.44220e−003   A6 = −1.43219e−004
A8 = 4.91643e−006

Second surface

K = 1.93564e+000   A4 = 3.78641e−003   A6 = 1.63212e−004
A8 = −2.68609e−005

Third surface

K = −2.58063e+001   A4 = −1.22252e−002   A6 = −5.60380e−004

Fourth surface

K = −1.40874e+001   A4 = −8.95519e−003   A6 = −1.13109e−005

Fifth surface

K = 1.47405e+001   A4 = 1.16143e−002   A6 = 9.07581e−004

Sixth surface

K = −9.69339e+000   A4 = 8.06017e−004   A6 = 1.09323e−003

Eighth surface

K = −5.09301e+000   A4 = 1.50977e−005   A6 = −5.31157e−004

Ninth surface

K = 1.50804e+001   A4 = −4.97400e−003   A6 = 4.96866e−005

Tenth surface

K = −5.05811e+001   A4 = 3.58405e−003   A6 = −6.14664e−004
A8 = 8.77333e−005   A10 = −3.44814e−006

Eleventh surface

K = 4.11902e+000   A4 = 5.20259e−003   A6 = −1.01058e−003
A8 = 1.11372e−004   A10 = −1.14390e−006

Twelfth surface

K = −8.52909e+000   A4 = −2.92426e−003   A6 = 7.46116e−004
A8 = −4.18326e−005

Thirteenth surface

K = 2.43033e+001   A4 = 8.04370e−003   A6 = 7.03394e−004
A8 = 2.12490e−005

Various data

| | |
|---|---|
| Focal length | 5.20 |
| Fno | 2.88 |
| Angle of view | 36.62 |
| Image height | 3.87 |
| Lens overall length | 17.86 |
| BF | 4.68 |
| Entrance pupil position | 4.00 |

-continued

|  |  |
|---|---|
| Exit pupil position | −3.70 |
| Front principal point position | 5.98 |
| Rear principal points position | −0.52 |

Single lens data

| Lens | starting surface | Focal length |
|---|---|---|
| 1 | 1 | −8.64 |
| 2 | 3 | −31.87 |
| 3 | 5 | 22.64 |
| 4 | 8 | 6.32 |
| 5 | 10 | 6.26 |
| 6 | 12 | −4.41 |

Wide-angle-middle ommatidium
Unit mm surface data

| surface no | r | d | nd | vd | effective diameter |
|---|---|---|---|---|---|
| 1* | 14.402 | 1.30 | 1.72916 | 54.7 | 7.20 |
| 2* | 9.996 | 1.60 |  |  | 5.79 |
| 3* | 5.871 | 0.42 | 1.84666 | 23.8 | 4.44 |
| 4* | 4.615 | 1.75 |  |  | 4.28 |
| 5* | −8.563 | 0.80 | 1.77250 | 49.6 | 3.55 |
| 6* | −13.567 | 0.87 |  |  | 3.35 |
| 7 (diaphragm) | ∞ | 1.46 |  |  | 3.17 |
| 8* | 4.163 | 1.20 | 1.59240 | 68.3 | 4.32 |
| 9* | −12.199 | 0.89 |  |  | 4.41 |
| 10* | 6.787 | 1.80 | 1.72916 | 54.7 | 4.36 |
| 11* | 19.484 | 0.50 |  |  | 3.99 |
| 12* | −6.996 | 0.60 | 1.84666 | 23.8 | 3.92 |
| 13* | 14.611 |  |  |  | 3.89 |
| Image plane | ∞ |  |  |  |  |

Aspheric data

First surface

K = 1.16168e+001   A4 = 9.89768e−004   A6 = −5.43987e−005
A8 = 3.26693e−006

Second surface

K = 7.65824e+000   A4 = 1.39481e−003   A6 = −9.20355e−005
A8 = 9.48211e−007

Third surface

K = −9.87273e+000   A4 = −8.94971e−003   A6 = −4.29309e−004

Fourth surface

K = −5.07614e+000   A4 = −9.61771e−003   A6 = 1.73926e−004

Fifth surface

K = 7.60775e+000   A4 = 7.63344e−003   A6 = 4.36551e−004

Sixth surface

K = −4.58561e+001   A4 = 1.33685e−003   A6 = 4.26211e−004

Eighth surface

K = −2.28716e+000   A4 = 8.67333e−004   A6 = −2.09732e−004

Ninth surface

K = 1.17258e+001   A4 = −3.23114e−003   A6 = 1.73236e−004

Tenth surface

K = −1.31003e+001   A4 = 2.80544e−003   A6 = −7.65671e−004
A8 = 9.93211e−005   A10 = −2.31040e−006

Eleventh surface

K = −9.00000e+001   A4 = 4.49945e−003   A6 = −1.47687e−003
A8 = 5.45215e−005   A10 = 8.48898e−006

Twelfth surface

K = −2.13149e+001   A4 = −4.89613e−003   A6 = 9.18275e−004
A8 = −1.52655e−005

-continued

Thirteenth surface

K = 3.35463e+001   A4 = 2.33168e−003   A6 = 7.55748e−004
A8 = 6.21658e−005

Various data

|  |  |
|---|---|
| Focal length | 7.50 |
| Fno | 2.88 |
| Angle of view | 27.26 |
| Image height | 3.87 |
| Lens overall length | 17.86 |
| BF | 4.68 |
| Entrance pupil position | 5.43 |
| Exit pupil position | −3.21 |
| Front principal point position | 5.80 |
| Rear principal points position | −2.82 |

Single lens data

| Lens | starting surface | Focal length |
|---|---|---|
| 1 | 1 | −51.19 |
| 2 | 3 | −30.09 |
| 3 | 5 | −32.31 |
| 4 | 8 | 5.39 |
| 5 | 10 | 13.48 |
| 6 | 12 | −5.52 |

Telephoto-middle ommatidium
Unit mm surface data

| surface no | r | d | nd | vd | effective diameter |
|---|---|---|---|---|---|
| 1* | 11.464 | 1.30 | 1.72916 | 54.7 | 6.73 |
| 2* | 15.201 | 1.60 |  |  | 6.07 |
| 3* | −8.689 | 0.42 | 1.84666 | 23.8 | 5.19 |
| 4* | −44.646 | 1.75 |  |  | 5.05 |
| 5* | 25.108 | 0.80 | 1.77250 | 49.6 | 4.80 |
| 6* | −7.531 | 0.87 |  |  | 4.77 |
| 7 (diaphragm) | ∞ | 1.46 |  |  | 3.61 |
| 8* | 142.496 | 1.20 | 1.59240 | 68.3 | 3.83 |
| 9* | 20.498 | 0.89 |  |  | 4.18 |
| 10* | 8.680 | 1.80 | 1.72916 | 54.7 | 4.64 |
| 11* | −40.199 | 0.50 |  |  | 4.89 |
| 12* | 4.483 | 0.60 | 1.84666 | 23.8 | 5.06 |
| 13* | 2.685 |  |  |  | 4.88 |
| Image plane | ∞ |  |  |  |  |

Aspheric data

First surface

K = −1.12226e+001   A4 = −1.13289e−004   A6 = −5.28008e−005
A8 = 2.94049e−006

Second surface

K = 5.62752e+000   A4 = −1.25443e−003   A6 = −2.40089e−005
A8 = 3.72638e−006

Third surface

K = −8.87393e+000   A4 = 1.69189e−003   A6 = −1.84476e−004

Fourth surface

K = 6.67509e+001   A4 = 3.68820e−003   A6 = −1.00293e−004

Fifth surface

K = 1.23997e+001   A4 = −2.08071e−003   A6 = 1.15687e−004

Sixth surface

K = −2.71503e+000   A4 = −2.68612e−003   A6 = 8.47615e−005

Eighth surface

K = −9.00000e+001   A4 = −5.73823e−003   A6 = 7.95727e−004

Ninth surface

| | | |
|---|---|---|
| K = 2.16869e+001 | A4 = −1.52643e−002 | A6 = 1.68370e−003 |

Tenth surface

| | | |
|---|---|---|
| K = −8.73655e+000 | A4 = −7.58655e−003 | A6 = −3.31580e−004 |
| A8 = 2.47858e−004 | A10 = −1.66883e−005 | |

Eleventh surface

| | | |
|---|---|---|
| K = −9.00000e+001 | A4 = −1.06514e−003 | A6 = −3.52469e−004 |
| A8 = 1.03483e−004 | A10 = −7.19175e−006 | |

Twelfth surface

| | | |
|---|---|---|
| K = −1.16155e+001 | A4 = 5.95986e−004 | A6 = 3.60160e−004 |
| A8 = −4.46187e−005 | | |

Thirteenth surface

| | | |
|---|---|---|
| K = −4.72048e+000 | A4 = 3.59852e−003 | A6 = 4.99895e−006 |
| A8 = −2.00257e−005 | | |

Various data

| | |
|---|---|
| Focal length | 10.50 |
| Fno | 2.88 |
| Angle of view | 20.21 |
| Image height | 3.87 |
| Lens overall length | 17.86 |
| BF | 4.68 |
| Entrance pupil position | 5.94 |
| Exit pupil position | −3.42 |
| Front principal point position | 2.83 |
| Rear principal points position | −5.82 |

Single lens data

| Lens | starting surface | Focal length |
|---|---|---|
| 1 | 1 | 55.77 |
| 2 | 3 | −12.81 |
| 3 | 5 | 7.58 |
| 4 | 8 | −40.56 |
| 5 | 10 | 9.94 |
| 6 | 12 | −9.34 |

Telephoto ommatidium

Unit mm surface data

| surface no | r | d | nd | vd | effective diameter |
|---|---|---|---|---|---|
| 1* | 7.756 | 1.30 | 1.72916 | 54.7 | 7.41 |
| 2* | 21.268 | 1.60 | | | 6.82 |
| 3* | −9.930 | 0.42 | 1.84666 | 23.8 | 5.91 |
| 4* | −84.565 | 1.75 | | | 5.58 |
| 5* | 27.184 | 0.80 | 1.77250 | 49.6 | 4.97 |
| 6* | −10.343 | 0.87 | | | 4.86 |
| 7 (diaphragm) | ∞ | 1.46 | | | 4.02 |
| 8* | −562.426 | 1.20 | 1.59240 | 68.3 | 4.11 |
| 9* | 49.210 | 0.89 | | | 4.33 |
| 10* | 14.199 | 1.80 | 1.72916 | 54.7 | 4.46 |
| 11* | 8.599 | 0.50 | | | 4.77 |
| 12* | 6.050 | 0.60 | 1.84666 | 23.8 | 5.13 |
| 13* | 5.049 | | | | 5.23 |
| Image plane | ∞ | | | | |

Aspheric data

First surface

| | | |
|---|---|---|
| K = −5.01788e+000 | A4 = 1.07278e−003 | A6 = −3.24083e−005 |
| A8 = 3.43676e−006 | | |

Second surface

| | | |
|---|---|---|
| K = 1.37156e+000 | A4 = −1.66607e−004 | A6 = 3.17988e−005 |
| A8 = 4.12335e−006 | | |

Third surface

| | | |
|---|---|---|
| K = −1.14417e+001 | A4 = 2.81702e−003 | A6 = −7.26483e−005 |

Fourth surface

| | | |
|---|---|---|
| K = −9.00000e+001 | A4 = 3.61630e−003 | A6 = −2.98440e−005 |

Fifth surface

| | | |
|---|---|---|
| K = 4.05390e+001 | A4 = −2.78388e−003 | A6 = 2.27441e−004 |

Sixth surface

| | | |
|---|---|---|
| K = −3.61488e+000 | A4 = −2.42356e−003 | A6 = 1.62345e−004 |

Eighth surface

| | | |
|---|---|---|
| K = −9.00000e+001 | A4 = −4.22712e−003 | A6 = 4.17957e−004 |

Ninth surface

| | | |
|---|---|---|
| K = 9.00000e+001 | A4 = −1.45330e−002 | A6 = 1.34423e−003 |

Tenth surface

| | | |
|---|---|---|
| K = −5.32928e+001 | A4 = −9.81497e−003 | A6 = −4.12565e−004 |
| A8 = 2.99948e−004 | A10 = −1.98667e−005 | |

Eleventh surface

| | | |
|---|---|---|
| K = −2.19201e+000 | A4 = −2.78515e−003 | A6 = 1.62682e−004 |
| A8 = 1.65808e−005 | A10 = −1.17910e−006 | |

Twelfth surface

| | | |
|---|---|---|
| K = −2.08158e+001 | A4 = 2.05328e−003 | A6 = −1.12732e−004 |
| A8 = −1.62819e−005 | | |

Thirteenth surface

| | | |
|---|---|---|
| K = −1.37690e+001 | A4 = 7.58138e−005 | A6 = −5.48522e−006 |
| A8 = −1.39436e−005 | | |

Various data

| | |
|---|---|
| Focal length | 15.00 |
| Fno | 2.88 |
| Angle of view | 14.45 |
| Image height | 3.87 |
| Lens overall length | 17.86 |
| BF | 4.68 |
| Entrance pupil position | 7.81 |
| Exit pupil position | −3.52 |
| Front principal point position | −4.63 |
| Rear principal points position | −10.32 |

Single lens data

| Lens | starting surface | Focal length |
|---|---|---|
| 1 | 1 | 16.09 |
| 2 | 3 | −13.32 |
| 3 | 5 | 9.79 |
| 4 | 8 | −76.33 |
| 5 | 10 | −34.59 |
| 6 | 12 | −49.71 |

NUMERICAL EXAMPLE 7

(numerical example 7)

Wide-angle ommatidium
Unit mm surface data

| surface no | r | d | nd | vd | effective diameter |
|---|---|---|---|---|---|
| 1* | −48.116 | 1.30 | 1.62041 | 60.3 | 7.66 |
| 2* | 3.639 | 6.00 | | | 5.47 |
| 3* | 8.750 | 1.40 | 1.59240 | 68.3 | 4.73 |
| 4* | −16.903 | 0.50 | | | 4.40 |
| 5* | −34.756 | 0.80 | 1.80518 | 25.4 | 3.96 |
| 6* | 56.394 | 0.10 | | | 3.88 |
| 7(diaphragm) | ∞ | 0.10 | | | 3.88 |
| 8* | 6.065 | 1.20 | 1.64000 | 60.1 | 3.92 |
| 9* | 23.836 | 4.25 | | | 3.68 |
| 10* | 8.690 | 1.80 | 1.59240 | 68.3 | 5.41 |
| 11* | −9.012 | 0.50 | | | 5.31 |
| 12* | −8.618 | 1.00 | 1.84666 | 23.8 | 4.93 |
| 13* | 72.203 | | | | 5.07 |
| Image plane | ∞ | | | | |

Aspheric data

First surface

$K = -9.00000e+001$    $A4 = 7.01850e-004$    $A6 = -1.41729e-005$

Second surface

$K = -1.02437e+000$    $A4 = 2.89533e-003$    $A6 = 1.66545e-004$

Third surface

$K = 4.11720e+000$    $A4 = -6.62206e-005$    $A6 = 8.06378e-005$

Fourth surface

$K = 1.07116e+001$    $A4 = 2.17403e-003$    $A6 = -9.54859e-005$

Fifth surface

$K = -9.00000e+30001$    $A4 = 5.80653e-003$    $A6 = -4.79986e-004$

Sixth surface

$K = 2.07531e+001$    $A4 = 5.35204e-003$    $A6 = -2.78954e-004$

Eighth surface

$K = 7.31767e-001$    $A4 = 4.43548e-004$    $A6 = 1.00025e-004$

Ninth surface

$K = -1.63240e+001$    $A4 = 1.86430e-003$    $A6 = 1.94279e-004$

Tenth surface

$K = -8.77468e+000$    $A4 = 2.85223e-003$    $A6 = 2.41901e-005$

Eleventh surface

$K = 3.81908e+000$    $A4 = -3.42418e-003$    $A6 = 3.06907e-004$

Twelfth surface

$K = -9.22231e+000$    $A4 = -8.81583e-003$    $A6 = 4.93062e-004$

Thirteenth surface

$K = -3.49900e001$    $A4 = -5.65878e-004$    $A6 = 3.46460e-004$

Various data

| | |
|---|---|
| Focal length | 5.20 |
| Fno | 2.88 |
| Angle of view | 36.69 |
| Image height | 3.88 |
| Lens overall length | 23.95 |
| BF | 5.00 |
| Entrance pupil position | 4.01 |
| Exit pupil position | −6.87 |

| | | |
|---|---|---|
| Front principal point position | | 6.93 |
| Rear principal points position | | −0.20 |

Single lens data

| Lens | starting surface | Focal length |
|---|---|---|
| 1 | 1 | −5.40 |
| 2 | 3 | 9.93 |
| 3 | 5 | −26.60 |
| 4 | 8 | 12.38 |
| 5 | 10 | 7.76 |
| 6 | 12 | −9.04 |

Wide-angle-middle ommatidium
Unit mm surface data

| surface no | r | d | nd | vd | effective diameter |
|---|---|---|---|---|---|
| 1* | −419.207 | 1.30 | 1.62041 | 60.3 | 7.36 |
| 2* | 4.982 | 6.00 | | | 5.79 |
| 3* | 8.643 | 1.40 | 1.59240 | 68.3 | 5.55 |
| 4* | −30.643 | 0.50 | | | 5.14 |
| 5* | −25.934 | 0.80 | 1.80518 | 25.4 | 4.81 |
| 6* | 68.322 | 0.10 | | | 4.60 |
| 7(diaphragm) | ∞ | 0.10 | | | 4.60 |
| 8* | 5.835 | 1.20 | 1.64000 | 60.1 | 4.81 |
| 9* | −260.120 | 4.25 | | | 4.79 |
| 10* | 46.541 | 1.80 | 1.59240 | 68.3 | 5.00 |
| 11* | −9.934 | 0.50 | | | 4.81 |
| 12* | −5.672 | 1.00 | 1.84666 | 23.8 | 4.70 |
| 13* | −20.639 | | | | 5.21 |
| Image plane | ∞ | | | | |

Aspheric data

First surface

| | | |
|---|---|---|
| K = 9.00000e+001 | A 4 = 1.05181e−003 | A 6 = −2.00916e−005 |

Second surface

| | | |
|---|---|---|
| K = −9.71530e−001 | A 4 = 2.64711e−003 | A 6 = 9.78189e−005 |

Third surface

| | | |
|---|---|---|
| K = 6.02071e+000 | A 4 = −8.54070e−005 | A 6 = 1.21119e−004 |

Fourth surface

| | | |
|---|---|---|
| K = 6.94820e+001 | A 4 = 1.61239e−003 | A 6 = 1.97117e−004 |

Fifth surface

| | | |
|---|---|---|
| K = 8.65492e+001 | A 4 = 4.66403e−003 | A 6 = −2.08149e−004 |

Sixth surface

| | | |
|---|---|---|
| K = 4.69152e+001 | A 4 = 3.86845e−003 | A 6 = −2.07634e−004 |

Eighth surface

| | | |
|---|---|---|
| K = 9.12544e−001 | A 4 = −8.06647e−004 | A 6 = 7.47605e−005 |

Ninth surface

| | | |
|---|---|---|
| K = 5.13762e+001 | A 4 = 2.89711e−004 | A 6 = 1.47593e−004 |

Tenth surface

| | | |
|---|---|---|
| K = −3.69018e+001 | A 4 = 9.86792e−004 | A 6 = 2.20769e−004 |

Eleventh surface

| | | |
|---|---|---|
| K = 3.52657e+001 | A 4 = −3.00617e−003 | A 6 = 2.55391e−004 |

Twelfth surface

| | | |
|---|---|---|
| K = −3.32502e+001 | A 4 = −1.04688e−002 | A 6 = 3.83832e−004 |

Thirteenth surface

| | | |
|---|---|---|
| K = 3.90398e+001 | A 4 = −1.95574e−003 | A 6 = 3.66442e−004 |

-continued

| Various data | |
|---|---|
| Focal length | 7.50 |
| Fno | 2.88 |
| Angle of view | 27.32 |
| Image height | 3.88 |
| Lens overall length | 23.95 |
| BF | 5.00 |
| Entrance pupil position | 4.83 |
| Exit pupil position | −5.89 |
| Front principal point position | 7.17 |
| Rear principal points position | −2.50 |

| Single lens data | | |
|---|---|---|
| Lens | starting surface | Focal length |
| 1 | 1 | −7.93 |
| 2 | 3 | 11.53 |
| 3 | 5 | −23.26 |
| 4 | 8 | 8.93 |
| 5 | 10 | 13.99 |
| 6 | 12 | −9.53 |

Telephoto-middle ommatidium
Unit mm surface data

| surface no | r | d | nd | vd | effective diameter |
|---|---|---|---|---|---|
| 1* | 21.333 | 1.30 | 1.62041 | 60.3 | 7.94 |
| 2* | 8.644 | 6.00 | | | 7.27 |
| 3* | 14.523 | 1.40 | 1.59240 | 68.3 | 5.76 |
| 4* | −8.547 | 0.50 | | | 5.55 |
| 5* | −8.406 | 0.80 | 1.80518 | 25.4 | 4.92 |
| 6* | −13.347 | 0.10 | | | 4.63 |
| 7(diaphragm) | ∞ | 0.10 | | | 4.42 |
| 8* | 6.682 | 1.20 | 1.64000 | 60.1 | 4.47 |
| 9* | 6.140 | 4.25 | | | 4.49 |
| 10* | 5.936 | 1.80 | 1.59240 | 68.3 | 6.67 |
| 11* | 34.617 | 0.50 | | | 6.26 |
| 12* | 5.087 | 1.00 | 1.84666 | 23.8 | 6.25 |
| 13* | 3.128 | | | | 5.77 |
| Image plane | ∞ | | | | |

Aspheric data

First surface $K = -2.60863e+001$    $A\,4 = -7.80509e-004$    $A\,6 = -9.41827e-006$ Second surface $K = -5.52978e+000$    $A\,4 = 1.27924e-004$    $A\,6 = -2.07571e-005$ Third surface $K = -2.40411e+001$    $A\,4 = 1.27171e-003$    $A\,6 = -5.45047e-005$ Fourth surface $K = -2.17385e-001$    $A\,4 = 3.74011e-004$    $A\,6 = 7.90553e-006$ Fifth surface $K = 4.83965e-001$    $A\,4 = 1.35730e-003$    $A\,6 = 6.25170e-005$ Sixth surface $K = 6.10281e+000$    $A\,4 = 1.43583e-003$    $A\,6 = 4.65354e-005$ Eighth surface $K = 1.69209e+000$    $A\,4 = -1.58544e-003$    $A\,6 = -8.62746e-005$ Ninth surface $K = 1.59626e+000$    $A\,4 = -2.35778e-003$    $A\,6 = -1.33625e-004$ Tenth surface $K = 1.92595e-001$    $A\,4 = 9.83639e-004$    $A\,6 = -1.49120e-006$ -continued

Eleventh surface

| K = 3.11410e+001 | A 4 = 3.18700e−003 | A 6 = 2.95213e−006 |

Twelfth surface

| K = −2.85262e+000 | A 4 = −1.83994e−003 | A 6 = 7.62849e−005 |

Thirteenth surface

| K = −2.02865e+000 | A 4 = −1.53383e−003 | A 6 = 1.15514e−004 |

Various data

| | |
|---|---|
| Focal length | 10.50 |
| Fno | 2.81 |
| Angle of view | 20.26 |
| Image height | 3.88 |
| Lens overall length | 23.95 |
| BF | 5.00 |
| Entrance pupil position | 7.18 |
| Exit pupil position | −4.92 |
| Front principal point position | 6.58 |
| Rear principal points position | −5.50 |

Single lens data

| Lens | starting surface | Focal length |
|---|---|---|
| 1 | 1 | −24.38 |
| 2 | 3 | 9.29 |
| 3 | 5 | −30.40 |
| 4 | 8 | −866.01 |
| 5 | 10 | 11.82 |
| 6 | 12 | −12.52 |

Telephoto ommatidium
Unit mm surface data

| surface no | r | d | nd | vd | effective diameter |
|---|---|---|---|---|---|
| 1* | 14.827 | 1.30 | 1.62041 | 60.3 | 8.55 |
| 2* | 12.297 | 6.00 | | | 8.02 |
| 3* | 21.647 | 1.40 | 1.59240 | 68.3 | 6.41 |
| 4* | −8.367 | 0.50 | | | 6.22 |
| 5* | −8.443 | 0.80 | 1.80518 | 25.4 | 5.53 |
| 6* | −14.602 | 0.10 | | | 5.19 |
| 7(diaphragm) | ∞ | 0.10 | | | 4.98 |
| 8* | 6.475 | 1.20 | 1.64000 | 60.1 | 5.15 |
| 9* | 6.369 | 4.25 | | | 4.92 |
| 10* | 6.929 | 1.80 | 1.59240 | 68.3 | 5.98 |
| 11* | 6.888 | 0.50 | | | 5.77 |
| 12* | 5.923 | 1.00 | 1.84666 | 23.8 | 5.98 |
| 13* | 4.456 | | | | 5.67 |
| Image plane | ∞ | | | | |

Aspheric data

First surface

| K = −3.75927e+000 | A 4 = −1.26105e−004 | A 6 = −1.94984e−005 |

Second surface

| K = −2.03156e+000 | A 4 = 2.15308e−004 | A 6 = −2.04223e−005 |

Third surface

| K = −5.47758e+001 | A 4 = 1.32411e−003 | A 6 = −3.80510e−005 |

Fourth surface

| K = −9.95105e−001 | A 4 = 5.16908e−004 | A 6 = 2.08321e−006 |

Fifth surface

| K = 1.61472e+000 | A 4 = 1.45537e−003 | A 6 = 7.83081e−005 |

Sixth surface

| K = 5.13501e+000 | A 4 = 1.14621e−003 | A 6 = 6.02747e−005 |

-continued

| Eighth surface | | |
|---|---|---|
| K = 9.39192e−001 | A 4 = −2.76114e−004 | A 6 = 6.29758e−006 |

| Ninth surface | | |
|---|---|---|
| K = 9.66245e−001 | A 4 = −3.93145e−004 | A 6 = 2.50049e−005 |

| Tenth surface | | |
|---|---|---|
| K = −2.43256e+000 | A 4 = 4.08628e−004 | A 6 = −4.67073e−005 |

| Eleventh surface | | |
|---|---|---|
| K = −9.86742e−001 | A 4 = 1.42657e−003 | A 6 = −9.76226e−005 |

| Twelfth surface | | |
|---|---|---|
| K = −3.46390e+000 | A 4 = 1.08774e−003 | A 6 = −3.58503e−006 |

| Thirteenth surface | | |
|---|---|---|
| K = −2.33129e+000 | A 4 = 2.77796e−004 | A 6 = 3.71071e−005 |

Various data

| | |
|---|---|
| Focal length | 15.00 |
| Fno | 2.88 |
| Angle of view | 14.48 |
| Image height | 3.88 |
| Lens overall length | 23.95 |
| BF | 5.00 |
| Entrance pupil position | 9.02 |
| Exit pupil position | −4.60 |
| Front principal point position | 0.58 |
| Rear principal points position | −10.00 |

Single lens data

| Lens | starting surface | Focal length |
|---|---|---|
| 1 | 1 | −144.61 |
| 2 | 3 | 10.37 |
| 3 | 5 | −26.39 |
| 4 | 8 | 177.57 |
| 5 | 10 | 128.12 |
| 6 | 12 | −30.90 |

TABLE 1

| ommatidium | numerical example | | | | |
|---|---|---|---|---|---|
| type | 1 | 2 | 3 | 4 | 5 |
| A | 1.00 | 0.94 | 1.11 | 1.04 | 0.92 |
| B | 1.00 | 0.90 | 1.01 | | 0.88 |
| C | 1.00 | 1.00 | 0.99 | | 0.97 |
| D | 1.00 | 1.00 | 1.00 | 1.00 | 1.00 |

TABLE 2

| ommatidium | numerical example | | | | |
|---|---|---|---|---|---|
| type | 1 | 2 | 3 | 4 | 5 |
| A | 1.00 | 0.62 | 0.10 | 1.00 | 1.00 |
| B | 1.00 | 0.63 | 0.20 | | 1.00 |
| C | 1.00 | 1.03 | 0.40 | | 1.00 |
| D | 1.00 | 1.00 | 1.00 | 1.00 | 1.00 |

TABLE 3

| ommatidium | numerical example | | | | |
|---|---|---|---|---|---|
| type | 1 | 2 | 3 | 4 | 5 |
| A | 0.62 | 0.64 | 1.55 | 0.98 | 0.73 |
| B | 0.62 | 0.48 | 2.20 | 0.00 | 0.75 |

TABLE 3-continued

| ommatidium | numerical example | | | | |
|---|---|---|---|---|---|
| type | 1 | 2 | 3 | 4 | 5 |
| C | 0.62 | 0.91 | 78.68 | 0.00 | 0.71 |
| D | 0.62 | 0.65 | 0.81 | 1.00 | 0.70 |

TABLE 4

| ommatidium | numerical example | | | | |
|---|---|---|---|---|---|
| type | 1 | 2 | 3 | 4 | 5 |
| expression (28) | 7.5 | 6.88 | 2.21 | 2.88 | 12.88 |

TABLE 5

| ommatidium | numerical example | | | | |
|---|---|---|---|---|---|
| type | 1 | 4 | 5 | 6 | 7 |
| A | 1.00 | 0.98 | 1.04 | 1.00 | 1.14 |
| B | 1.00 | 1.00 | 1.07 | 1.00 | 1.13 |
| C | 1.00 | | 1.01 | 1.00 | 1.01 |
| D | 1.00 | | 1.00 | 1.00 | 1.00 |

TABLE 6

| ommatidium type | numerical example | | | | |
|---|---|---|---|---|---|
| | 1 | 4 | 5 | 6 | 7 |
| A | 1.02 | 1.93 | 1.14 | 1.28 | 1.68 |
| B | 1.16 | 0.00 | 1.35 | 1.55 | 1.88 |
| C | 0.12 | | 0.26 | 0.12 | 0.13 |
| D | 0.00 | | 0.00 | 0.00 | 0.00 |

TABLE 7

| ommatidium type | numerical example | | | | |
|---|---|---|---|---|---|
| | 1 | 4 | 5 | 6 | 7 |
| Max | 1.39 | 1.04 | 1.74 | 1.49 | 2.26 |
| Min | 1.08 | 1.04 | 1.10 | 1.03 | 1.76 |

TABLE 8

| ommatidium type | numerical example | | | | |
|---|---|---|---|---|---|
| | 1 | 4 | 5 | 6 | 7 |
| A | 0.62 | 0.98 | 0.73 | 0.79 | 1.44 |
| B | 0.62 | 1.00 | 0.75 | 0.79 | 1.43 |
| C | 0.62 | | 0.71 | 0.79 | 1.28 |
| D | 0.62 | | 0.7 | 0.79 | 1.26 |

TABLE 9

| ommatidium type | numerical example | | | | |
|---|---|---|---|---|---|
| | 1 | 4 | 5 | 6 | 7 |
| A | −9.30 | −14.72 | −20.18 | −11.80 | −21.65 |
| B | −9.30 | 15.00 | −20.78 | −11.80 | −21.45 |
| C | 9.30 | | 19.73 | 11.80 | 19.18 |
| D | 9.30 | | 19.47 | 11.80 | 18.96 |

TABLE 10

| ommatidium type | numerical example | | | | |
|---|---|---|---|---|---|
| | 1 | 4 | 5 | 6 | 7 |
| A | 18.72 | 20.07 | 36.28 | 18.50 | 31.53 |
| B | 16.60 | 19.26 | 31.03 | 14.53 | 28.42 |
| C | 13.50 | | 20.82 | 12.41 | 13.96 |
| D | 15.37 | | 28.25 | 14.17 | 16.17 |

The present invention is applicable to a compound-eye image pickup apparatus that arranges a plurality of optical systems.

The present invention can provide an image pickup apparatus including a plurality of optical systems and lens apparatus, each of which enables in-focus images having different angles of view to be simultaneously acquired.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2012-148732, 2012-148733, and 2012-148731, each filed Jul. 2, 2012, each of which is hereby incorporated by reference herein in its entirety.

What is claimed is:

1. An image pickup apparatus comprising a plurality of imaging optical systems having different focal lengths and each configured to form an optical image of an object, and a plurality of image sensors having image pickup areas each corresponding to one of the plurality of imaging optical systems and each configured to photoelectrically convert the optical image formed by a corresponding one of the imaging optical systems, the image pickup apparatus being configured to simultaneously capture a plurality of images by controlling the plurality of imaging optical systems and the plurality of image sensors,
    wherein each imaging optical system includes a focus lens unit configured to move in focusing and a fixed lens unit that is fixed in the focusing, and
    wherein the image pickup apparatus further comprises a focus driver configured to move a plurality of focus lens units by equal moving amounts.

2. The image pickup apparatus according to claim 1, wherein the plurality of imaging optical systems include a plurality of imaging optical systems having equal focal lengths.

3. The image pickup apparatus according to claim 1, further comprising a holder configured to integrally hold the plurality of focus lens units.

4. The image pickup apparatus according to claim 1, wherein the plurality of images include a plurality of in-focus images having different angles of view and focused upon the same object, and
    wherein the image pickup apparatus further comprises an ultra-resolution processor configured to correct a resolution using the in-focus images.

5. The image pickup apparatus according to claim 1, further comprising distance information calculator configured to calculate distance information from the plurality of images to the object.

6. The image pickup apparatus according to claim 1, further comprising an image synthesizer configured to generate a synthesized image having an image characteristic different from the plurality of images.

7. The image pickup apparatus according to claim 6, wherein the image characteristic contains at least one of a dynamic range, a resolution, a blur amount, an angle of view, and a removal ratio of a captured image.

8. The image pickup apparatus according to claim 1, wherein the plurality of focus lens units are adjacent to each other in a direction perpendicular to each optical axis, and include focus lenses adjacent to each other in the direction perpendicular to each optical axis and having different surface shapes in adjacent imaging optical systems having different focal lengths.

9. The image pickup apparatus according to claim 1, wherein focus lenses in the plurality of focus lens units adjacent in a direction perpendicular to each optical axis are made of the same material.

10. The image pickup apparatus according to claim 1, wherein the plurality of focus lens units include integrally molded focus lenses adjacent in a direction perpendicular to each optical axis.

11. A lens apparatus attachable to an image pickup apparatus body, the lens apparatus comprising a plurality of imaging optical systems having different focal lengths and each configured to form an optical image of an object, the image pickup apparatus body including a plurality of image sensors having image pickup areas each corresponding to one of the plurality of imaging optical systems and each configured to photoelectrically convert the optical image formed by a corresponding one of the imaging optical systems, and image pickup controller configured to simultaneously capture a plurality of images by controlling the plurality of imaging optical systems and the plurality of image sensors,
  wherein each imaging optical system includes a focus lens unit configured to move in focusing and a fixed lens unit that is fixed in the focusing, and
  wherein the lens apparatus further comprises a focus driver configured to move a plurality of focus lens units by equal moving amounts.

12. An image pickup apparatus comprising a plurality of imaging optical systems having different focal lengths and each configured to form an optical image of an object, and a plurality of image sensors having image pickup areas each corresponding to one of the plurality of imaging optical systems and each configured to photoelectrically convert the optical image formed by a corresponding one of the imaging optical systems,
  wherein each imaging optical system includes a focus lens unit configured to move in focusing and a fixed lens unit that is fixed in the focusing, the focus lens unit including a focus lens,
  wherein the focus lenses of the imaging optical systems adjacent to each other in a direction perpendicular to each optical axis and having different focal lengths, having surface shapes different from each other, and
  wherein the following conditional expression is satisfied $$0.8 < \frac{(1-\beta_{Fi}^2)\beta_{Ri}^2 \times f_h^2}{(1-\beta_{Fh}^2)\beta_{Rh}^2 \times f_i^2} < 1.2$$

where $\beta_{Fi}$ and $\beta_{Fh}$ are lateral magnifications of focus lens units in arbitrary imaging optical systems i and h among the plurality of imaging optical systems, $\beta_{Ri}$ and $\beta_{Rh}$ are lateral magnifications of entire image side units located on an image side of the focus lens units in the arbitrary imaging optical systems i and h, and $f_i$ and $f_h$ are focal lengths of the arbitrary imaging optical systems i and h.

13. The image pickup apparatus according to claim 12, wherein the plurality of imaging optical systems include a plurality of imaging optical systems having equal focal lengths.

14. The image pickup apparatus according to claim 12, further comprising a holder configured to integrally hold the plurality of focus lens units, adjacent focus lens units integrally moving in focusing,
  wherein the following conditional expression is satisfied:

$$0 < \frac{1-|\beta_{Fi}|}{1-|\beta_{Ft}|} \leq 1.1$$

Where $\beta_{Ft}$ is a lateral magnification of a focus lens unit in an imaging optical system having the longest focal length in the plurality of imaging optical systems.

15. The image pickup apparatus according to claim 12, wherein the following conditional expression is satisfied:

$$0.4 < \left|\frac{f_{Fi}}{f_t}\right| < 80$$

where $f_{Fi}$ is a focal length of the focus lens unit in an arbitrary imaging optical system i, and $f_t$ is a focal length of an imaging optical system having the longest focal length.

16. The image pickup apparatus according to claim 12, wherein the following conditional expression is satisfied:

$$1 < \left|(1-\beta_{Ft}^2)\beta_{Rt}^2 \times \frac{f_t}{f_w}\right| < 20$$

where $f_t$ is a focal length of an imaging optical system having the longest focal length in the plurality of imaging optical systems, $\beta_{Ft}$ is a lateral magnification of the focus lens unit in the imaging optical system having the longest focal length, $\beta_{Rt}$ is a lateral magnification of an entire image side unit on an image side of the focus lens unit in the imaging optical system having the longest focal length, and $f_w$ is a focal length of an imaging optical system having the shortest focal length in the plurality of imaging optical systems.

17. The image pickup apparatus according to claim 12, wherein the following conditional expression is satisfied:

$$55 < \nu_{Fi} < 90$$

where $\nu_{Fi}$ is an Abbe number of at least one lens in the focus unit in the arbitrary imaging optical system i.

18. The image pickup apparatus according to claim 12, wherein focus lenses in a plurality of focus lens units adjacent in a direction perpendicular to each optical axis are made of the same material.

19. A lens apparatus attachable to an image pickup apparatus body, the lens apparatus comprising a plurality of imaging optical systems having different focal lengths and each configured to form an optical image of an object, the image pickup apparatus body including a plurality of image sensors having image pickup areas each corresponding to one of the plurality of imaging optical systems and each configured to photoelectrically convert the optical image formed by a corresponding one of the imaging optical systems,
  wherein each imaging optical system includes a focus lens unit configured to move in focusing and a fixed lens unit that is fixed in the focusing, the focus lens unit including a focus lens,
  wherein the focus lenses of the imaging optical systems adjacent to each other in a direction perpendicular to each optical axis and having different focal lengths, having surface shapes different from each other, and
  wherein the following conditional expression is satisfied $$0.8 < \frac{(1-\beta_{Fi}^2)\beta_{Ri}^2 \times f_h^2}{(1-\beta_{Fh}^2)\beta_{Rh}^2 \times f_i^2} < 1.2$$

where $\beta_{Fi}$ and $\beta_{Fh}$ are lateral magnifications of focus lens units in arbitrary imaging optical systems i and h among the plurality of imaging optical systems, $\beta_{Ri}$ and $\beta_{Rh}$ are lateral magnifications of entire image side units located on an image side of the focus lens units in the arbitrary imaging optical systems i and h, and $f_i$ and $f_h$ are focal lengths of the arbitrary imaging optical systems i and h.

20. An image pickup apparatus comprising a plurality of imaging optical systems having different focal lengths and each configured to form an optical image of an object, and a plurality of image sensors having image pickup areas each corresponding to one of the plurality of imaging optical systems and each configured to photoelectrically convert the optical image formed by a corresponding one of the imaging optical systems, wherein each imaging optical system includes a focus lens unit configured to move in focusing and a fixed lens unit that is fixed in the focusing, the focus lens unit including a focus lens, wherein the focus lenses of the imaging optical systems adjacent to each other in a direction perpendicular to each optical axis and having different focal lengths, having surface shapes different from each other, and wherein the following conditional expressions are satisfied:

$$0.8 < |ffi/ffh| < 1.2;$$

$$|(\Delta Of + \Delta f)/ft| < 2.1;$$

$$\Delta f = ffi - ffh; \text{ and}$$

$$\Delta Of = Ofi - Ofh,$$

where $f_t$ is the longest focal length in the plurality of imaging optical systems, ffh is a focal length of a focus lens unit in an arbitrary imaging optical system h in the plurality of imaging optical systems, ffi is a focal length of a focus lens unit in an arbitrary imaging optical system i in the plurality of imaging optical systems, Ofh is a distance from a front principal point position of the focus unit in the imaging optical system h to an image plane, and Ofi is a distance from the front principal point position of the focus unit in the imaging optical system i to the image plane.

21. The image pickup apparatus according to claim 20, wherein the plurality of imaging optical systems include a plurality of imaging optical systems having equal focal lengths.

22. The image pickup apparatus according to claim 20, wherein the plurality of imaging optical systems include an imaging optical system including a focus lens unit having a negative refractive index and an imaging optical system including a focus lens unit having a positive refractive index, and wherein the following conditional expression is satisfied:

$$1.0 < Ofn/Ofp < 2.4$$

where Ofn is a distance between the image plane and the front principal point position of focus lens unit having the negative refractive power, and Ofp is a distance between the image plane and the front principal point position of the focus lens unit having the positive refractive power.

23. The image pickup apparatus according to claim 20, further comprising a holder configured to integrally hold the plurality of focus lens units, wherein the following conditional expression is satisfied:

$$0.5 < |ffi/ft| < 1.6.$$

24. The image pickup apparatus according to claim 20, wherein focus lenses in a plurality of focus lens units adjacent in a direction perpendicular to each optical axis are made of the same material.

25. The image pickup apparatus according to claim 20, wherein the plurality of imaging optical systems include a focus lens unit of an imaging optical system having the shortest focal length has a negative refractive power, and a focus lens unit of an imaging optical system having the longest focal length has a positive refractive power.

26. A lens apparatus attachable to an image pickup apparatus body, the lens apparatus comprising a plurality of imaging optical systems having different focal lengths and each configured to form an optical image of an object, the image pickup apparatus body including a plurality of image sensors having image pickup areas each corresponding to one of the plurality of imaging optical systems and each configured to photoelectrically convert the optical image formed by a corresponding one of the imaging optical systems, wherein each imaging optical system includes a focus lens unit configured to move in focusing and a fixed lens unit that is fixed in the focusing, the focus lens unit including a focus lens, wherein the focus lenses of the imaging optical systems adjacent to each other in a direction perpendicular to each optical axis and having different focal lengths, having surface shapes different from each other, and wherein the following conditional expression is satisfied $$0.8 < |ffi/ffh| < 1.2$$

$$|(\Delta Of + \Delta f)/ft| < 2.1$$

$$\Delta f = ffi - ffh$$

$$\Delta Of = Ofi - Ofh$$

where $f_t$ is the longest focal length in the plurality of imaging optical systems, ffh is a focal length of a focus lens unit in an arbitrary imaging optical system h in the plurality of imaging optical systems, ffi is a focal length of a focus lens unit in an arbitrary imaging optical system i in the plurality of imaging optical systems, Ofh is a distance from a front principal point position of the focus unit in the imaging optical system h to an image plane, and Ofi is a distance from the front principal point position of the focus unit in the imaging optical system i to the image plane.

* * * * *